(12) United States Patent
Mohr et al.

(10) Patent No.: US 6,826,727 B1
(45) Date of Patent: Nov. 30, 2004

(54) APPARATUS, METHODS, PROGRAMMING FOR AUTOMATICALLY LAYING OUT DOCUMENTS

(75) Inventors: Eric Mohr, Watertown, MA (US); Paul B. Trevithick, Boston, MA (US); Costas Kitsos, Natick, MA (US); David E. Hollingsworth, Malden, MA (US); Stephanie L. Houde, Cambridge, MA (US); Jeffrey L. Caruso, Carlisle, MA (US)

(73) Assignee: Bitstream Inc., Cambridge, MA (US)

( * ) Notice: Subject to any disclaimer, the term of this patent is extended or adjusted under 35 U.S.C. 154(b) by 0 days.

(21) Appl. No.: 09/449,688

(22) Filed: Nov. 24, 1999

(51) Int. Cl.$^7$ .......................... G06F 17/21; G06F 17/00
(52) U.S. Cl. ...................... 715/517; 382/180; 715/514
(58) Field of Search ................................ 715/517, 520, 715/521, 514, 515, 516; 382/180

(56) References Cited

U.S. PATENT DOCUMENTS

| | | | |
|---|---|---|---|
| 5,214,755 A | * 5/1993 | Mason | 715/520 |
| 5,337,406 A | * 8/1994 | Takakura et al. | 715/520 |
| 5,381,523 A | 1/1995 | Hayashi et al. | |
| 5,459,827 A | 10/1995 | Allouche et al. | |
| 5,475,805 A | 12/1995 | Murata | |
| 5,555,362 A | * 9/1996 | Yamashita et al. | 715/517 |
| 5,577,189 A | 11/1996 | Gay et al. | |
| 5,644,776 A | 7/1997 | DeRose et al. | |
| 5,649,216 A | 7/1997 | Sieber | |
| 5,671,429 A | 9/1997 | Tanaka | |
| 5,745,122 A | 4/1998 | Gay et al. | |
| 5,748,963 A | 5/1998 | Orr | |
| 5,796,401 A | 8/1998 | Winer | |
| 5,822,587 A | 10/1998 | McDonald et al. | |
| 5,845,303 A | * 12/1998 | Templeman | 715/517 |
| 5,953,733 A | * 9/1999 | Langford-Wilson | 715/517 |
| 6,105,044 A | * 8/2000 | DeRose et al. | 715/514 |
| 6,161,114 A | * 12/2000 | King et al. | 715/517 |
| 6,185,589 B1 | * 2/2001 | Votipka | 715/517 |
| 6,301,213 B1 | * 10/2001 | Cundiff, Sr. | 369/75.2 |
| 6,446,100 B1 | * 9/2002 | Warmus et al. | 715/517 |

OTHER PUBLICATIONS

Scitex Corporation Ltd., Scitex Darwin, User Guide, Dec. 1997, pp. 33–37 and 57–60.
Donald E. Knuth, The TEXbook, 1984, Chapters 11 & 12, The American Mathematical Society, United States.

* cited by examiner

Primary Examiner—Joseph H. Feild
Assistant Examiner—Matthew Ludwig
(74) Attorney, Agent, or Firm—Edward W. Porter

(57) ABSTRACT

A computerized system lays out document templates represented as a tree of text and shape elements, including variable elements. The user can define a shape element to have a maximize or minimize property in one or more dimensions. The layout makes the minimized dimensions of a shape as small as its contents will allow; and makes the maximized dimensions expand as much as available space allows. Such maximization or minimization can be performed within a horizontal or vertical sequence box. Variable values mapped into variable shape elements can include sub-trees of text and/or shape elements, including shape elements which have the maximize or minimize property, and elements which are themselves variable elements. An anchor point can be fixed at a selected point on a shape, causing the anchor point to remain fixed as the rest of the shape expands or contract. Variable Image elements can maintain the aspect ratios of images mapped into them as those images are scaled. The layout of variable element into which no variable values have been mapped can be suppressed. Both content and attribute values can be mapped into a variable element. Multiple content-mapping rule sets can be used with a given template, and multiple templates can be used with a given content-mapping rule set. The content mapping rules can include data-base queries that vary in response to variable data. Text or shape elements can be defined, respectively, by reference to text models, which defined text attributes, and geometric models, which define shape attributes.

74 Claims, 64 Drawing Sheets

```
<?XML version="1.0"?>
<?NuDoc tsl_version="1"?>
<_document>~174
    ...
    <PF_Page_Base bottom_margin="63500" top_margin="63500"
    right_margin="63500" left_margin="63500" width="2159000"
    height="2794000" border_simple_thickness="3527" border_color="Black"
    border_name="_simple_border" fill_color="White"
    grid_rows="height=2413000" grid_columns="width=2032000">~155
        <PF_VBox_Base object_lock="TRUE" h_align_contents="left"
        v_align_contents="top" display_order="0" height="shrinkwrap"
        width="1549011" y_position="112668" x_position="512886">~162
            <PF_TextBox_Base bottom_bumper="76200"
            height="shrinkwrap" width="1588092" display_order="3"
            y_position="109455" x_position="519312">~156
                <PageTitle>~168
                    <_char visibility="visible"
                    data_tag="RequestHeading"
                    text_color="InfantYellow">The toys you
                    requested...</_char>~170
                    <_char text_color="Black"></_char>
                </PageTitle>~168A
            </PF_TextBox_Base>~156A
            <PF_Area_Template_Base bottom_bumper="101600"
            visibility="visible" data_tag="p1Area" height="shrinkwrap"
            width="shrinkwrap" display_order="0" y_position="329084"
            x_position="532127">~166
                <PF_HBox_Base h_align_contents="left"
                v_align_contents="top" display_order="0"
                height="977194" width="1201276" y_position="41762"
                x_position="0">~164
                    <PF_VBox_Base right_bumper="50800"
                    border_simple_thickness="7054"
                    border_color="Gray"
                    border_name="_simple_border"
                    h_align_contents="center"
                    v_align_contents="center" display_order="1"
                    height="shrinkwrap" width="shrinkwrap"
                    y_position="56838" x_position="56719">~162
                        <PF_Image_Base visibility="visible"
                        data_tag="p1pic" x_position="56719"
                        y_position="56838" display_order="0"
                        width="645583" height="977194"
                        src="D:\PFDemos\MB_MotherGoose\Images
                        \plane_pic.tif" right_bumper="0">~158
                        </PF_Image_Base>~158A
                    </PF_VBox_Base>~162A
                    ...
                </PF_HBox_Base>~164A
            </PF_Area_Template_Base>~166A
        ...
        </PF_VBox_Base>~162B
    ...
    </PF_Page_Base>~155A
    ...
</_document>~174A
```

FIG. 4

```
tsl_version 1;
    -...
        -color "ToddlerOrange"
        -  rgb "94.509%, 63.921%, 0.000%";
        -  color_type process;
        -end
        -...
133A {   -model PF_Designer_Doc : _document
         - language_id "english"; initial_content
         "<PF_Page_Base></PF_Page_Base>";
         -end
         -model PF_Box_Base : _box
133A {   - min_width "0.250000in"; max_width "11.000000in"; min_height
         "0.250000in"; max_height "17.000000in"; border_name "_simple_border";
         border_simple_thickness "1.000000pt"; border_color "Black";
         -end
         -model PF_TextBox_Base : PF_Box_Base
133A {   - border_name "_none"; border_simple_thickness "0.000000pt"; top_margin
         "0.000000in"; left_margin "0.000000in"; bottom_margin "0.000000in";
         right_margin "0.000000in"; runaround "false";
         -end
         -model PF_Area_Template_Base : PF_Box_Base
133B {   - border_name "_none"; border_simple_thickness "0.000000pt";
         clip_content "true";
         -end
         -...
         -model PF_Char_Base : _char
         - font_name "/Helvetica"; font_size "12.000000pt"; text_color "Black";
133B {   -end
         -model PF_Para_Base : _para
         - font_name "/Helvetica"; font_size "12.000000pt"; text_color "Black";
         -end
         -model CoverLetter : PF_Para_Base
133B {   - drop_size "0lines"; font_name "/Times"; font_size "42324";
         -end
         -model ToyName : PF_Para_Base
133B {   - drop_size "0lines"; font_name "/Helvetica"; bold "true"; font_size "63486";
         line_spacing "110%"; text_color "Gray";
         -end
```

FIG. 5

```
<!--size:1392231,1007459-->
<PF_VBox_Base h_align_contents="left" v_align_contents="top" display_order="0"
height="shrinkwrap" width="shrinkwrap" y_position="0" x_position="0">~162
    <PF_HBox_Base h_align_contents="left" v_align_contents="bottom"
    display_order="5" height="shrinkwrap" width="shrinkwrap"
    y_position="1562812" x_position="150513">~164
        <PF_HBox_Base right_bumper="0" border_simple_thickness="7054"
        border_color="Gray" border_name="_simple_border"
        h_align_contents="center" v_align_contents="center" display_order="5"
        height="shrinkwrap" width="shrinkwrap" y_position="1562812"
        x_position="150513">~164
            <PF_Image_Base x_position="0" y_position="-53439"
            display_order="0" width="980720" height="645581"
            src="D:\MedBank\
            PfDemos\Mother_Goose\Toys\Viewfiles\rubberducky_H.tif"
            right_bumper="0" data_tag="p1pic"
            visibility="visible"></PF_Image_Base>~158
        </PF_HBox_Base>~164A
        <PF_VBox_Base h_align_contents="left" v_align_contents="top"
        display_order="6" height="shrinkwrap" width="shrinkwrap"
        y_position="1825697" x_position="1150854">~162
            <_group left_bumper="12700" top_bumper="0" display_order="6"
            height="294666" width="398811" y_position="1822238"
            x_position="1164690">~160
                <PF_Image_Base visibility="visible"
                data_tag="p1aOfferPic" src="NoOffer_pic.tif"
                height="26458" width="26458" display_order="0"
                y_position="0" x_position="0"></PF_Image_Base>~158
                <PF_VBox_Base h_align_contents="center"
                v_align_contents="center" display_order="1"
                height="292974" width="394988" y_position="1692"
                x_position="3823">~162
                    <PF_TextBox_Base width="shrinkwrap"
                    height="shrinkwrap" display_order="6"
                    y_position="1675749" x_position="3864524"
                    min_height="25400" bottom_bumper="5080">~156
                        <SaleText>~168
                        ...
                        </SaleText>~168
                    </PF_TextBox_Base>~156A
                    ...
                </PF_VBox_Base>~162A
            </_group.~160A
        </PF_VBox_Base>~162A
    </PF_HBox_Base>~164A
...
</PF_VBox_Base>~162A
```

FIG. 7

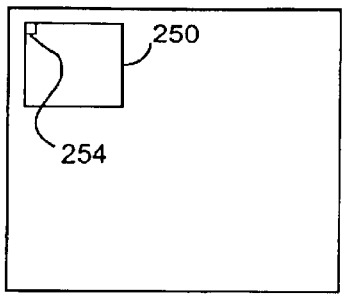
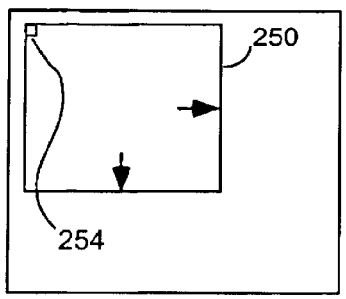
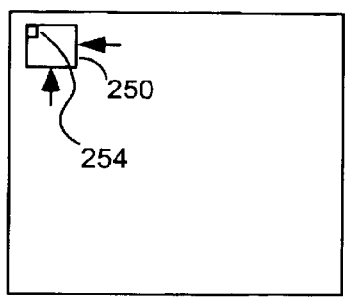
252　FIG. 19　　FIG. 20　　FIG. 21
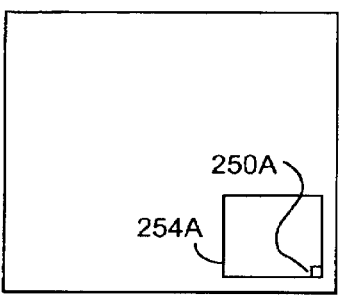
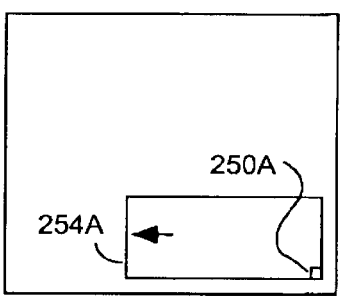
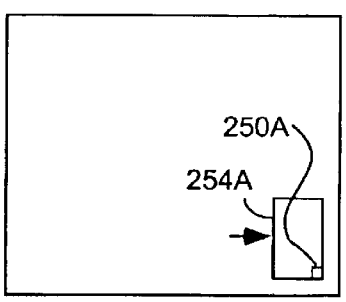
252A　FIG. 22　　FIG. 23　　FIG. 24
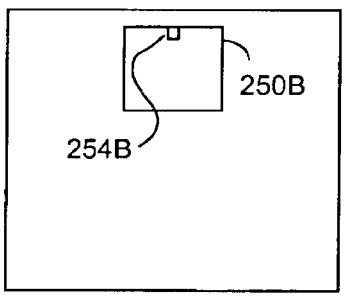
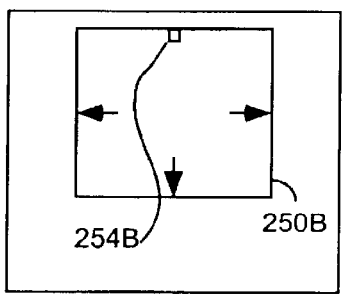
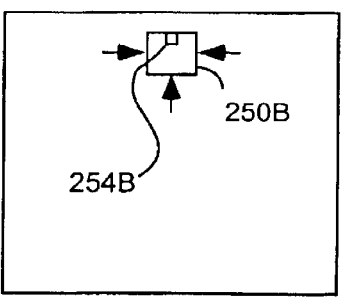
252B　FIG. 25　　FIG. 26　　FIG. 27
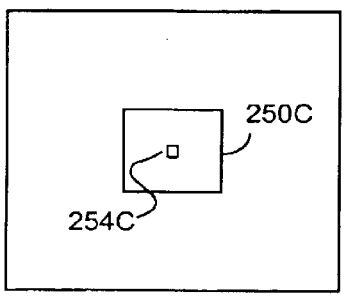
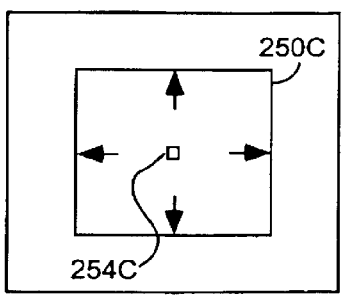
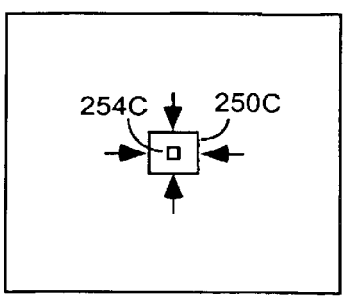
FIG. 28　　FIG. 29　　FIG. 30

```
-SELECT * FROM ps
WHERE ElementType='PICTURE' AND
Brand='<Brand>' AND
Product='<Product1>' AND
Role='<CustomerRole>'
```

FIG. 42

```
-(assuming <Brand> is "Whirlpool", <Product> is "Dishwasher 45"
and <CustomerRole> is "Dealer"):
-SELECT * FROM ps
WHERE ElementType='PICTURE' AND
Brand='Whirlpool' AND
Product='Dishwasher 45' AND
Role='Dealer'
```

FIG. 43

```
<pf_data>
        <1stName visibility="visible">Fred</1stName>
        <LastName visibility="visible">Smith</LastName>
        <Destination visibility="visible">Chile</Destination>
        ...
        <Address1 visibility="visible">Fred</Address1>
        <Address2 visibility="suppressed"></Address2>
        <City visibility="suppressed">Cambridge</State>
        ...
        <TravelWarningAreaTemplate
        visibility="suppressed"></TravelWarningAreaTemplate>
        ...
        <DestinationDescrip visibility="visible">
                <head>The Warmth Of Chile</head>
                <body>When it is <bold>winter</bold> in the Northern Hemisphere it is
                <bold>summer</bold> in Chile. Thus chile is a warm place to visit when
                we up north are enduring winter's wrath. But because Chile is so far
                south, its summers are pleasantly warm, not hot. </body>
        </DestinationDescrip>
        ...
</pf_data>
```

FIG. 46

-designer main control loop~1000
    -...
        -if user selects File>New, call fileNew~1002
        -if user selects File>Save, call fileSave~1004
        -if user selects File>Open, call fileOpen~1006
        -if user clicks on a Tool Box tool for a shape, call createShapeElement for the tool's elementType~1008
        -if user clicks on a shape or drag selection box around it, call selectShape~1010
        -if user drags on drag boxes of selected shape, call resizeShape~1012
        -if user drags on selected shapes outline, move shape with motion of mouse as long as drag continues~1014
        -if user selects Element>Properties or double-clicks on a shape, call propertiesEditor for selected element(s)~1016
        -if any element, formerly not totally within the display of an area template container, now is, call addElementToAreaTemplate~1018
        -if any element, formerly totally within the display of an area template container, no longer is, call removeElementFromAreaTemplate~1020
        -if user selects Element>Group, call createGroupBox~1022
        -if user selects Element>Vertical Group. call createVBox~1024
        -if user selects Element>Horizontal Group, call createHBox~1026
        -if user types text at cursor position in text container, enter text at cursor~1028
        -if user chooses Text>Insert Object>Shape, call insertShapeInText~1029
        -if user selects text by dragging text cursor over it or dragging selection box around it, call selectText~1030
        -if user selects Text>Character, call characterProperties for selected text~1031
        -if user selects Text>Paragraph, call paragraphProperties for selected text~1032
        -if user selects Text>Style, call textStyle~1033
        -if user selects Element>Style, call shapeStyle~1034
        -if user selects Project>Show Variable List, call variableList~1035
        -if user selects File>Export>Selection, call export for current selection~1036
        -if user selects File>Insert>contentType, call import for contentType~1037
        -if user selects Project>Select Project, call selectProject~1038
        -if user selects Project>Show Records and then selects a job, call jobPreview~1040

FIG. 59

-fileNew~1042
    -display File New dialog box which allows user to pick attributes for, and select to create, a new template~1044
    -if user selects to create a new template~1046
        -create a tree data structure comprised of a document root node, and one page node under it~1048
        -create a default TSL style sheet~1050
        -display template in document window~1052
        -display tree in structure view~1054

FIG. 60

-fileSave~1056
    -display File Save dialog box which allows a user to edit the name of, select a file directory for, and select to save the current template~1058
    -if user selects to save template under a given name at a given directory~1060
        -create an xml representation of the template's tree data structure~1062
        -save xml representation in a template file with the given name and a .xdt file extension in the given directory~1064
        -saves corresponding style sheet under same name with a .tsl file extension in the directory~1066

FIG. 61

-fileOpen~1068
    -display File Open dialog box, which allows user to select a directory and see, and select to open, any .xdt file stored in the selected directory~1070
    -if user selects to open a given .xdt file~1072
        -open the given template file~1074
        -create a tree data structure corresponding to the tree represented by xml in the .xdt file~1076
        -open the corresponding .tsl file~1078
        -display template in document window~1080
        -display tree in structure view~1082

FIG. 62

-createShapeElement (elementType)~1084
    -change mouse cursor to an add-shape-element cursor corresponding to elementType~1086
    -when mouse button is first dragged~1088
        -plant first corner of a bounding rectangle for a shape element of elementType on the screen~1090
    -while mouse button is dragged~1092
        -interactively move a diagonally opposite corner of the bounding rectangle, changing the height and width of the shape during to such motion~1094
    -change mouse cursor to selection cursor~1096
    -create a shape element of the elementType, having a given size and position attributes defined by the first and diagonally opposite at the end of the drag~1098
    -place the element in the appropriate location in the template's tree data structure~1100
    -call selectShape for the element~1102
    -display the element in the document window at the given location~1104
    -update tree's structure view~1106

FIG. 63

-selectShape (shape)~1108
    -make shape selected~1110
    -highlight the outline of the shape in the document window~1112
    -highlight the shape's element in the structure view~1113
    -make visible the drag boxes on the shape's bounding rectangle~1114

FIG. 64

-resizeShape (shape)~1116
    -while drag continues~1118
        -interactively move the one or more sides of the shape's bounding rectangle on which the drag box being dragged is located with that component of the mouse's motion which is perpendicular each such side, as long as the drag continues~1120
    -update shape's size attributes to correspond to those at end of drag~1122
    -update shape's display in document window~1124

FIG. 65

-propertiesEditor (selection)~1126
    -display Properties editor dialog box with currently selected tab shown, displaying for the currently selected tab two columns, the first listing attributes of the selection and the second a user-editable field listing the current value of that attribute for the currently selection~1128
    -if use selects to display other of two tabs~1130
        -display that other tab~1132
    -if user clicks on an attribute value~1134
        -allow user to edit that value if its is changeable, including~1136
            -if user clicks on Source value field of a Properties editor for an image element, ~1138
                -call InsertImageFile~1140
            -if user clicks on the Flex Height or Flex Width behavior value field of a Property editor for an image element~1142
                -convert field to drop-down box offering choice of "None", "Maximize", "Minimize", "Proportional", or "Source Size" values~1144
    -if selection is one or more shapes in template~1148
        -change corresponding attribute value in template's data structure~1150
        -update document window to show selected shapes with the changed attributes~1152
    -if selection is a style~1154
        -change attributes in TSL description of the style's corresponding model in style sheet to reflect such changes~1156
        -update document window to show new attribute values of any shapes in template which has the style, or any styles which depend from the style~1158

FIG. 66

-insertImageFile~1160
    -display Insert Image File dialog box, which allows user to select a directory and see, and select to open, any image file stored in the selected directory~1162
    -if user selects to open a given image file~1164
        -add image's file name to src attribute of selected image element~1166

FIG. 67

-addElementToAreaTemplate~1170
    -select each element which is newly totally inside the area template container~1172
    -perform dialog prompting user to deselect any selected elements not wanted in the area template, and to click a button indicating if remaining selected element are to be added to the area template~1174
    -if user clicks to have remaining selected elements added to the area template container~1176
        -place selected elements in area template container's branch of the template tree~1178
        -deselect all selected elements~1180
        -update document window~1182
        -update tree's structure view~1184

FIG. 68

-removeElementFromAreaTemplate~1186
    -select each element which newly no longer is in the area template container~1188
    -perform dialog prompting user to deselect any selected elements not wanted to be removed from the area template, and to click a button indicating if remaining selected element are to be removed from the area template~1190
    -if user clicks to have remaining selected elements removed from the area template container~1192
        -remove such elements out from under the area template container's branch of template tree data structure~1194
        -deselect all selected elements~1196
        -update document window~1198
        -update tree's structure view~1200

FIG. 69

-createGroupBox~1202
    -add group box to template's tree data structure, with any currently selected elements placed under the group box in the tree~1204
    -update document window to show a selected group box around selected element(s), if any~1206
    -update tree's structure view~1207

FIG. 70

-createVBox~1208
    -add v-box to template's tree data structure, with any currently selected element placed under v-box in tree~1210
    -update document window to show a selected v-box around selected element(s), if any, with the element(s) positioned along a vertical axis according to the horizontal and vertical alignment attributes of v-box~1212
    -update tree's structure view~1214

FIG. 71

-createHBox~1216
    -add h-box to template's tree data structure, with any currently selected element placed under the h-box in tree~1218
    -update document window to show an h-box around selected element(s), if any, with the element(s) positioned along a horizontal axis according to the horizontal and vertical alignment attributes of h-box~1219
    -update tree's structure view~1220

FIG. 72

-insertShapeInText~1221
    -place rectangle in location in template tree data structure corresponding to text cursor's location on screen, splitting any text element in which it is placed into two text elements on either side of it~1222
    -update display of document window to show a rectangle at location on screen of text cursor, as a selected shape~1223
    -update tree's structure view~1224

FIG. 73

-selectText~1225
    -make the text selected~1226
    -display it in reverse video in the document window~1227

FIG. 74

-characterProperties~1228
    -display Character Properties dialog box, which shows values of selected text's attributes and which allows user to change values for individual attributes of selected text, and to select to apply any changed attribute values~1230
    -if user select to apply changed values and any values have been changed in the dialog box~1232
        -change corresponding attribute value of selected text~1234
        -update document window to show text with changed attributes~1236

FIG. 75

-paragraphProperties (selection)~1238
    -if selection is text, make all paragraphs in which selected text occurs selected~1240
    -display Paragraph Properties dialog box, which shows text attribute values for the selection, allows a user to change values for individual attributes displayed, and allows users to select to apply any changed attribute values to the current selection~1242
    -if user selects to apply changed values and any values have been changed in the dialog box~1244
        -if selection is a style~1246
            -change attributes in TSL description of the style's corresponding model in style sheet to reflect such changes~1248
            -update document window to show new attribute values of any text in template which has the style, or any styles which depend from the style~1250
        -if selection is text~1252
            -change attributes of paragraphs in which the selected text occurs to reflect such changes~1254
            -update document window to show new attributes of selected text~1256

FIG. 76

-textStyle~1260
    -display Define Styles dialog box~1262
    -if user selects "new"~1264
        -display New Style dialog box which allows a user to enter a name for the style and the name of the parent style~1266
        -if enters name of new style with a value selected for a parent style and clicks OK~1268
            -call paragraphProperty for style with attribute values of parent style~1270
    -if user selects "edit"~1272
        -show dialog box which allows user to select a style by name~1274
        -if user selects "Properties" for a named style~1276
            -call paragraphProperty for style~1278

FIG. 77

-shapeStyle~1286
    -display Define Styles dialog box~1288
    -if user selects "new"~1290
        -display New Style dialog box~1292
        -if enters name of new style with a value selected for a parent style and clicks OK~1294
            -call propertiesEditor for style with attribute values of parent style~1296
    -if user selects "edit"~1298
        -show dialog box which allows user to select a style by name~1300
        -if user selects "Properties" for a named style~1302
            -call propertiesEditor for style~1304

FIG. 78

-variableList~1312
    -display variable list~1314
    -if user drags from a given variable on the list~1316
        -change mouse cursor to an add-type icon corresponding to selected variable's type~1318
        -while mouse button is down~1320
            -drag add-type icon on screen with the mouse cursor, with the icon having a plus if it is over a location in which it can be dropped~1322
        -if mouse button is released at time when the icon has a plus~1324
            -if variable has not been dropped in container which can accept its type~1326
                -create a corresponding container element which can hold its type in the appropriate place in template's tree data structure~1328
            -if variable is a text element~1330
                -if variable was dropped in the middle of an existing text element~1332
                      -in template's tree data structure, split the existing text element into two, each holding the text on one side of the place where the variable was dropped ~1334
                -create a new text element corresponding to the variable and place it in the proper place in the template's tree data structure~1336
                -place a data_tag attribute having a value equal to the variable's name on the new text element, converting it into a variable element~1338
            -else place a data_tag attribute having a value equal to the variable's name on its corresponding container element in the template's tree data structure, making that container element into a variable element~1340
            -update document window to reflect insertion of any container elements~1342
            -update tree's structure view to reflect insertion of variable element, including display of the variable's name next to its associated variable element~1344
    -if user selects Remove in variable list ~1346
        -if selected element is text variable element~1348
            -remove text variable element from template's tree data structure~1350
        -else~1352
            -remove data_tag and variable name of selected variable element from the selected element in the template tree data structure~1354
    -update document window display~1356
    -update tree's structure view~1358

FIG. 79

-export (contentType, selection)~1360
    -display dialog box with which allows user to select a directory, to select a file type, to see all files of the selected file type in the selected directory, to edit a selected file name, and to select to save the selection~1362
    -if user selects to save the current selection in a file of the appropriate content type~1364
        -save the selection in a file of the selected type in the selected directory under the selected file name~1366

FIG. 80

-import (contentType)~1368
    -display dialog box which allows user to select a directory, to select a file type, to see all files of the selected file type in the selected directory, to pick a selected file name, and to select to open the selected file~1370
    -if user selects to open and a file has been selected~1372
        -change mouse cursor to an add-type icon corresponding to selected content type~1374
        -while mouse button is down~1376
            -drag add-type icon on screen with the mouse cursor, with the icon having a plus if it is over a location in which it can be dropped~1378
        -if mouse button is released at time when the icon has a plus~1379
            -if content has not been dropped in container which can accept its type~1380
                -create a corresponding container element which can hold its type in the appropriate place in template's tree data structure~1381
            -if content is a text element~1382
                -if content was dropped in the middle of an existing text element~1383
                    -in template's tree data structure, split the existing text element into two, each holding the text on one side of the place where the content was dropped~1384
                -create one or more text elements corresponding to the content and place it in the template's tree data structure~1385
            -else if content is an image file~1386
                -give the src attribute of its image element a value equal to the selected file's name~1387
            -else insert content as a child under the container into which it has been dropped in the template's tree data structure~1388
    -update document window to show inserted data~1390
    -update tree's structure view~1392

FIG. 81

-selectProject~1394
    -display Select Project dialog box, which allows user to select a directory, to see projects in selected directory, to select one such project, and to select to open a selected project~1396
       -if user selects to open a selected project~1398
           -open the project, including making its variables available to the designer program~1400

FIG. 82

-producer main control loop~1402
    -if user selects File>New Project~1404
       -display New Project dialog box which allows a user select a name and directory for a new project file, and to create and open the named file~1406
    -if user selects File>Open Project~1408
       -display Open Project dialog box which allows a user to select a directory, display the project files in it, and select to open a displayed project file~1410
    -if user selects File>Save Project~1412
       -display Save Project dialog box which allows user to save the current project, including its set of variable and their content-mapping rules, under a selected name in a selected directory~1414
    -if user selects Data>Add Source~1416
       -display dialog boxes which allow user to select a profile data base for use by the project~1418
    -if user selects Edit>Preferences>Additional Content Folders>Add~1420
       -display dialog boxes which allows user to select a MediaBank digital asset management system for use by the system~1422
    -if user selects Template>Add Template~1424
       -display Add Template dialog box which allows user to select a directory, display the templates in it, and select to open a displayed template~1426
    -if user select Variable>Add~1428
       -call variableEditor for a new variable~1430
    -if user double clicks a given variable from variable list ~1432
       -call variableEditor for the selected variable~1434
    -if user selects Job>Add Job~1436
       -call jobSetup for a new job~1438
    -if user double-clicks on a previously defined job name in Project window~1440
       -call jobSetup for the selected job~1442

FIG. 83

-variableEditor (variable name)~1444
    -display dialog box ~1446
    -if user clicks Apply and has made any changes to values of the dialog box's controls~1448
        -incorporate any such changes into a data structure which stores the variable and its content-mapping rule, including~1450
            -if the variable's content-mapping rule is a MediaBank query~1452
                -generating an SQL query template corresponding to rule defined in the dialog box's Definition area, including metadata field names and variable symbols for profile record field name~1454

FIG. 84

-jobSetup~1456
    -display Job Setup dialog box~1458
    -if user selects preview button~1460
        -call jobPreview~1462
    -if user selects submit button~1464
        -call runJob~1466
    -if user select OK Button~1468
        -cause job's attributes to be set the current values in the Job Setup dialog box~1470

FIG. 85

-jobPreview ( job)~1472
    -display jobPreview record selector, with the first record in the selector selected~1474
    -each time a profile record is selected with the record selector~1476
        -call createVariableValueTree for the job's template with the selected profile record~1478
        -call mapVariableValuesIntoVariableElements for document's template and its variable value tree~1480
        -if a portion of the template was previously displayed~1482
            -generate document window of that portion of template with ingested content~1484
        -else~1486
            -generate document window of start of template with ingested content~1488

FIG. 86

-createVaribleValueTree (job, profileRecord)~1490
    -add each variable name in job's template to a temporary variable list~1492
    -for each variable name in temporary variable list~1494
        -call map for variable name, using profileRecord, to obtain a matching value~1496
        -if variable value includes any variable names~1498
            -add each such variable name to the temporary variable list~1500
        -create xml variable value element for variable including~1502
            -if matching value produced for variable name is null and if content-mapping rule had "OK to publish without value" checked~1504
                -include a "suppressed" value for tag's visibility attribute~1506

FIG. 87

-map (variableName, profile record)~1508
    -execute content mapping rule associated with variableName, including~1510
        -if content-mapping rule is a MediaBank Query~1512
            -instantiating variable SQL query by replacing each variable symbol in variable query with value of profile record field named by symbol~1514
            -sending instantiated variable query to MediaBank data base~1516
            -receiving results of query~1518
            -if result is a file, returning name of file as variable name's matching value~1520
            -if result is null, returning null value as variable name's matching value~1522

FIG. 88

-mapVariableValuesIntoVariableElements (template, variableValueTree)~1524
    -add each element in template which has a data_tag attribute to a variable element list~1525
    -for each element in the variable element list~1526
        -find variable value from the variableValueTree corresponding to the name of the variable element's data_tag~1528
        -add any attributes value in the corresponding variable value to the corresponding attribute in the variable element~1532
        -leave variable element's static values for any attribute in effect, unless such a variable attribute value has been added to the variable element, in which case such an added variable attribute value shall be temporarily in effect~1534
        -add any one or more child elements between the start and end tags of the variable value to template's tree as temporary children of the variable element~1536
        -if any child element added to the variable element has a data_tag attribute, add that element to the variable element list~1537

FIG. 89

-runJob (job)~1538
    -until there are no more profile records left in job~1540
        -select next profile record~1542
        -call createVariableValueTree for the job's template with the selected profile record~1544
        -call mapVariableValuesIntoVariableElements for job's template and its variable value tree~1546
        -for each page in template~1548
            -if job is to be sent as HTML~1550
                -call generate HTMLPage~1551
            -if job is to be printed,~1552
                -call printPage~1554

FIG. 90

-generateHTMLPage(job, page)~1556
    -if have information on client's screen size~1558
        -if template's page element has a maximizable width~1560
            -set page element's width to width corresponding to screen~1562
    -call layout for page~1564
    -generate HTML corresponding to layout~1566
    -depending on parameters send HTML file to disk, or over network to client computer~1567

FIG. 91

-printPage(job, page)~1568
    -call layout for page~1570
    -create rasterized page image including~1572
        -for each element in page~1574
            -displaying the element with the size and position calculated for it by page's layout and with all of the element's visual attributes displayed~1576
    -depending on parameters, send page image to printer, to file, or over net to client computer~1578

FIG. 92

-updateScreen(job, page, pageLocatione)~1580
    -determine which elements of current page have to be laid out to generate updated screen, given current location of screen relative to the page~1582
    -for each of elements to be laid out, call layout~1584
    -for each element which has been changed~1586
        -draw image of its portion on screen with element's size and position calculated by page's layout and with all of element's visual attributes displayed~1588

FIG. 93

-layout (shape, availableWidth, availableHeight)~1590
    -if shape's visibility attribute has a suppressed value~1592
        -treat shape for all layout calculations as if it did not exists~1594
        -indicate that there is to be no graphic rendering of shape~1596
    -else~1598
        -if shape includes no elements~1600
            -call layoutEmptyShape~1602
        -if shape is an image element~1604
            -call layoutImageElement~1606
        -if shape includes floating elements~1608
            -call layoutShapeIncludingFloatingElements~1610
        -if shape includes fixed shapes~1612
            -call layoutShapeIncludingFixedElements~1614
        -if shape is an h-box~1616
            -call layoutHBox~1618
        -if shape is a v-box~1620
            -call layoutVBox~1622

FIG. 94

-layoutEmptyShape (shape, availableWidth, availableHeight)~1624
    -if shape has flexible width or height~1626
        -change its width or height, respectively, to smaller of a) availableWidth
        or availableHeight, respectively, or b) its maximum width or height,
        respectively~1628
    -if shape has minimized width~1630
        -set shape's width to its minumum width~1632
    -if shape has minimized height~1634
        -set shape's height to its minimum height~1636

FIG. 95

-layoutImageElement (shape, availableWidth, availableHeight)~1638
    -if shape has flexible width or height~1640
        -change its width or height, respectively, to smaller of a) availableWidth or availableHeight, respectively, or b) its maximum width or height, respectively~1642
        -if one of its dimensions' Flex Behavior attribute has a "proportional" value~1644
            -find maximum possible height and width of a shape having same aspect ratio as the image file to be placed in the image element~1645
            -set image element's current height and width to that maximum possible height and width~1646
    -else~1647
        -for each dimension of shape whose Flex Behavior attribute has a "source size" value~1648
            -set image's size to size of element's associated image file~1649
    -if one of image element's dimensions' Flex Behavior attribute has a "proportional" value~1650
        -set proportional dimension to the length which makes the image element have the same aspect ratio as the image file to be placed in it, given the element's other, fixed length dimension~1652

FIG. 96

-layoutShapeIncludingFloatingElements (shape, availableWidth, availableHeight)~1654
    -if container shape has flexible width or height~1656
        -change its width or height, respectively, to smaller of a) availableWidth or availableHeight, respectively, or b) its maximum width or height, respectively~1658
    -for each child shape having a minimized dimension~1660
        -call layout for the child with availableWidth equal width of container minus (container's margins and child's bumpers) and availableHeight equal height of container minus (container's margins and child's bumpers)~1662
        -treat minimized child for rest of routine as a fixed shape having the size returned by layout~1664
    -lay out the container shape's successive floating text and shape elements onto one or more successive horizontal lines within portion of container shape not occupied by its margins, including~1666
        -for each text element~1668
            -selecting the hyphenation dictionary for its text specified by the value of the language_id attribute for that element~1670
            -laying out the text on portions of one or more lines, including making hyphenation decisions based on the selected hyphenation dictionary~1672
    -if container shape has minimized width~1674
        -set its width to the larger of a) shape's minumum width or b) the width of shape's content plus its margins~1676
    -if container shape has minimized height~1678
        -set its height to the larger of a) shape's minimum height or b) the height of shape's content plus its margins~1680

FIG. 97

-layoutShapeIncludingFixedElements (shape, availibleWidth, availableHeight)~1682
    -if container shape has flexible width or height~1684
        -change its width or height, respectively, to smaller of a) availableWidth or availableHeight, respectively, or b) its maximum width or height, respectively~1686
    -for each fixed or minimized width child shape~1688
        -if child has a minimized width~1690
            -set availableWidthForChild equal max width child could have given width of container shape and its margins, and given the child's position, anchor, and bumpers~1692
        -else set availableWidthForChild equal child's fixed width~1694
        -if child has a flexible height~1696
            -set availableHeightForChild equal max height child could have given height of container shape and its margins, and given the child's position, anchor, and bumpers~1698
        -else set availableWidthForChild equal child's fixed height~1700
        -call layout with availableWidth equal availableWidthForChild; availableHeight equal availableHeightForChild; and with a maximize height attribute being treated as a minimize height attribute~1702
        -place laid-out child shape at a position relative to container shape determined by child's anchor and position attributes~1704
    -if container shape is width minimized~1706
        -call findMinDerivedWidth for container, assigning all of children which have been laid out, their laid-out width, and all non-laid out children their minDerivedWidth to find container's current minDerivedWidth~1708
        -set container's width to the larger of a) its minumum width or b) its current minDerivedWidth minus the width of its bumpers~1710
    -for each non-laid out child~1712
        -set availableWidthForChild equal maximum width child could have given current width of container and its margins, and given the child's position, its anchor, and the width of its relevant bumpers~1714
        -if child has a flexible height~1716
            -set availableHeightForChild equal maximum height child could have given current height of container and its margins, and given the child's position, its anchor, and the height of its relevant bumpers~1718
        -else set availableHeightForChild equal child's fixed height~1720
        -call layout with availableWidth equal availableWidthForChild; availableHeight equal availableHeightForChild; and with a maximize height attribute being treated as a minimize height attribute~1722
        -place laid-out child shape at a position relative to container shape determined by child's anchor and position attributes~1724

FIG. 98A

-if container shape is height minimized~1726
        -call findMinDerivedHeight for container, assigning all children their laid-out height, to find container's current minDerivedHeight~1728
        -set container's height to the larger of a) its minumum height or b) its current minDerivedHeight minus the height of its bumpers~1730
-for each child shape with a maximized height~1732
        -set availableExtraHeightPerChild equal maximum increase in height child could have given current height of container shape and its margins, and given the child's position, its anchor, and the height of its relevant bumpers~1734
        -call allowChildsMaximizedHeight for child with availableHeight equal child's current height plus availableExtraHeightPerChild~1736

FIG. 98B

- layoutHBox (HBox, availableHeight, availableWidth)~1738
    - if HBox has flexible width or height~1740
        - change its width or height, respectively, to smaller of a) availableWidth or availableHeight, respectively, or b) its maximum width or height, respectively~1742
    - set availableExtraWidthPerChild to (HBox's current width minus (width of its margins plus minDerivedWidth returned by findMinDerivedWidth for each child shape)) divided by number of child shapes with flexible width~1744
    - for each child shape with fixed or minimized width~1746
        - call layout for the child with: availableWidth equal to child's minDerivedWidth plus availableExtraWidthPerChild; availableHeight equal to height of HBox minus (its vertical margins and child's vertical bumpers); and if shape has a maximized height, treating it as having a minimized height for call~1748
    - if HBox has minimized width~1750
        - set HBox's width to the larger of a) its minumum width or b) the width of its margins plus the widths of each laid-out (i.e., fixed and minimized width) child and its bumpers plus a width equal to the minDerivedWidth, availableExtraWidthPerChild, and bumper width for each unlaid-out (i.e., maximized width) child~1752
    - set availableExtraWidthPerChild to (HBox's width minus (width of its margins, width of each laid-out child, minDerivedWidth of each maximized width child, and width of all child bumpers)) divided by number of maximized width children~1754
    - for each child having a maximized width~1756
        - call layout for the child with: availableWidth equal to child's minDerivedWidth plus availableExtraWidthPerChild: availableHeight equal to height of HBox minus its vertical margins and child's vertical bumpers: and, if child has a maximized height, treating it as having a minimized height for call~1758
    - horizontally align child shapes within HBox~1760
    - if HBox has minimized height~1762
        - set HBox's height to the larger of a) its minimum height or b) the height of the HBox's margins plus the largest height comprised by the combination of any child and that child's bumpers~1764
    - for each child with a maximized height~1766
        - call allowChildsMaximizedHeight for child with availableHeight equal height of the HBox minus (the height of the HBox's margins and the child's bumpers)~1768
    - vertically align child shapes within Hbox~1770

FIG. 99

-layoutVBox (VBox, availableHeight, availableWidth)~1772
    -if VBox has flexible width or height~1774
        -change its width or height, respectively, to smaller of a) availableWidth or availableHeight, respectively, or b) its maximum width or height, respectively~1776
    -set availableExtraHeightPerChild to (VBox's height minus (height of its margins plus minDerivedHeight returned by findMinDerivedHeight for each child shape)) divided by number of child shapes~1778
    -for each fixed or minimized width child shape~1780
        -call layout for the child with: availableWidth equal to width of VBox's minus its margins; availableHeight equal shape's minDerivedHeight plus availableExtraHeightPerChild; and if child has maximized height, treating it as having minimized height for call~1782
    -if VBox has minimized width~1784
        -set VBox's width to the larger of a) its minumum width or b) the width of its margins plus the largest width of any child shape, using laid-out width plus bumper width for any laid-out children, and the width returned by findMinDerivedWidth for any non-laid-out (i.e., maximized width) children~1786
    -for each maximized width child shape~1788
        -call layout for the child with: availableWidth equal to width of VBox's minus its margins; availableHeight equal shape's minDerivedHeight plus availableExtraHeightPerChild; and if child has maximized height, treating it as having minimized height for call~1790
    -horizontally align child shapes within VBox~1792
    -if VBox has minimized height~1794
        -set VBox's height to the larger of its minimum height or the sum of the heights comprised by each laid-out child plus its bumpers~1796
    -else ~1798
        -set availableExtraHeightPerChild to (VBox's height minus (height of its margins and each child shape plus its bumpers)) divided by number of maximized height children~1800
        -for each child with a maximized height~1802
            -call allowChildsMaximizedHeight for child with availableHeight equal child's laid-out height plus availableExtraHeightPerChild~1804
    -vertically align child shapes within VBox~1806

FIG. 100

-findMinDerivedWidth (shape)~1808
    -if shape is an image element having a "source size" width or height dimension~1809
        for of rest of layout, treat image element as having a fixed length in the source size dimension, which length is equal to the width and/or height, respectively, of the image file mapped into the image element~1810
    -if shape's width is fixed~1811
        -return fixed width plus widths of shape's bumpers~1812
    -else~1814
        -if shape is an image element having a fixed height and proportional width~1816
            -find aspect ratio of image file mapped into image element~1818
            -for rest of layout, treat the element as having a fixed width which maintains the image's aspect ratio, given element's fixed height~1820
            -return with width of element plus its bumpers ~1822
        -if shape is empty or is an image element~1824
            -return shape's minimum width plus width of its bumpers~1826
        -if shape is a text container with floating content~1828
            -return shape's minimum width plus widths of its bumpers~1830
        -if shape contains fixed shapes~1832
            -for each fixed child shape~1834
                -call findMinDerivedWidth for the child~1836
                -find position of child's right edge, given its fixed position, location of its anchor point, and its minDerivedWidth value~1838
            -return with the greatest distance between the left edge of container shape and rightmost edge (including right bumper) of any child, plus the width of the container's right margin and both of the container's horizontal bumpers~1840
        -if shape is an h-box~1842
            -return sum of values produced by calling findMinDerivedWidth for each of h-box's children plus width of h-box's margins and bumpers~1844
        -if shape is a v-box~1846
            -return largest value produced by calling findMinDerivedWidth for each of v-box's children plus width of v-box's margins and bumpers~1848

FIG. 101

-findMinDerivedHeight (shape)~1850
    -if shape is an image element having a "source size" width or height dimension~1851
        for of rest of layout, treat image element as having a fixed length in the source size dimension, which length is equal to the width and/or height, respectively, of the image file mapped into the image element~1852
    -if shape's height is fixed~1853
        -return fixed height plus height of shape's bumpers~1854
    -else~1856
        -if shape is an image element having a fixed width and proportional height~1858
            -find aspect ratio of image file mapped into image element~1860
            -for rest of layout, treat the element as having a fixed height which maintains the image's aspect ratio given element's fixed width~1862
            -return with height of element plus its bumpers ~1864
        -if shape is empty or is an image element~1866
            -return shape's minimum height plus height of its bumpers~1868
        -if shape is a text container~1870
            -return shape's minimum height plus height of its bumpers~1872
        -if shape contains fixed shapes~1874
            -for each fixed child shape~1876
                -call findMinDerivedHeight for the child~1878
                -find position of child's bottom edge, given its fixed position, location of its anchor point, and its minDerivedHeight value~1880
            -return with the greatest distance between the top edge of container shape and bottom-most edge (including bottom bumper) of any child, plus the height of the container's bottom margin and both of the container's vertical bumpers~1882
        -if shape is an h-box~1884
            -return largest value produced by calling findMinDerivedHeight for each of h-box's children plus height of h-box's margins and bumpers~1886
        -if shape is a v-box~1888
            -return sum of values produced by calling findMinDerivedHeight for each of h-box's children plus height of h-box's margins and bumpers~1890

FIG. 102

-allowChildsMaximizedHeight (shape, availableHeight)~1892
    -if shape is an image element with maximized height and proportional width, return~1894
    -set shape's height to smaller of a) its maximum height or b) availableHeight~1896
    -if shape is a container shape having one or more child shapes~1898
        -for each child with a maximized height~1900
            -if child has a fixed location~1902
                -set availableExtraHeightPerChild equal maximum increase in height child could have given current height of the container shape and its margins, and given the child's position, its anchor, and the height of its relevant bumpers~1904
            -if child is in a v-box ~1906
                -set availableExtraHeightPerChild equal to (current height of container shape minus (its margins and the current height of each of child and its bumpers)) divided by number of children with maximized height~1908
            -else~1910
                -set availableExtraHeightPerChild equal to current height of the container shape minus (its margins and the current height of child and its bumpers)~1912
        -call allowMaximizedHeight for child with availableHeight equal child's current height plus availableExtraHeightPerChild~1914
    -if container shape is a v-box, h-box, or text container~1916
        -vertically realign its children ~1918

FIG. 103

APPARATUS, METHODS, PROGRAMMING FOR AUTOMATICALLY LAYING OUT DOCUMENTS

FIELD OF THE INVENTION

The present invention relates to apparatuses, methods, and programming for automatically laying out documents. Many of the invention's aspects relate to such automatic document layout in the context of variable data publishing.

BACKGROUND OF THE INVENTION

Programs have been created in the prior art for laying out documents, such as the pages of books, magazines, brochures, or even individual pages created in a word processor document. Most such programs are also capable of laying out an image of a page, interactively, on a computer screen. Some such programs define a document as a collection of text and shape elements. Such text elements each have text attributes, such as font, size, indentation, etc. Such shape elements include image elements, graphic shapes, and text containers, and can have shape attributes, such as position, size, color, border characteristics, fill color, etc. In many such systems, a user can define a template which includes various text and shape elements, such as the template of a newsletter, a set of related brochures, or a given type of letter, and then users can insert individual content into all, or some of, the template's elements as desired. When the system lays out the document, each element will be displayed with its associated attributes.

In such systems, as the content placed into various elements of a template changes, those elements often change in size. Such size changes can make the template look inappropriate. In systems where the user is entering the variable content manually with a mouse or keyboard, or in which a user has time to review each document for proper layout, it is often acceptable to have a user change the layout to account for such size changes. Nevertheless, even in such applications it would be desirable to have a layout system which can more appropriately automatically adjust to changes in the size of content placed into template elements.

Furthermore, there are many automatic layout applications in which it is quite impractical to have a user individually change the layout of each document. This is particularly true in variable data publishing, in which many different versions of a document are created automatically in response to different data records. FIG. 1 provides graphic representation of variable data publishing. In its highly simplified example, a document 2 is created from a document template 3. The template has variable elements 4, 5, 6, and 7 into which variable values 8, 9, 10, and 11 can be automatically mapped, depending upon the individual record 12 in the Profile Data Source 14 for which the document 2 is being produced. In the example of FIG. 1, the variable values 8, 9, and 10 are simple text (i.e., character string) values taken directly from the values of fields 15, 16, and 17 of a record 12A in the profile data source 14. The variable value 11 is an image contained in an image file 18 selected as a function of the "Sport" field 17 in the profile data source.

Because variable data publishing often maps values which differ in size into variable elements, the appearance of a variable document can vary greatly. Furthermore, for some records, data may be missing for certain variable elements. But since variable data publishing often creates hundreds, or thousands, of different versions of a given document, it would be very costly to have each version's layout individually reviewed and adjusted by a person to compensate for changes in the size of its variable values.

Also, although the relatively simple form of variable data illustrated in FIG. 1 can be very useful, it would be desirable to create a variable data publishing system which provides much greater flexibility in terms of possible content, and yet still tends to do a good job of automatically laying out the resulting documents in a way which is attractive to the eye. For example, it would be desirable to allow a given template to be used to communicate about a greater number of topics, using a greater range of possible variable content, and still have a high likelihood that the automatic layout of the document will look appropriate.

A few prior art systems have allowed the variable values which can be mapped into a template to be comprised of a sub-tree of text and/or shape elements. This greatly increases the flexibility of individual templates, but, if such sub-templates are allowed to vary in size, their use can increase the difficulty of achieving desirable layout. Similarly, it would be desirable to have a system which allows content data, including variable sub-templates, to be used in different templates and still look appropriate given the different size and shape available for it in such different locations.

Another issue in variable data publishing is that it often takes a lot of effort to define the rules used for mapping variable content into the variable elements of a template. In many prior art systems, defining rules to map variable values into a template often requires knowledge of data bases, programming scripts, and data base query languages. These are often different skill sets than those had by many of the graphic artists who are best at designing document templates.

Also it would be desirable in layout systems, including variable data publishing ones, to be able to have a system which makes it easier to create shape elements Which have a matching or coordinated appearance.

SUMMARY OF THE INVENTION

It is an object of the present invention to provide a system for laying out documents that can automatically adjust the layout process in a flexible and often appropriate manner to changes in the size of the contents placed inside document shape elements.

It is another object of the invention to provide such a system for laying out documents which makes it easy to create flexible document templates for use with such a system.

It is yet another object of the present invention to provide a variable data publishing system which provides flexible automatic adjustment in response to changes in the availability, nature, and/or size of variable data which is placed into variable elements of a document template.

It is still another object of the present invention to provide a variable data publishing system which allows more than just the contents of a variable element in a document template to change in response to the mapping of different variable values into those variable elements.

It is yet another object of the present invention to provide greater flexibility in the way in which a variable data publishing system allows document templates and content-mapping rules to be used together.

It is still another object of the present invention to provide greater flexibility in the way in which variable data can be selected for use in variable data publishing.

It is yet another object of the present invention to provide a layout system which allows greater ease and uniformity in the way in which the attributes of both text and shape elements can be defined.

The invention is most accurately described in the claims at the end of this specification, and those claims should be considered part of this Summary Of The Invention. However, to prevent lengthy repetition, the wording of the claims has not been repeated nor closely paraphrased in this section. Instead the following brief summary has been provided here to give a quick overview of the major different aspects of the invention and some of their uses. Since it is impossible to make such a brief overview as accurate as the detailed description contained in the claims, the following summary should not be used to limit the claims in any way. Furthermore, in the interest of brevity, many significant aspects of the invention recited in the claims are not mentioned in this summary, and the failure to mention such aspects here should not in any way be construed as an indication of their lack of importance. Finally, the brief description of the use of each aspect of the invention provided in this section is not, in any way, meant to provide a complete description of that aspect's use, but instead is intended to give the reader a quick indication that each such aspect of the invention has a useful purpose.

According to one aspect of the present invention, a computerized system can lay out a document containing a combination of text and/or shape elements located within a sequence box, such as a vertical group box or a horizontal group box. A user interface enables a user to define such a sequence box, and one or more shape elements in it, including shapes having a minimize and/or maximize property in at least one dimension. The system automatically lays out elements of the document. This includes: a) arranging shape elements placed within the sequence box along the sequence box's sequencing axis; b) minimizing the size given to any shape element which has the minimize property in a given dimension by tending to make the element as small as its contents, if any, will allow in the given dimension; and c) maximizing the size given to any shape element which has the maximize property in a given dimension by tending to make the element expand to encompass space available within the sequence box in the given dimension. This ability to automatically arrange shape elements which can both expand and contract within in a sequence box provides a useful tool for automatically arranging and sizing document elements in response to changes in variable data, particularly which such sequence boxes are nested.

According to another aspect of the invention, a computerized system can lay out a document template represented as a tree-shaped data structure having nodes corresponding to text and/or shape elements, some of which are variable elements. Content-mapping rules map user defined variable values into individual variable elements. The variable values can be sub-trees of text and/or shape element nodes. The user can give a shape element in such a sub-tree a maximize property in one or more dimensions. When a sub-tree value is mapped into a variable element, the root node of the sub-tree is grafted onto the variable element's node in the template's tree structure. The system lays out elements of the tree formed by the combination of the template's tree and sub-trees which have been grafted onto it. If a shape element in such a sub-tree has the maximize attribute in a given dimension, the layout tends to make the given shape element expand to encompass space available in the given dimension, in the location in the document into which the given sub-tree has been mapped. This allows sub-template variable values mapped into locations with differing available space to automatically adjust all, or part of their size, so as to more appropriately fit into such space.

According to a similar aspect of the invention, the user can define a sub-tree variable value to include a given shape into which a variable value can be mapped by content mapping rules, and can select that this given shape have a minimize property in at least one dimension. This will cause the layout of the document to tend to make the given shape element as small as the variable value, if any, mapped into the given shape value will allow in the given dimension. This allows the size of all, or a part of, a sub-template to automatically adjust to the size of its variable content.

According to another aspect of the invention, a computerized system can lay out a document template represented as a tree-shaped data structure comprised of text and/or shape nodes, in which the user can define a node of the tree to be a variable shape element having the maximize or minimize property in one or more dimensions. The layout of such document templates minimizes the size given to variable shape elements that have the minimize property and maximizes the size given to variable shape elements that have the maximize property. This ability to cause a variable shape element's size to be defined either by the space around it or by the size of its own contents increases the ability of a template to make appropriate use of space as the size of its variable contents change.

According to still another aspect of the invention, a computerized system enables a user to select, as an anchor point, one of a plurality of locations on a given shape element within a document, and to vary the size of the contents of the given shape element. When the system lays out the document it can cause the size of the given shape element to be as small as the variable content will allow in one or more dimensions, while holding the given shape element's anchor point fixed, so that other portions of the given shape element expand or contract in response to the varying size of the shape's content relative to the fixed anchor point. This ability to control the direction in which shapes with variable contents expand and contract increases the ability of a template to maintain desired spatial relationships despite such size changes.

According to yet another aspect of the invention, a computerized system can lay out a document including variable image elements into which two dimensional images can be mapped. The system lets a user select a size attribute for a given variable image element in a first dimensions. When the system lays out the document, it gives the variable image element a size in the first dimension specified by the selected size attribute value and can automatically give the image a size in a second dimension which maintain the image's aspect ratio. This allows images mapped into a variable document to be automatically scaled to a desired size without being distorted.

According to still another aspect of the invention, a computerized system, which lays out different custom versions of a variable document in response to data contained in different data sets, can automatically suppress the layout of variable shape elements into which content-mapping rules have failed to map variable shape values for a given data set. This can prevent unwanted space gaps from appearing in the layout of variable documents.

According to another aspect of the invention, the variable elements used in a variable data publishing system each have an associated content type and an associated set of attribute-value pairs. A variable element's content type defines the type of variable value which can be mapped into the variable element. Such content types can include text, image, or template sub-tree. The variable element's attribute-value pairs are used to define the properties of the variable element. In the case of text elements such attributes can include font, size, and color. In the case of shape elements, they can include size, position, and color. The variable values which can be mapped into a variable element of a given content type may include both content of the given content type and values for individual attributes of the variable element. The layout causes the appearance given to a variable element to vary as a function of both the content and attribute values, if any, of the variable value that has been mapped into the variable element. This increases the flexibility of a variable data publishing system by enabling variable values to not only change the content of variable elements, but also their attributes.

According to still another aspect of the invention, a computerized system lays out a variable document, represented as a template of layout elements, some of which are variable elements. The system allows a user to select, from among a plurality of stored content-mapping rule sets, a selected set of such rules which are used to map variable values into the variable elements of the template for a given layout. This provides much greater flexibility in the use of a given template, since it allows a template to be used with different rule sets, such as, for example, rule sets which obtain data from different data bases or rule sets which use different selection criteria.

According to yet another aspect of the invention, a computerized system lays out different custom versions of different variable documents in response to data contained in different data sets. The system stores a plurality of document templates, each including a corresponding set of one or more variable elements, and it stores a set of content-mapping rules for mapping variable values into the corresponding set of variable elements. The system enables a user to select a template from the plurality of stored templates, then uses the content-mapping rule set to map variable values into the variable elements in the selected template, and then lays out the selected template with the variable values that have been mapped into it. This allows the effort which has gone into creating a rule set to be used with multiple templates, such as, for example, templates for different forms of a given document or templates for different documents in a given transaction.

The ability to store templates and rule sets separately indicated in these last two aspects of the invention makes it easier for people will skills in graphic arts to design templates and those with skills in data base technology to create rule sets.

According to still another aspect of the invention, a computerized system lays out different versions of a variable document template for different data sets that include corresponding fields. The content-mapping rules stored by the system include variable-query content-mapping rules, each of which defines a data-base query that varies as a function of the value of one or more data set fields. When the system generates a given version of the variable document for a give data set, it generates an instance of the variable query defined by each variable-query content-mapping rule as a function of the value of one or more fields in the given data set. It then sends each such variable query to a corresponding data base. It maps the variable value fetched by the data base in response to each variable query into the one or more variable elements corresponding to the individual variable-query content-mapping rule which defined that query. Then it lays out the variable document with such variable values. Such variable-query content-mapping rules increase the flexibility with which variable values can be mapped into a variable document, since such queries allow variable values to be selected as a more complex function of the data set, or record, for which each variable document is being produced.

According to yet another aspect of the invention, a computerized system produces a visual representation of a document having text and shape elements. The system stores user-defined models which can include both text and geometric models. Each text model defines attributes values for any text element defined by reference to it. Such text attributes can include, for example, font, size, and color. Each geometric model defines attribute values for any shape element defined by reference to it. Such shape attributes can include, for example, size, position, border-type, and color. The system represents the document as a tree of text and shape elements in which each text or shape element can have attributes values associated with it by referencing one of the user-defined text or geometric models, respectively. The system lays out each element of the document with an appearance, position, and size determined as a function of attribute values associated with the element, including attribute values, if any, associated with an element by reference to one of the user-defined models. This allows users to define shape styles in a manner similar to that which other layout programs have allowed users to define text styles, and, thus, increases the ease with which a template designer can create shape elements which share a common look.

The computer systems described in the summary above can be claimed in the form of computer apparatus, in the form of computer programming stored in a computer readable memory, and in the form of computerized methods. It should also be understood, that other aspects of the invention include combining individual aspects of the invention described above.

DESCRIPTION OF THE DRAWINGS

These and other aspects of the present invention will become more evident upon reading the following description of the preferred embodiment in conjunction with the accompanying drawings, in which:

FIG. 4 is the partial representation of the XML contained within one template file of the type shown in FIG. 2;

FIG. 5 is a partial representation of one TSL file of the type shown in FIG. 2;

FIG. 7 is a partial representation of the XML contained in one area template file of the type shown in FIG. 2;

FIGS. 19 through 30 illustrate the effect of selecting different anchor points upon the layout of flexible shape elements.

FIGS. 42 and 43 illustrate the SQL query generated in response to the Variable Editor dialog box shown in FIG. 41, with FIG. 42 showing the SQL query in a variable form, and with FIG. 43 showing the same variable query once it has been instantiated with data from a profile record;

FIG. 46 is a partial version of a pf_data file, which represents all of the variable values that are mapped into a given template for a given document when a given job is run;

FIG. 59 provides a highly simplified pseudo-code description of some of the main control functions of the designer program shown in FIG. 2;

FIG. 60 shows a highly simplified pseudo-code description of the fileNew sub-routine called in FIG. 59;

FIG. 61 shows a highly simplified pseudo-code description of the fileSave sub-routine called in FIG. 59;

FIG. 62 shows a highly simplified pseudo-code description of the fileOpen sub-routine called in FIG. 59;

FIG. 63 shows a highly simplified pseudo-code description of the createShape-Element sub-routine called in FIG. 59;

FIG. 64 shows a highly simplified pseudo-code description of the selectShape sub-routine called in FIGS. 59 and 63;

FIG. 65 shows a highly simplified pseudo-code description of the resizeShape sub-routine called in FIG. 59;

FIG. 66 shows a highly simplified pseudo-code description of the properties-Editor sub-routine called in FIG. 59;

FIG. 67 shows a highly simplified pseudo-code description of the insertimageFile sub-routine called in FIG. 59;

FIG. 68 shows a highly simplified pseudo-code description of the addElement-ToAreaTemplate sub-routine called in FIG. 59;

FIG. 69 shows a highly simplified pseudo-code description of the remove-ElementFromAreaTemplate sub-routine called in FIG. 59;

FIG. 70 shows a highly simplified pseudo-code description of the createGroup-Box sub-routine called in FIG. 59;

FIG. 71 shows a highly simplified pseudo-code description of the createVBox sub-routine called in FIG. 59;

FIG. 72 shows a highly simplified description of the createHbox sub-routine called in FIG. 59;

FIG. 73 shows a highly simplified pseudo-code description of the insertShape-InText sub-routine called in FIG. 59;

FIG. 74 shows a highly simplified pseudo-code description of the selectText sub-routine called in FIG. 59;

FIG. 75 shows a highly simplified pseudo-code description of the character-Properties sub-routine called in FIG. 59;

FIG. 76 is a highly simplified pseudo-code description of the paragraphProperties sub-routine called in FIG. 59;

FIG. 77 shows a highly simplified pseudo-code description of the textstyle sub-routine called in FIG. 59;

FIG. 78 shows a highly simplified pseudo-code description of the shapeStyle sub-routine called in FIG. 59;

FIG. 79 shows a highly simplified pseudo-code description of the variableList sub-routine called in FIG. 59;

FIG. 80 shows a highly simplified pseudo-code description of the export sub-routine called in FIG. 59;

FIG. 81 shows a highly simplified pseudo-code description of the import sub-routine called in FIG. 59;

FIG. 82 shows a highly simplified pseudo-code description of the selectProject sub-routine called FIG. 59;

FIG. 83 provides a highly simplified pseudo-code description of some of the main control functions of the producer program shown in FIG. 2;

FIG. 84 shows a highly simplified description of the variableEditor sub-routine called in FIG. 83;

FIG. 85 shows a highly simplified pseudo-code description of the jobSetup sub-routine called in FIG. 83;

FIG. 86 is a highly simplified pseudo-code description of the jobPreview sub-routine called in FIG. 85;

FIG. 87 shows a highly simplified pseudo-code description of the createVariable-ValueTree sub-routine called from FIGS. 86 and 90;

FIG. 88 shows the map sub-routine called by the createVariableValueTree sub-routine shown in FIG. 87;

FIG. 89 shows the mapVariableValuesIntoVariableElements sub-routine called from FIGS. 87 and 90;

FIG. 90 shows the runJob sub-routine called from FIG. 85;

FIG. 91 shows the generateHTMLPage sub-routine, which is called by the runJob sub-routine of FIG. 90 to produce an HTML layout for a page;

FIG. 92 shows the printPage sub-routine, which is called by the runJob sub-routine of FIG. 90 to create a layout for a printed page;

FIG. 93 shows the updateScreen sub-routine, which is called by both the designer and producer program shown in FIG. 2 to interactively update screen images of the layout of a given template or job in response to changes or selections made by a user;

FIG. 94 is a highly simplified pseudo-code description of the main layout sub-routine, which is called for individual page elements within a template and for all shape elements contained within a page;

FIG. 95 is a highly simplified pseudo-code description of the layoutEmptyShape sub-routine, which is called by the layout routine of FIG. 94 to lay out empty shapes;

FIG. 96 is a highly simplified pseudo-code description of the layoutImageElement sub-routine, which is called by the sub-routine in FIG. 94 to lay out image shapes;

FIG. 97 is a highly simplified pseudo-code description of the layoutShapeIncludingFloatingElements sub-routine, which is called by the layout routine of FIG. 94 to lay out shapes that have floating text or shape elements within them;

FIGS. 98A and 98B are a highly simplified pseudo-code description of the layoutShapeIncludingFixedElements sub-routine, which is called by the layout routine of FIG. 94 to lay out shape elements that have fixed child shape elements;

FIG. 99 is a highly simplified pseudo-code description of the layoutHBox sub-routine, which is called by the layout routine of FIG. 94 to lay out h-box shapes;

FIG. 100 is a highly simplified pseudo-code description of the layoutVBox sub-routine, which is called by the layout routine of FIG. 94 to lay out v-box shapes;

FIG. 101 is a highly simplified pseudo-code description of the findMinDerived-Width sub-routine, which is called by the routines of FIGS. 98A and 98B, 99, and 100 to estimate the minimum width a shape requires to be laid out properly;

FIG. 102 is a highly simplified pseudo-code description of a findMinDerived-Height sub-routine, which is called by the routines FIGS. 98A through 100 to estimate the minimum height a shape requires in order to be laid out properly; and FIG. 103 is a highly simplified pseudo-code description of the allowChildsMaximizedHeight sub-routine, which is called by the sub-routines of FIGS. 98A, 98B, 99, and 100 to maximize the height of elements having maximized height after they have been laid out with a minimized height.

DETAILED DESCRIPTION OF PREFERRED EMBODIMENTS

Figure 2:
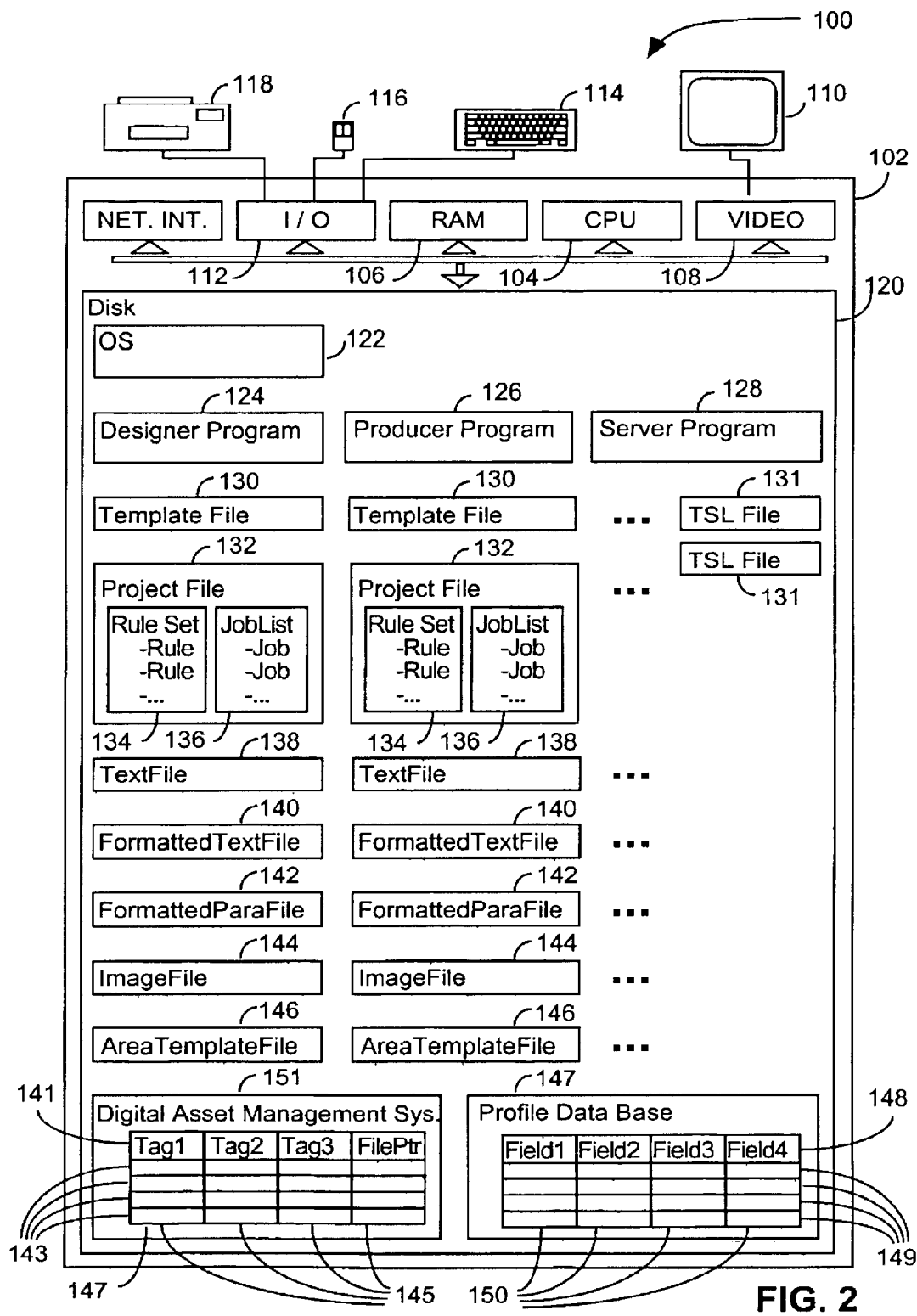
FIG. 2 is a schematic block diagram of a system for performing variable data publishing that embodies many aspects of the present invention.

FIG. 2 illustrates a computer system 100, which forms one possible embodiment of the invention. The system 100 includes a computer 102, which in a preferred embodiment of the invention is a computer running the Microsoft NT operating system, but which in other embodiments of the invention can be any computer having enough power to run a document layout program. The computer 102 includes a CPU 104 for executing instructions; a random access memory (RAM) 106 for storing instructions and data to be used or written by the CPU; a video output device for enabling the computer to create screen images on a computer screen 110; and an I/O device 112 for receiving input from a keyboard 114 and a mouse 116 and for supplying output to a printer 118. The computer 102 also includes a hard disk 120 on which the computer can store programs and data.

The disk 120 includes an operating system program 112, which is the Microsoft NT operating system in the preferred embodiment of the invention, but which in other embodiments in the invention could be Microsoft Windows, the Macintosh operating system, the Sun operating system, the Lenix operating system, UNIX, or any other operating system capable of providing a graphical user interface to a computer. The hard disk also stores three programs that are used in the preferred embodiment of the present invention, a designer program 124, a producer program 126, and a server program 128.

Figure 3:
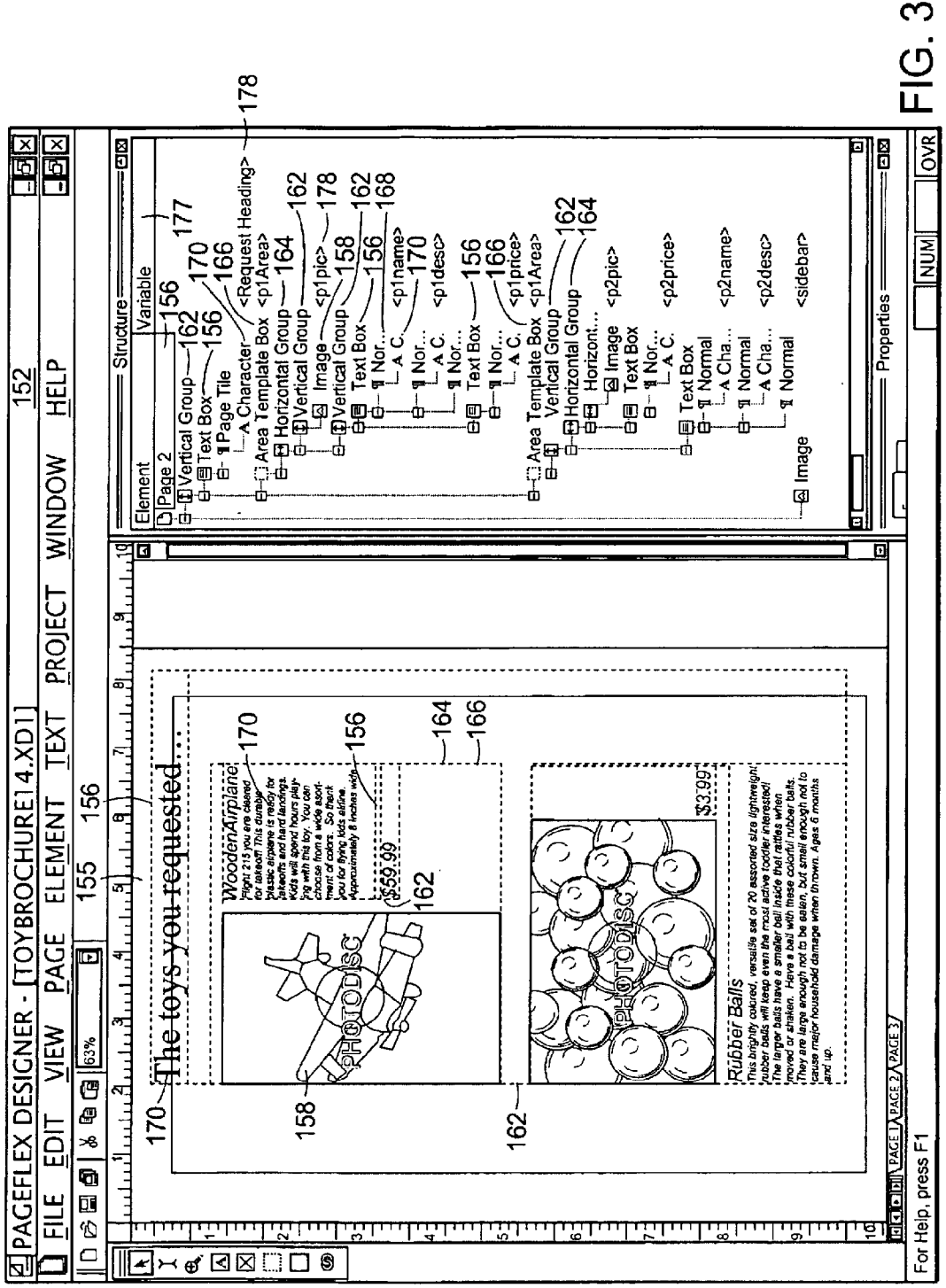
FIG. 3 is a graphical user interface window produced by the designer program shown in FIG. 2.

FIG. 3 is a screen shot of the graphical user interface (GUI) window of the designer program 124 shown in FIG. 2. This program provides a user interface for creating, opening, editing, and saving the template files 130 shown symbolically in FIG. 2. The designer window 152, shown in FIG. 3, can be selected to contain a structure view 154 which provides a graphical representation of the shape and text layout elements in the tree-shaped data structure of the template currently being edited by the designer program.

FIG. 4 is a portion of the XML text of the template file 130 corresponding to the template shown in the designer window of FIG. 3. As is well known in the art, XML is the Extensible Mark-up Language. XML is an extensible mark-up language, in the sense that in it a programmer or user is allowed to define new tag types. As will be explained below, in the preferred embodiment, users are allowed to define new tag types for text and shape layout elements. XML is capable of representing hierarchical, or tree-shaped, data structures in the form of tag text. As can be seen by looking at FIG. 4, it normally marks texts, or other elements, by enclosing them between a start and a corresponding end tag. The start tag includes a tag name and zero or more attribute-value pairs in the general form <tagName attribute 1="value1" attribute2="value2" . . . >

The corresponding end tag will have the form
"</tagName>"

The tree-shaped data structure of the template is represented by a nesting of elements between the start and end tags of their parent elements. For example, the entire document starts with a tag "<_DOCUMENT>" labeled with numeral 174 and ends with an end tag that is "<\_DOCUMENT>" labeled with the numeral 174A. Similarly, the tag that starts the representation of page two in the document shown in the structure view of FIG. 3 starts with a tag 176 that contains the tag name "PF_Page_Base" and ends with the tag 176A shown near the bottom of FIG. 3, which has the corresponding tag name preceded by a slash. As stated above, by looking at the nested elements of the XML file shown in FIG. 4, one can see the correspondence of those elements to the elements shown in the structure view of FIG. 3 in which corresponding elements have corresponding numerals, with the exception that the end tags of elements have the same numeral with the letter A added.

Once an XML template file is loaded into the designer program, it is translated into a corresponding tree data structure in which the elements of the tree are linked by pointers to increase the speed at which the designer program can process its elements. The elements of a template's tree structure include both shape layout elements and text layout elements.

Shape layout elements include the following: document pages 155; text containers 156, which are rectangular or oval shapes into which text elements can be placed; image elements 158, which are rectangular shapes into which images can be placed; plain group boxes 160, in which included elements have fixed positions relative to a corner of the group box; vertical group boxes 162, in which elements are sequenced along a vertical axis; horizontal group boxes 164, in which included elements are arranged along a horizontal sequencing axis; and area template boxes 166, which are containers into which a sub-tree of the template, having as its root element a shape element, can be placed. Shape elements can also include rectangular or oval graphic shapes that can be created and sized by the user to form graphic designs, such as bars between the sections of a document.

Text layout elements, such as the elements 170 shown in FIG. 3, occur inside text boxes in a floating layout, which means they are laid out along one or more horizontal line occurring within the text box. Text can also be comprised of hierarchical elements. For example, in FIG. 46 the variable text value 398A, which will be mapped, or "ingested", into a variable text element, has three levels of hierarchy: that defined by the "DestinationDescrip" start and end tags, that defined by the "head" and "body" start and end tags, and that defined by the "bold" start and end tags. The text elements can include more complicated sub-trees, including elements comprised of formatting tags that define text attributes for the elements they enclose, elements corresponding to individual paragraphs, one or more possible levels of nested elements comprised of text attributes to be applied to parts of paragraphs or lines of text, and the actual text elements themselves.

In the structure view in FIG. 3 certain template elements have corresponding entries in a variable column 177 shown at the right hand side of the structure view. Each such entry is a variable name that occurs between left and right arrow characters, "<" and ">", respectively.

Each such variable name indicates that its corresponding template element is a variable element, meaning that it is an element into which a variable value can be mapped when the template is used to produce a set of one or more variable data documents. As can be seen from FIG. 4, the XML equivalent of a variable element shown in the structure view includes within its start tag an attribute-value pair 180, which starts with the text "data_tag=" and is followed by a string in quotation marks corresponding to the variable name shown in the variable column 177 of FIG. 3. As will be explained below, when a set of one or more variable documents is produced for a template, each variable element in the template will have a variable value mapped into it with a content-mapping rule having the same variable name as the variable element. The template, which is partially shown in FIG. 4, has statically defined default values, both for its content values, i.e., its portions contained between its start and end tags, and for each of the attributes that has an attribute-value pair in its start tag.

As is explained below in more detail, when a variable value is mapped or ingested, into a variable element, the variable value's content will replace that of the variable element and any attribute-value pairs included within the variable value's start tag, and will replace the value of any corresponding attribute-value pair contained within the variable element.

As shown in FIG. 3, the designer program's GUI window also has a document window 155, which provides an interactive display of the layout of that portion of a selected page of the current template that fits within the layout window. In FIG. 3, elements shown in the document window 155, which correspond to those in the structure view 154 have corresponding numerals. This allows a user to see the laid-out appearance of various elements in the template as the user creates or changes them. The structure view and the document window also allow a user to see a given template with variable data that has been ingested into it according to a given document creation job.

The system shown in FIG. 2 also includes, in addition to the designer program, a producer program that enables a user to produce and define document creation jobs, each of which can create a set of one or more variable data documents based upon a selected template that has been produced by the designer program 124. The producer program enables a user to create one or more project files 132, shown schematically in FIG. 1. Each such project file contains a set 134 of content-mapping rules, each of which has a variable name, for mapping variable values into variable elements of a template that have the corresponding variable names.

The rules in the rule set of a project file are often called variables. This is because each of them has a variable name. When a rule set is used to map variable content into a template, there should be one content-mapping rule, or variable, having a variable name corresponding to each variable element in the template or and each variable element, if any, contained within any variable sub-tree mapped into the template.

A project file can also include a job list 136, which can include one or more jobs, each of which specifies how one or more documents are to be produced by using the content-mapping rule set of the project. Each job specifies the template to be used with the project file's content-mapping rule set to produce the document set, the set of profile records that are to be used to supply data to the content-mapping rule set for the production of each document in the set, and the output format in which the documents are to be produced.

The content-mapping rules each map a value into a variable element having the same variable name based on information of a profile record. These profile records are normally selected from a profile database 147 shown in FIG. 2. In this figure this database is shown as a single table 148 comprised of a plurality of profile records 149, each including a plurality of fields 150. In other embodiments other types of databases, such as relational databases could be used.

As is explained below in more detail, some content-mapping rules map the value of a single field in a profile database into a corresponding variable element in a template, but other content-mapping rules are more complicated and can use one or more fields in a profile database to select a content file for inclusion into a given variable element of a template. Such content can include text files 138, which are unformatted text; formatted text files 140, which can include formatted texts by no paragraph boundaries; formatted paragraph files 142, which can include formatted text including paragraph boundaries; image files 144, which can be virtually any type of image file, (in the preferred embodiment they can be TIFF, GIF, JPEG, and encapsulated postscript (EPS) images; and area template files 146, which can contain a sub-tree of template elements including text and/or shape elements.

In the embodiment of the invention shown in FIG. 2, content-mapping rules can also use a digital asset management system 151 to select variable values. A digital asset management system is a database designed to manage digital content files. The digital asset management system includes a database 141, which includes a plurality of records 143, each of which includes a pointer 147 to a content file, which could be a files path name or network address, and one or more metadata fields 145 associated with each such file pointer. As is explained in more detail below, a content-mapping rule can associate a variable with a query to a digital asset management system that uses a selection of values for one or more metadata tags 145 to select a content file as the value for such a variable. Such content-mapping rules can cause the metadata tag values used in such a query to be a function of one or more fields in the profile record for which a given document is being produced.

Each template file 130 also has associated with it a TSL. or Template Style Language, file 131 shown in FIG. 2. An example of a part of a TSL file used in the layout of the template illustrated in FIG. 3 is shown in FIG. 5. As shown in FIG. 5, each TSL file is composed of a plurality of model definitions 133, which in FIG. 5 are labeled 133A or 133B. The models 133A are models of shape element types, and the models 133B are models of text element types. Both types of models are written in the same language, have the same format, and can be included in the same file. Shape models define attributes of shape elements and text models define attributes of text elements. Each model is based on the definition of a parent model that is referenced after the colons on the first line of the model's definition. Each model inherits all the attributes of its parent's model, except those which are explicitly overridden by a different value in its own model definition than is contained in the model definition of its parent or other ancestor from which it inherits attribute values. For example, in FIG. 5 the model PF_Area_Template_Base inherits its attributes from the model PF_Box_Base, and PF_Box_Base inherits its attributes from a fundamental, or root level, model called_ box. In the preferred embodiment, root level models are not defined in a TSL file, their definition is part of the layout software that is used by the designer and producer programs. Similarly the example of FIG. 5 shows that the model ToyName inherits its attribute values from the model PF_Paragraph_Base, and the model PF_Para_Base inherits its attributes from the predefined root model_para.

Figure 6:
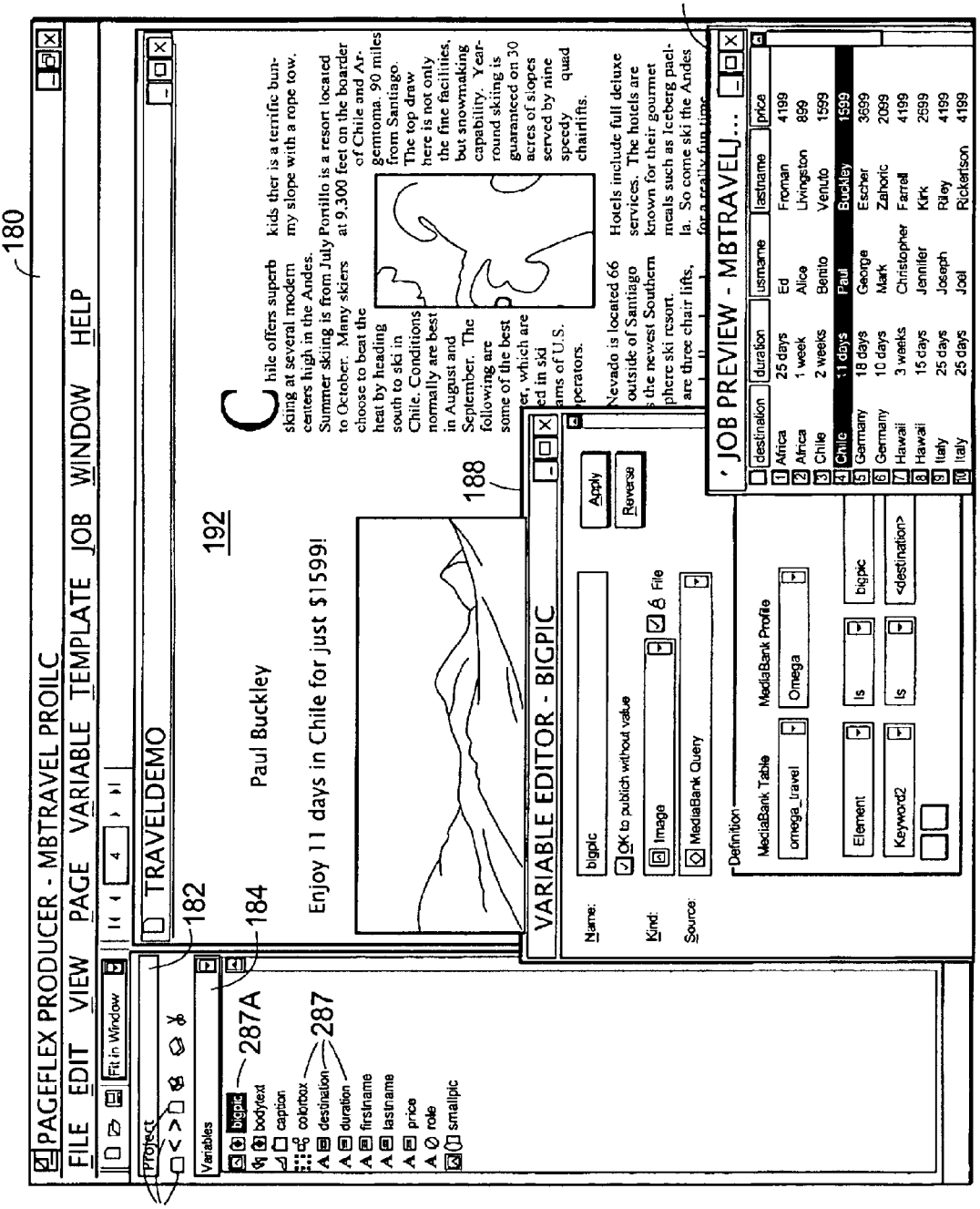
FIG. 6 is a graphical user interface window produced by the producer program shown in FIG. 2.

FIG. 6 is a screen shot of a GUI window 180 generated by the producer program 126 shown in FIG. 2.

This window normally includes a project window 182, which by operation of the selection box 184 or section of one of the icons 186 can be caused to display a list of a selected type of elements important to a given document production project. In FIG. 4, the project window displays the project's variable list, which corresponds to the project's set of content-mapping rules 134 shown in FIG. 2. This window can also be used to show the list of jobs associated with the projects, which is labeled 136 in FIG. 2.

If a user selects a given variable name 287 in the variable list, such as the variable bigpic 287A shown highlighted in FIG. 6, a Variable Editor dialog box 188 will appear showing the definition of the content-mapping rule associated with that variable name. Within the producer program, a user can also choose to display a job preview window 153, which enables a user to see the values of the records from a profile database 147 shown in FIG. 2, which have been selected for use with a given job, and enables a user to click on a given record within that set and to see a layout of the template associated with the job in a document window 192. The mapping of different variables in to a given template that results from selecting different profile records in a given job can cause substantial changes in the appearance of a template. This is particularly true since entire template sub-trees can be mapped into a template by the use of variable area template elements.

Figure 8:
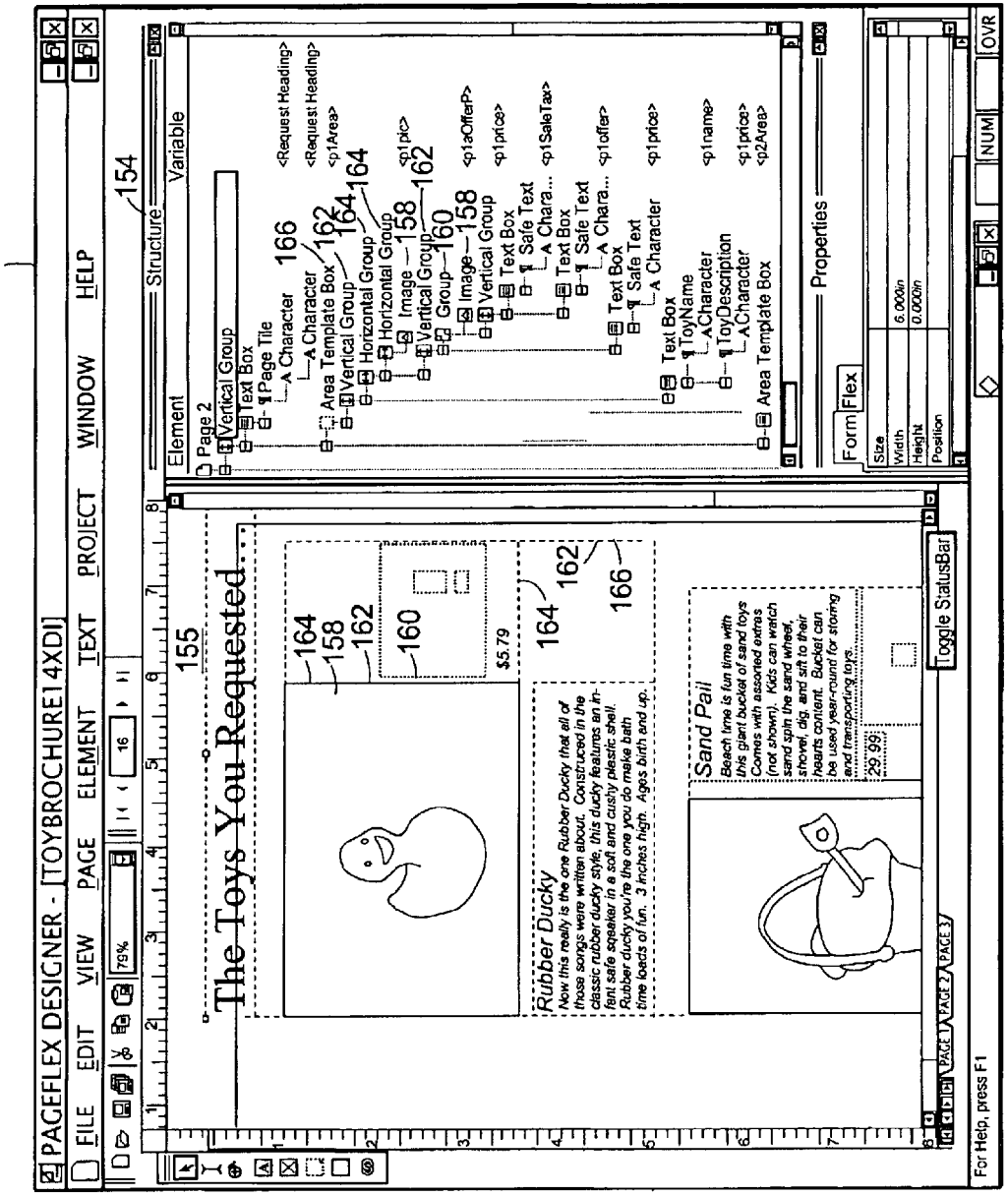
FIG. 8 shows a graphical user interface window of the designer program, similar to that shown in FIG. 3, after an area template corresponding to that partially shown in FIG. 7 is mapped into the template displayed by such designer window.

FIG. 7 illustrates a portion of an area template file, of the type labeled 146 in FIG. 2. It shows that such a file is composed of an XML tree-shaped data structure similar in structure to a part, or sub-tree, of a template file. The contents of such files can have their contents dynamically mapped into an area template container that is a variable element. FIG. 8 is a picture of the designer program window shown in FIG. 3 after the contents of the area template file shown partially in FIG. 7 has been mapped into the variable area template box element 166 having the variable name <p1Area> shown in the structure view in FIGS. 3 and 8. As a result of such a mapping, the default value of the <p1Area> variable area template element, that part indented under that area template element in FIG. 3, is replaced by the elements of the area template shown in FIG. 7. This results both in a change in the structure view 154 and the document window 155 for the template.

Figure 1:
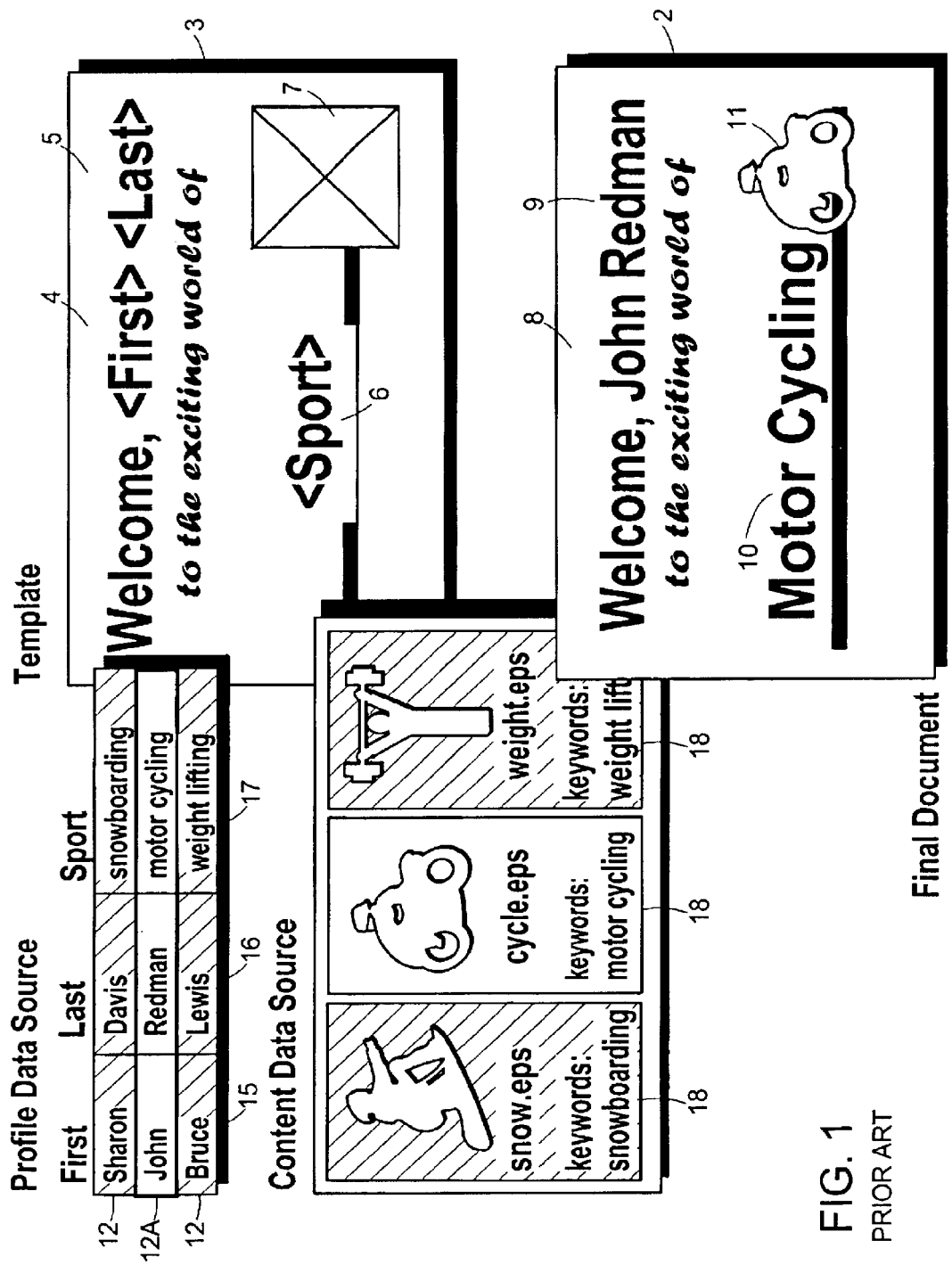
FIG. 1 is a schematic representation of variable data publishing, a technique that has been known in the prior art.

FIGS. 59 through 103 provide a pseudo code description to explain the operations of the invention shown in FIG. 1. Many aspect of this pseudo code have been highly simplified to make it easier to understand. It's purpose is not to communicate the complex details of the system, but rather to convey the more important essentials of how it works.

FIG. 59 is a highly simplified description of the response that the designer program 124, shown in FIG. 2, makes in response to user inputs. In FIG. 59 the structure for making these responses is represented as a control loop.

As shown in step 1002 of FIG. 59, if a user selects a command to create a new file, that step calls the fileNew sub-routine 1042 shown in FIG. 60.

As is shown in FIG. 60, the fileNew sub-routine displays a File New dialog box in step 1044 that allows a user to pick attributes for, and select to create, a new template. If the user selects to create a new template, step 1046 causes steps 1048 through 1054 to be performed. Step 1048 creates a new tree data structure comprised of a document root node, corresponding to the document element represented by the XML start and end tags 174 and 174A, respectively, at the start and end of FIG. 4. Then it creates one empty page node under the document node, such as the page node represented by the tags 176 and 176A in FIG. 4. Then step 1050 creates a default TSL style sheet similar to the style sheet shown in FIG. 5 containing all of the default styles used by the designer program These default styles include all of the styles that start with the characters "PF" shown in FIG. 5. These are the standard text and shape models that all of the designer program's templates start out with. Once this is done step 1052 displays the layout of this simple template in the designer program's document window 155 in FIG. 3, and then step 1054 displays the templates simple tree-shaped data structure in the designer window's structure view 1054.

Returning to the control loop of the designer program shown in FIG. 59, if the user selects to save a file, by selecting the File>Save command in the menu structure of the user interface window 152 shown in FIG. 3, a step 1004 calls the fileSave sub-routine 1056 shown in FIG. 61.

As shown in FIG. 61, the fileSave routine starts by displaying a File Save dialog box in step 1058, which allows the user to edit the name of, select a file directory for, and select to save the current template displayed in the designer GUI window 152 shown in FIG. 3. If the user actually selects to save the current template in this dialog box, step 1060 causes steps 1062 through 1066 to be performed.

Step 1062 translates the current template's tree-shaped data structure from the form in which it is internally represented in the designer program to a corresponding XML representation, of the type shown in FIG. 4. Once this XML representation has been created, step 1064 saves that representation in a template file 130 of the type shown in FIG. 2 with the given name selected in the Save File dialog box followed by a .xdt file extension, which stands for "XML Document Template." This file is saved in the given directory selected in the File Save dialog box. Next, step 1066 saves the current template's corresponding style sheet in the same directory as a file having the same name followed by a .tsl file extension.

Returning to the designer control loop shown in FIG. 59, if the user selects a File>Open command, using the menus of the designer program, step 1006 calls the fileOpen routine 1068 shown in FIG. 62.

As shown in FIG. 62, step 1070 of this routine displays a File Open dialog box that allows a user to select a directory, and select to see and open any .xdt file (i.e., XML designer template file) stored in the currently selected directory. If the user selects to open a given xdt file, step 1072 causes steps 1074 through 1082 to be performed.

Step 1074 opens the selected template file. Step 1076 creates an internal representation of the tree-shaped data structure represented by the opened XML template file. Next, step 1078 opens the .tsl, or style sheet file, having the same name proceeding the file extension as the template file that was just opened. Then step 1080 creates a display in the document window of the template that has just been opened using the attributes contained in the TSL file to determine how each element defined by reference to such to a model contained in the .tsl file will be displayed. Then step 1082 displays the template's tree-shaped data structure in the structure view 154 of the designer window shown in FIG. 3.

Returning to the designer control loop of FIG. 59, steps 1008 through 1014 of that figure relate to the creation, positioning, and sizing of shape elements in a template.

The designer window 152 shown in FIG. 3 contains a toolbox 200 shown along the window's left hand edge that contains four shape tools, the text container shape tool 202, the image element tool 204, the area template tool element 206, and the graphic shape element tool 208. As shown in step 1008 of FIG. 59, if a user clicks on any of these shape tools 202 through 208, the createShapeElement sub-routine 1084, shown in FIG. 63, is called for the tool's corresponding shape type.

As shown in FIG. 63, when the createShapeElement sub-routine is called, step 1086 changes the mouse cursor to an add-shape-element cursor corresponding to the element type of the respective tool 202 through 208 for which the routine has been called. This cursor has the same appearance as the icon for the selected tool 202 through 208, with the addition of a small plus sign to one side when the cursor is over a location in which such an element can be created in the template.

If the user starts dragging on the mouse when it has an add-shape-element cursor, steps 1088 and 1090 will plant the first corner of a bounding rectangle for a shape element of the current element type on the designer program's document window at the location in the layout of the template at which the drag is first started. Then steps 1092 and 1094 will respond to further motion of the mouse while the drag is continued by interactively moving a diagonally opposite corner of the bounding rectangle for the element type, changing the height and width of the shape during such motion. When the user ends the drag, the bounding rectangle is left having the opposite corner located and their respective positions at the time the drag stopped.

At this point step 1096 changes the mouse cursor to a selection cursor, and step 1098 creates a shape element of the current element type (i.e., a text container, an image element, an area template, or a graphic shape element) having the size and position attributes defined by the first and diagonally opposite corners of the bounding box defined at the end of the mouse drag. Then step 1100 places an element of the appropriate element type in the template's tree data structure. Step 1102 calls the selectShape routine for the element, which causes the newly created shape element to be currently selected, and step 1104 displays the element in the document window at its given location, laid out according to its current attributes. Then step 1106 updates designer windows structure window to show the inclusion of the newly created shape.

As is shown in FIG. 64, the selectShape routine called by FIG. 63's step 1102 of the createShapeElement, has a step 1110, which causes the shape for which the routine has been called to be selected, a step 1112, which highlights the outline of the shape in the document window, a step 1113, Which highlights the shapes element in the structure view, and a step 1114, which makes visible drag boxes on the shapes bounding rectangle that are located at each of the bounding rectangles four corners, and in the middle of each of its four sides. These drag boxes enable the user to resize the selected shape by dragging on them.

Returning to the designer control loop of FIG. 59, if a user clicks on a shape or drags a selection box around it, step 1010 calls the select shape routine 1108, just described, for the shape.

If a user drags on one of the drag boxes of a selected shape, step 1012 of FIG. 59 calls the resizeShape routine 1116 shown in FIG. 65.

As shown in FIG. 65, while such a drag continues, steps 1118 and 1120 will interactively move the one or more sides of the shape's bounding rectangle on which the drag box that is being dragged is located. It will cause each such side to move with that component of the mouse's movement which is perpendicular to the side on which the drag box is located as long as the drag continues. As soon as the drag ceases, step 1122 updates the size attribute of the shape element that had been resized by the drag to correspond to those of its bounding rectangle at the time the drag ended. Then step 1124 updates the shape's display in the document window, which requires that it and its children be re-aid out so as to interactively show the user the effect of the change in size upon the appearance of the document whose template is being edited.

Returning to the control loop of FIG. 59, if a user drags on a selected shape's outline within the document window, a step 1014 moves the shape with the motion of the mouse as long as the drag continues, and once the drag terminates, it updates the shapes position attributes and makes corresponding change to the document view.

If a user selects the Elements>Properties in the designer program's menu while one or more shape elements are selected, or if the user double clicks on a shape, step 1016 calls a propertiesEditor routine 1126, shown in FIG. 66, for the selected one or more elements.

Figure 10:
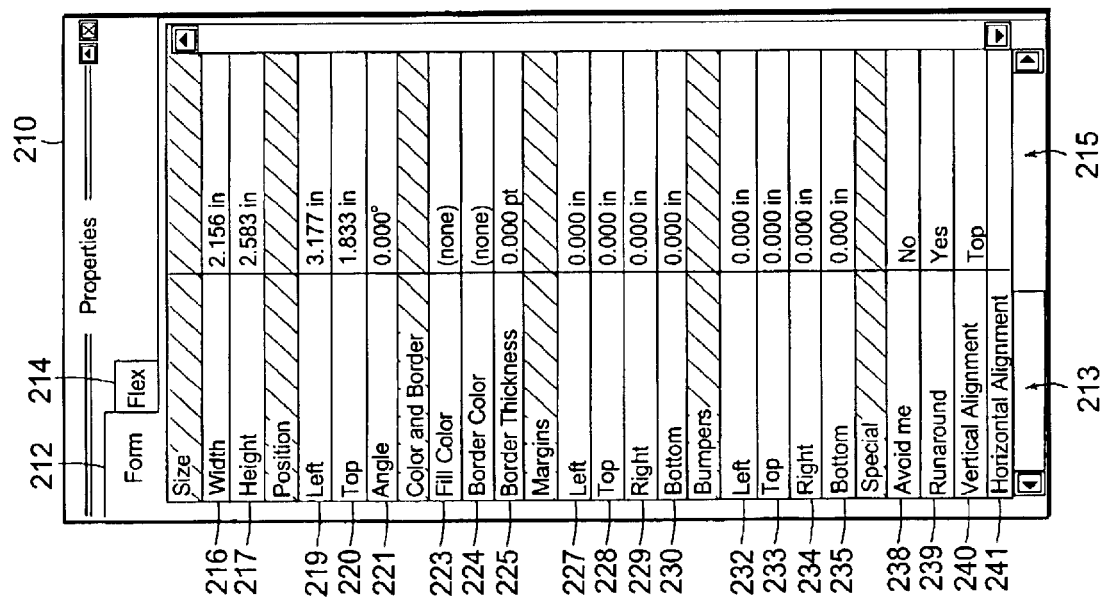
FIGS. 9 and 10 display the form and flex tabs, respectively, of the Properties Editor dialog box of the designer program's graphical user interface window.
Figure 9:
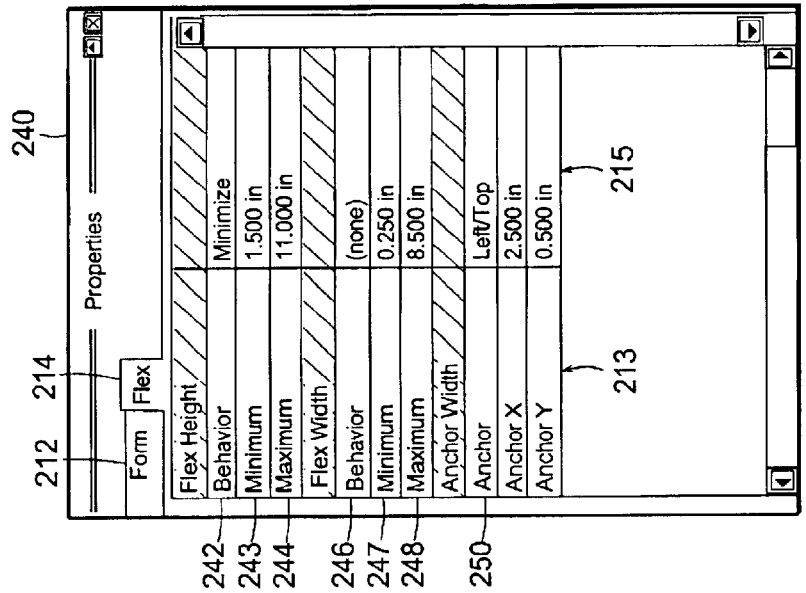

As shown in FIG. 66, this routine has a step 1128, which displays a Properties editor dialog box 210, shown in FIGS. 9 and 10. This dialog box has two tabs; a form tab 212 shown displayed in FIG. 9 and a flex tab 214 shown displayed in FIG. 10. Each such tab has two columns, a left column 213, which lists attributes of the selected one or more items and a second column 215 containing a user editable field listing the current value of the attribute listed on the same row for the current selection.

The flex tab lists the selected shape elements' flex attributes, that is, its attributes that relate to whether or not, and how, it changes size or shape in response to variable content and/or in response to variable amounts of available space when being laid out.

The form tabs displays an element's non-flex attributes. As shown in FIG. 9, an element's non-flex attributes include a width attribute 216 and a height attribute 217, which together define the size of a shape element. The non-flex attributes also include three position attributes, a left attribute 219, a top attribute 220, and an angle attribute 221. The left and top attributes define the xy position of the anchor point for the shape element (often its upper left hand corner) relative to a container shape in which the given shape is located. The angle attribute defines the angle of the shape relative to what would be the vertical axis of the container shape if the container shape itself had an angle attribute of zero degrees. Among other things, this allows horizontal and vertical group boxes, which are described in greater detail below, to be set at a angles which are other than horizontal or vertical, respectively.

The non-flex attributes further include three color and border attributes, including a fill color attribute 223, which defines whether or not the shape has a solid fill color and what that color is; a border color 224, which defines whether or not the shape has a visible border, and if so what its color is; and a border thickness attribute 225, which defines the thickness of the shape's border.

Each shape also has margin attributes including: a left margin attribute 227, a top margin attribute 228, a right margin attribute 229, and a bottom margin attribute 230. These define the minimum distance between the boundary of the shape and the allowed position for any included child shape or text elements whose positions are not fixed relative to their parent shape.

Each shape element has four bumper attributes: a left bumper attribute 232, a top bumper attribute 233, a right bumper attribute 234, and a bottom bumper attribute 235. These define an external margin around the shape element upon which other shape are often not allowed to overlap.

Finally, each shape element includes three special attributes, including the avoid me attribute 238, the runaround attribute 239, a vertical alignment attribute 240, and a horizontal alignment attribute 241.

Figure 16:
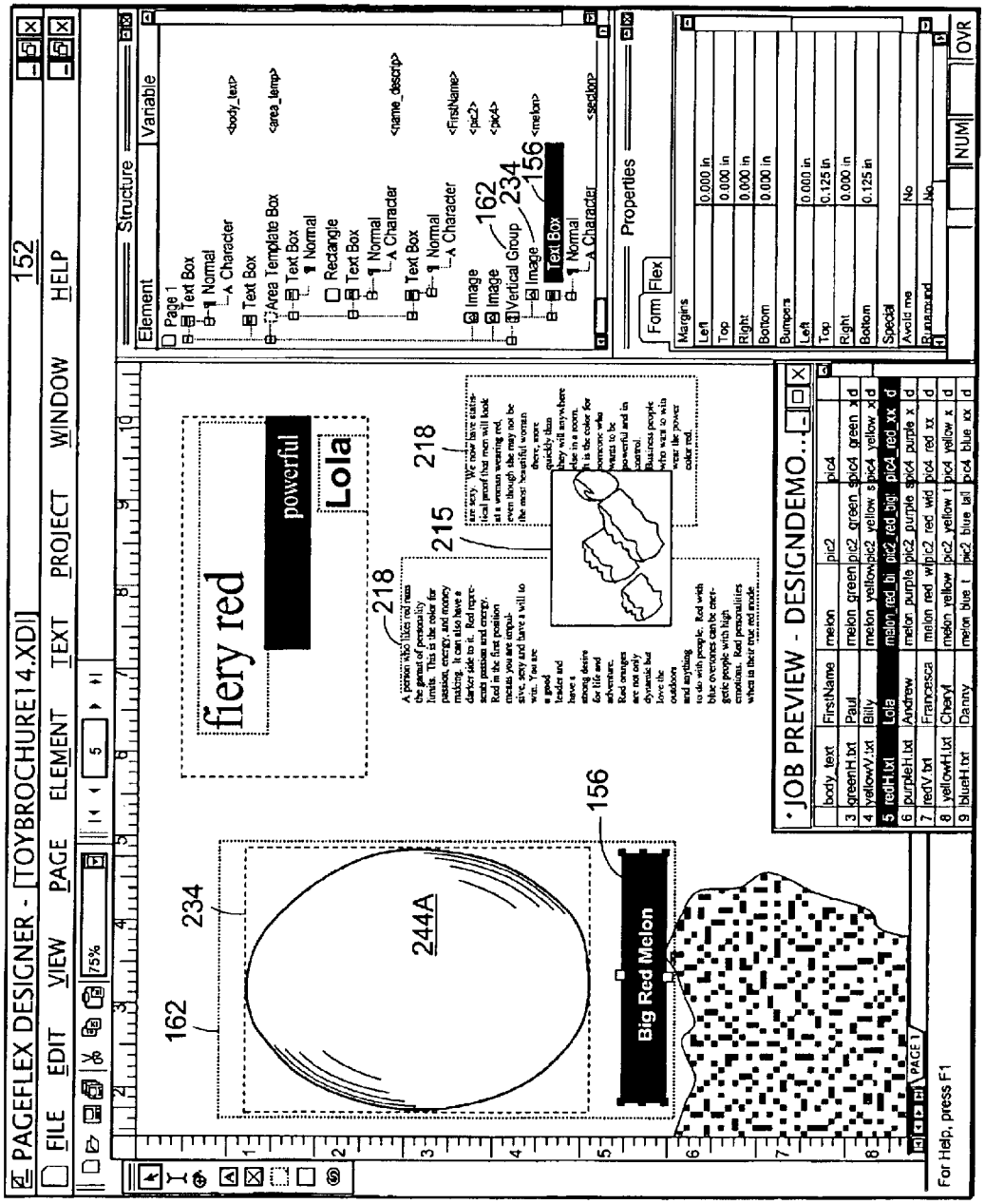
FIGS. 16 and 17 are screen shots of the designer program's graphical user interface window that show how the ingestion of differently sized image values into a variable image element within a vertical box having a minimized height and width affects the appearance of a page's layout.

The runaround attribute will cause text in text containers to run around a shape element that has a yes value for the avoid me attribute. This is illustrated in FIG. 16, in which the text 218 runs around the image shape element 215. A yes value for the runaround attribute for a text element or for a text container shape will cause that text or the text within that shape to run around, or avoid, the space occupied by a shape element having yes for the avoid me property, and that shape's external bumpers.

The vertical alignment properties can have values of top, center, bottom, or justified. The selected value determines the spacing of elements within a container shape that is a sequence box. Similarly the horizontal alignment attribute can have the corresponding values of left, center, right, or justified, and it determines the horizontal alignment of elements within a sequence box containing one or more sub-element shapes.

As shown in FIG. 10 the flex tab of the properties editor dialog box has a behavior attribute 242, a minimum attribute 243, and a maximum attribute 244 for the height of the selected shape.

Figure 12:
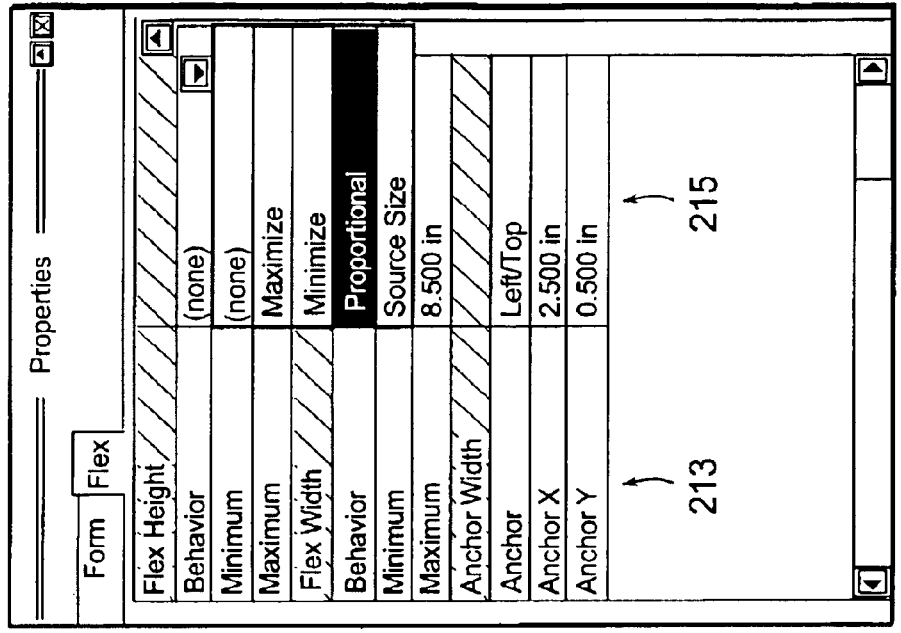
FIGS. 11 and 12 display how a user can set the value of the flex-height-behavior attribute value by using a drop-down list box.
Figure 11:
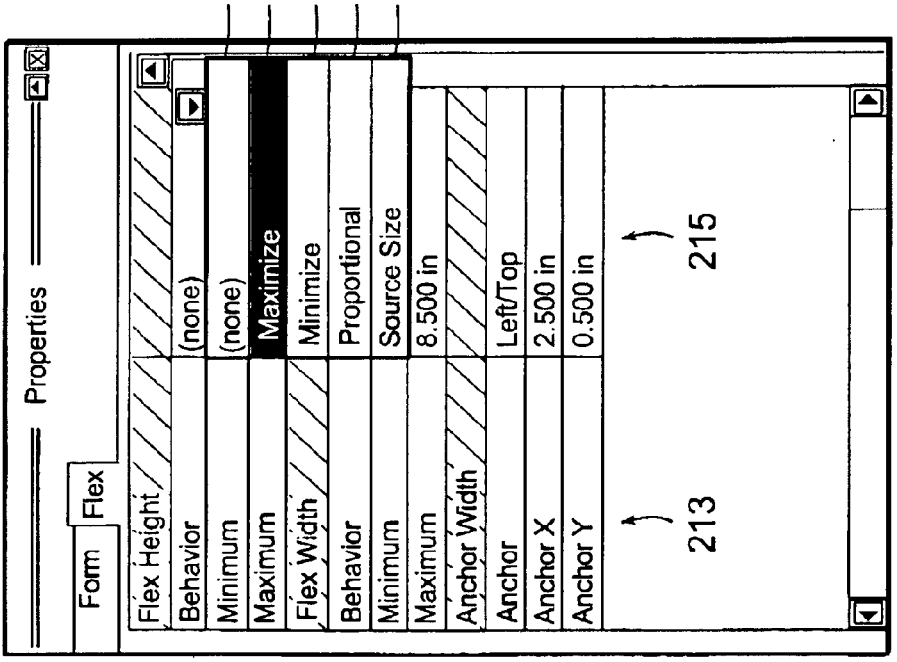

As shown in FIGS. 11 and 12, the flex-height-behavior attribute can be set to one of five values: "none" 256, "maximize" 258, "minimize" 260, "proportional" 262, and "source size" 263. If the shape is not an image element only the "none," "maximize," and "minimize" values are available. If the image element is an image, only the "none," "maximized," "proportional," and "source size" values are available.

If the flex-height behavior is "none" that means the shape has a fixed height, which will be the height defined by the value of the height attribute 217 on the form tab 212, shown in FIG. 9.

If the user selects that the shape has the "maximize" flex-height behavior, the layout process with try to "maximize" the height of the shape, that is, to have it take up all space available for it during the layout process, up to the height defined by the Flex Height Maximum attribute 244 shown in FIG. 10.

If the user selects the "minimize" value for the flex-height behavior, the shape's height will attempt to be as small as possible as is allowed by either the size of the shapes contents plus the shape's internal top and bottom margin attribute values 220 and 230 shown in FIG. 9, or the value of its Flex Height Minimum attribute 243 shown in FIG. 10, whichever is larger. A variable shape element with such a minimized dimension will tend to shrink around the content of variable values which are mapped into it. A non-variable value with a minimized dimension will tend to shrink around the size of variable sub-elements which are contained within it, or around non-variable sub-elements which a placed within it by a user.

If the user selects a "proportional" value 262, shown in FIG. 11, for the flex-height behavior for an image element, layout of the image element will automatically scale the image's height so as to maintain the aspect ratio of the image file is mapped into the image element given its width, whether that width be fixed, maximized or minimized.

If the user selects a "source size" value 263 for the flex-height behavior or an image element, layout of the image element will automatically cause the image element's height to equal the height of the image file mapped into the image element.

Returning to FIG. 10's illustration of the Flex tab of the Properties Editor, the Flex Height minimum attribute 243 specifies the smallest height allowed for the selected shape during layout, regardless of its contents. If the flex-height behavior 242 is "none," then this minimum value should equal the value of the height attribute 217 shown in FIG. 9 for the shape. Similarly, the Flex Height maximum attribute 244 shown in FIG. 10 represents the largest height the shape can have during layout, and this value should equal the value of the height attribute 217 shown in FIG. 9 if the flex-height-behavior attribute 242 is "none".

Each shape element can also have three flex width attributes, a behavior attribute 246, a minimum attribute 249, and a maximum attribute 248, as shown in FIG. 10. Each of these three Flex Width attributes correspond to the similarly named Flex Height attributes 242 through 244, discussed above, except that they relate to width rather than height.

Figure 13:
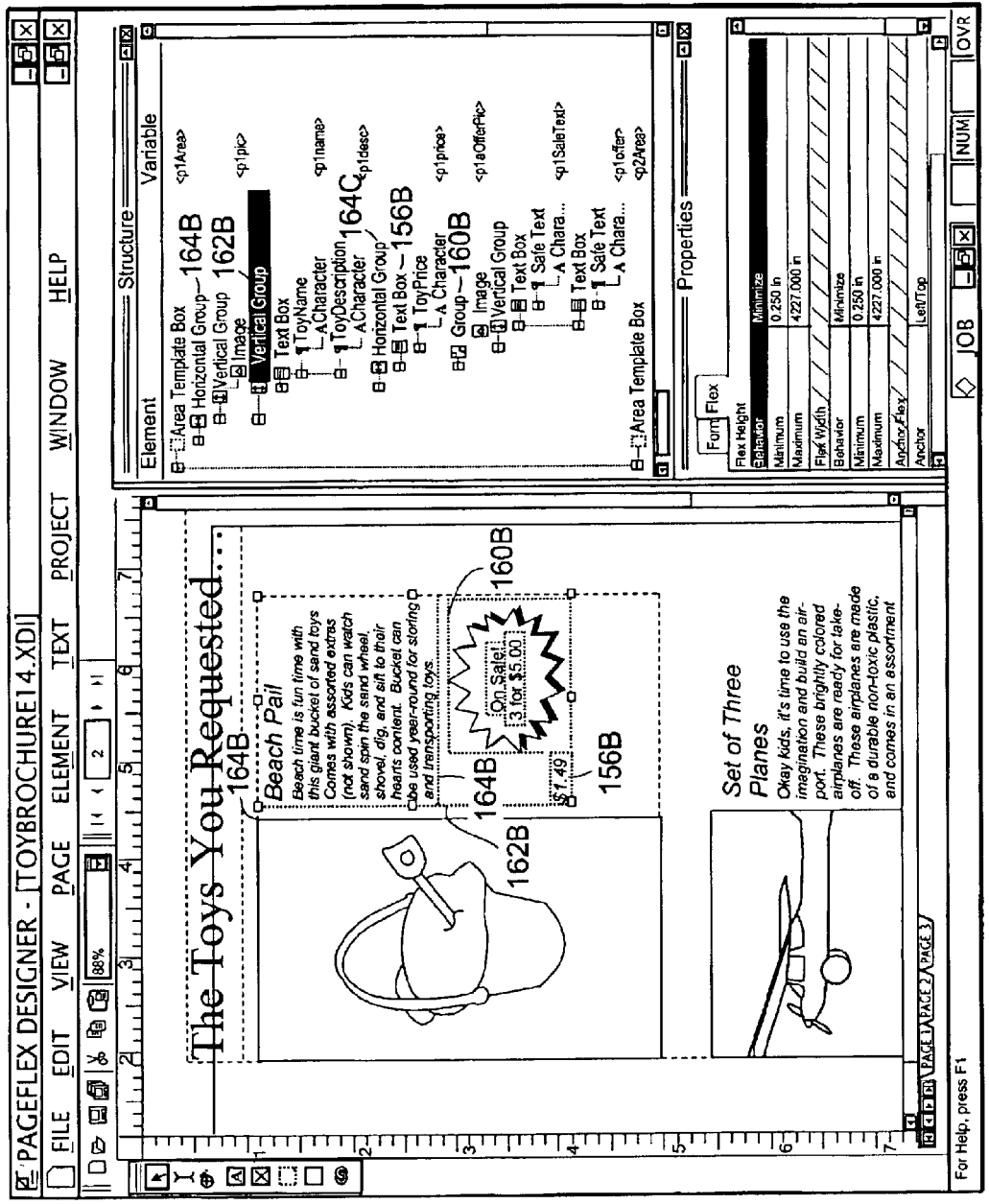
FIGS. 13 and 14 are graphical user interface windows of the designer program that show how changing the flex-height-behavior attribute of a vertical box from a minimized to a maximized value can change the layout of a template.
Figure 14:
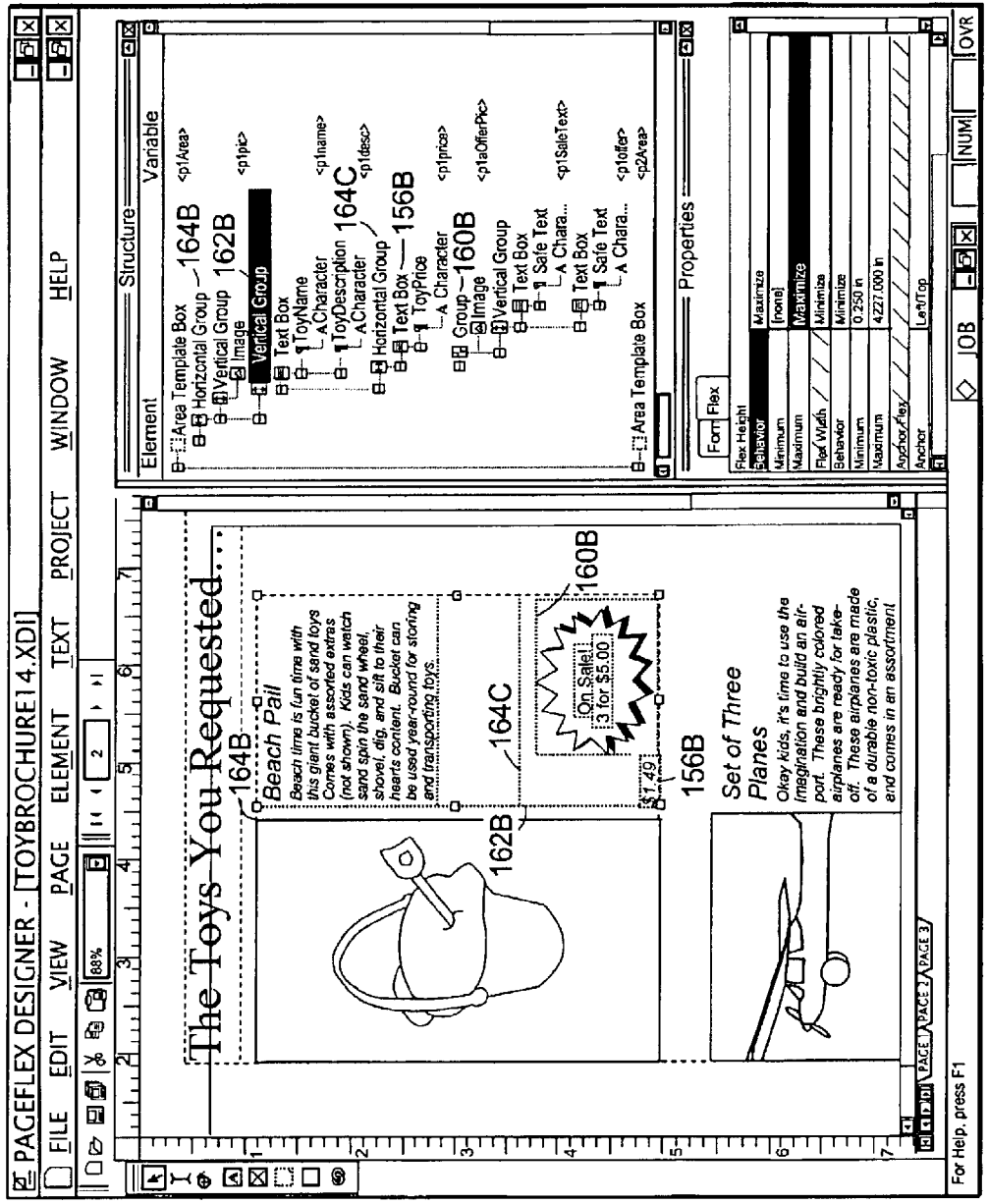

FIGS. 13 and 14 provide one illustration of the difference between the maximize and minimize value for the flex-height-behavior attribute of the vertical 162B shown in those figures. In FIG. 13 the vertical group box 162B has a minimize height, causing the box to shrink in a vertical direction as far at its contents will allow, so as to push up as far as possible the horizontal group box 64C containing the text box 156B and the group 160B at the bottom of the vertical group box 162B, as can be seen in the document window of FIG. 13. FIG. 14 shows the same vertical box 162B, once it has been given a maximized height, which causes this vertical box to expand down as far as will be allowed by the horizontal group box 164B in which it is contained, allowing the horizontal group box 164C to be located just above the bottom of the horizontal group box 164B, as shown in the document window of FIG. 14.

Figure 15:
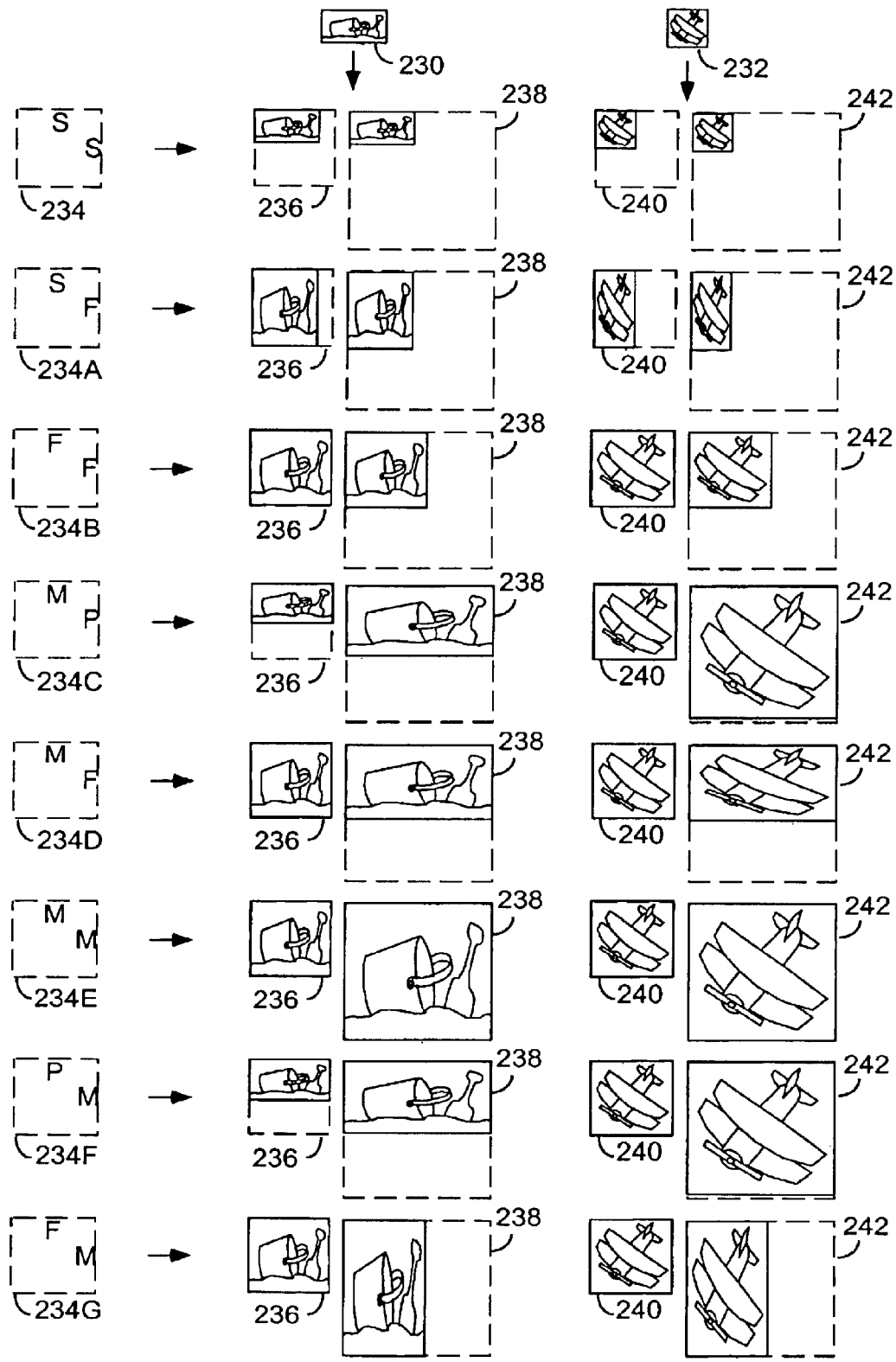
FIG. 15 illustrates how various flex height and flex-width-behavior attribute values affect the appearance of image elements.

FIG. 15 illustrates the effects of the flex height and flex width attribute values upon an image element into which one or more image files are mapped.

FIG. 15 illustrates eight different combinations of flex height and flex width attribute values for image elements 234 through 234G, each of which is represented as a box that has labeled on its top a character representing its flex-width behavior and on its right side a character representing its flex-height behavior. In this figure S stands for the "source size" flex behavior attribute value. F stands for the "none" flex attribute value, which is the fixed-size attribute value. M stands for a "maximized" flex attribute value. Finally, P stands for the "proportional" flex attribute value.

Associated with each image element 234 through 234G is a row of dotted boxes representing the space available for the layout of the image element. The dotted boxes 236 and 238 in a given row, respectively, are a small available space box and a larger available space box in which a first image file is laid out given the size and flex attribute's of the row's associated image element. The dotted boxes 240 and 242 in a given row, respectively, are a similarly sized small available space box and a larger available space box in which a second image file is laid out given the same size and flex attribute's of the row's associated image element.

The first row of FIG. 15 is associated with the image element 234. This image element has the "source size" flex attribute in both its height and width. As a result the image element maintains the size defined by the image file mapped into it, regardless of the amount of space available for its layout.

The image element 234A in the figure's second row has a "source size" flex attribute value in one dimension and a fixed (i.e., "none") attribute value in the other. As shown in the second row of FIG. 15, this causes the laid-out image element to have one dimension with the size of the corresponding dimension in the image file mapped into the image element, and its other dimension to have the image element's fixed size defined by the height or width attribute, 216 or 217, in the form tab shown in FIG. 9, regardless of the amount of space available for the image element's layout.

The image element 234B shown in FIG. 15's third row has both fixed height and width, causing the image element be laid out with the same fixed width and height regardless the size available for such layout and regardless of the size of the image file mapped into the image element.

The image element 234C in the figure's fourth row has a maximized width and a proportional height. This cause the image element to be as wide as it can possibly be while both still fitting within the space available layout space and still maintaining the aspect ratio of the image file being mapped into it.

Image Element 234D in FIG. 15's fifth row has a maximized width but a fixed height. This causes the image element to be as wide it possibly can within the available layout space, and cause it to maintain the element's fixed height regardless of how much that distorts the aspect ratio of the image mapped into the element.

Image Element 234E in the figures sixth row has both a maximized height and width. This tends to cause the image element to occupy the entire space available for the image element in both the height and width direction.

Image Element 234E in the seventh row of FIG. 15 has a maximized height and a proportional width. This tends to cause the image element and the image mapped within it to be as high as it possibly can be within the available layout space while still being able to fit within that space when maintaining the aspect ratio of the image file being mapped into the image element.

Note that in the examples of FIG. 15, the images are exactly the same for the image element 234F, which has a maximized height and proportional width, as they are for the image element 234C, which has a maximized width and proportional height. This is not always the case, but it happens in the examples of FIG. 15 because, given the shape of the images 230 and 232 and given the shapes of the available spaces 236 through 242, width is the limiting dimension while expanding the image files 230 and 232 so as to maintain those image file's respective aspect ratios, whether attempting to maximize width or height. In case of images and available spaces having different shapes, this would often not be the case.

The image Element 234G in the bottom row of FIG. 15 has a fixed width and a maximized height. This tends to causes the image element's height to takes up all of the available height, while keeping the image elements width fixed.

The most commonly used combination of flex attributes for image elements are the one represented by image element 234, in which both the height and width are determined by the size of the image file; and by image elements 234C and 234F in which one dimension is maximized and the other is proportional. This is because these are the only combination of flex attribute values that tend to maintain an image's aspect ratio and thus prevent it from being distorted. For some images, however, particularly those including graphic decorations, such distortion often is not a problem and in such a case other combinations of flex characteristics may be desirable.

Figure 17:
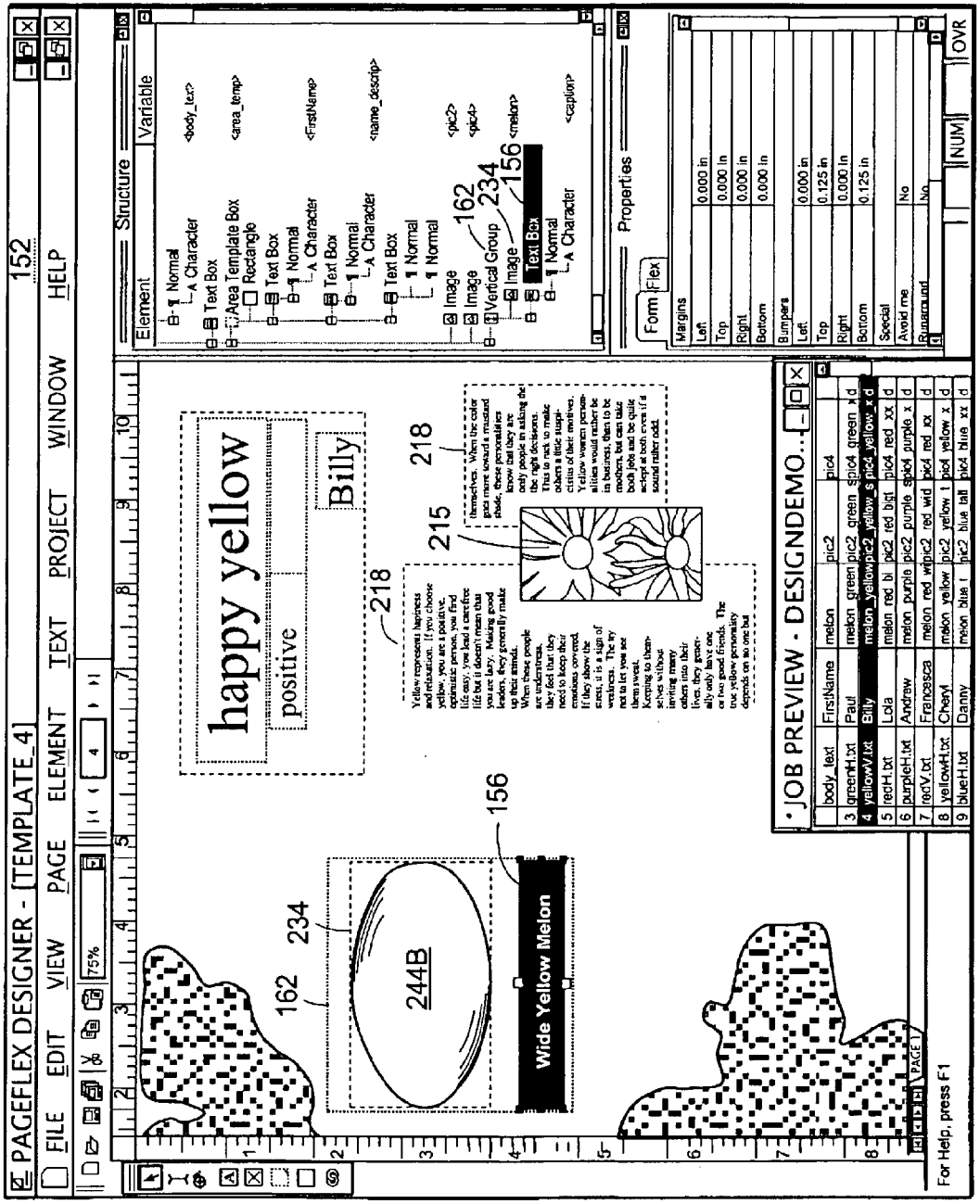

FIGS. 16 and 17 provide an example of the mapping of images having different width and height into an image element 234 (indicated with heavy dotted lines which have been added to the screen shot in those figures), which has the source size flex attribute for both its width and height. The image file 244A, mapped into the image element 234 in FIG. 16, is taller and slightly narrower than the image file 244B mapped into the image element in FIG. 17. The vertical box 162, shown in FIGS. 16 and 17, has minimized height and width attributes that causes it to shrink around the variable size of the image element within it. Both the text box 156 and the image element 234 have top bumpers on them, which cause the top of the text box 156 to be spaced from the bottom of the image element 234 and cause the top of the vertical box 162 to be spaced from the top of the image element 234, as the size of the image element and the vertical box 162 change in response to the variable size of the images placed within the image element 234.

Figure 18:
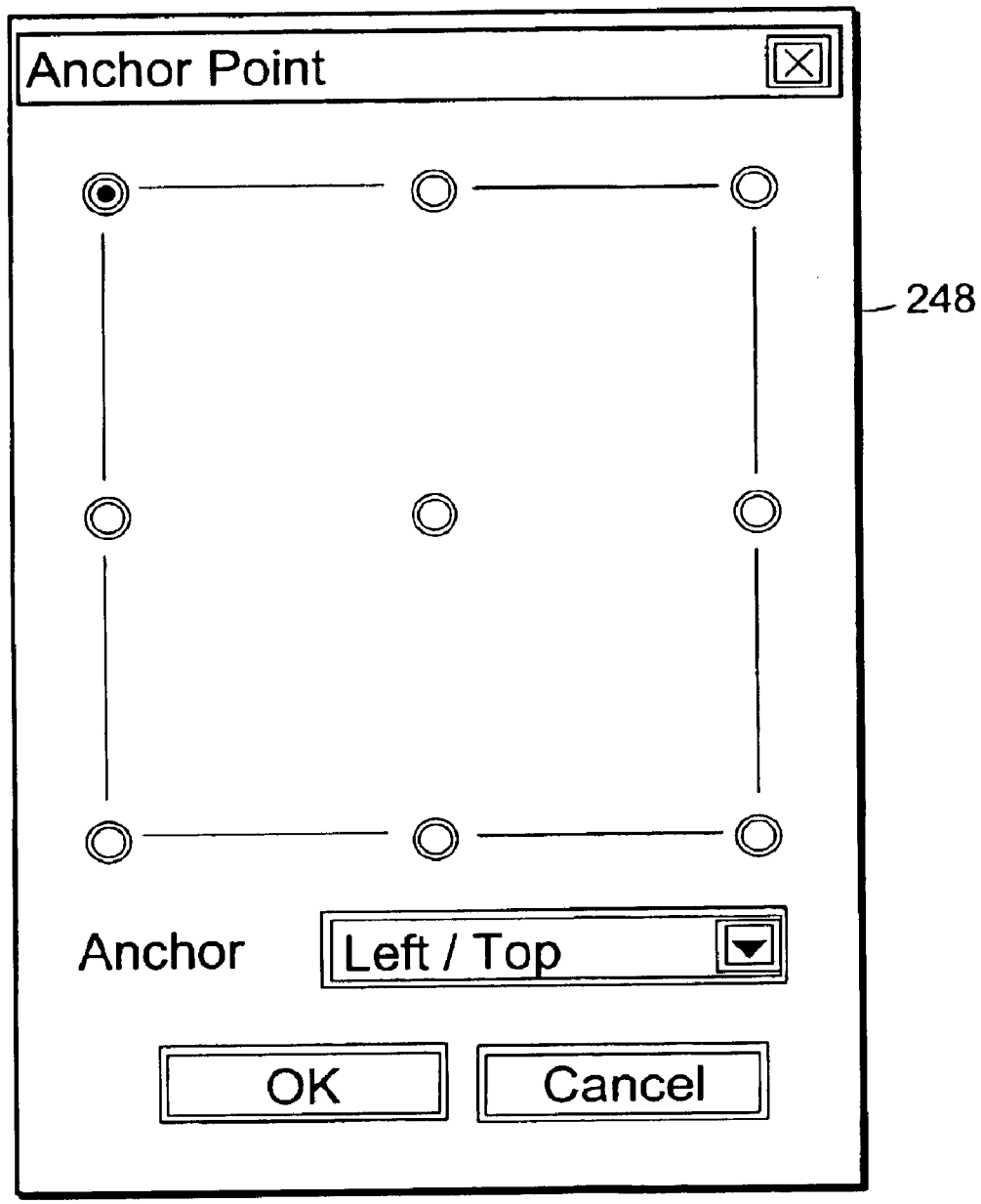
FIG. 18 shows the Anchor Point selection dialog box of the designer program.

FIG. 18 provides-an illustration of the anchor point dialog box 248, which pops up if a user clicks in the variable column element associated with the value of the anchor attribute 250 shown in FIG. 10. This dialog box enables a user to quickly select one of nine possible anchor positions that can be associated with the currently selected shape. The Anchor Point dialog box lets a user select an anchor point at each of the shape's four corners, or in the middle of each of the shape's four sides, or in the center of the shape. If the shape is non-rectangular, for example, if it is an oval text container or graphic shape, the nine selected points will be defined relative to the bounding rectangle that encloses such a shape. The selected anchor point defines that part of the selected shape that will have the fixed position will be defined by the values of the left position attribute 219 and the top position attribute 220 shown in FIG. 9.

Such left and top position attributes are only relevant to shapes contained within parent shapes, including page elements and non-horizontal, non-vertical group elements in which the contained shapes have a fixed location relative to the upper left-hand corner of their parent shapes. The choosing of an anchor point is relevant for shapes that are intended to flex, that is change in height or width.

FIGS. 19 through 30 illustrate the importance of selecting different anchor points for shapes that flex.

FIGS. 19 through 21 show a shape element 250, which has both flexible width and height, having an fixed anchor point 254 in its upper left-hand corner whose position is fixed relative to the parent shape 252 in which it is contained. As can be seen by comparing FIGS. 19, 20 and 21, as the shape 250 expands and contracts in response to variable content, the anchor point 254 remains fixed and only the shape's bottom and right side move in response to such expansion and contraction.

FIGS. 22 through 24 illustrate a shape, 250A, which has a fixed anchor point 254A located in its bottom right-hand corner, fixed relative to the containing shape 252A. In the example of these three figures, shape 250A is only flexible in a width direction although it can easily be understood that, were it flexible in both dimensions, FIGS. 22, 23, and 24 would have an appearance that would be identical to, but diagonally opposite of, that of FIGS. 19, 20, and 21.

FIGS. 25 through 27 illustrate a shape, 250B, which has a fixed anchor point, 254B, located in the center of its top edge. This anchor point is fixed relative to the containing shape 252B. The shape 250B shown in these figures has both a flexible height and width. As can be seen by comparing FIGS. 25 through 27, as the height of the shape 250B changes in response to variable content, the top edge of the shape remains fixed and the bottom edge moves. If the width of the shape 250B changes in response to variable content, the increase or decrease in width is centered about the fixed anchor point, causing the shape's left and right edges to move equally, but in opposite directions, in response to such expansion or contraction.

FIGS. 28 through 30 illustrate a shape 250C, which has a fixed anchor point located in its center, and which has both flexible height and width. As can be seen from these figures, expansion and contraction of the shape 250C in the height or width dimension is centered around the fixed anchor 254C, and any changes in height caused equal but opposite movement in both the top and bottom edges of the shape, and any changes in the shape's width cause equal but opposite movement in the left and right edges of the shape.

As can be seen from looking at FIGS. 19 through 30, the ability to allow shapes to have selective anchor points about which flex occurs, enables a designer of templates to accommodate flex in a variety of aesthetically pleasing ways.

Returning to the propertiesEditor routine of FIG. 66, our discussion of that routine left off with a discussion of how step 1128 displays the Properties Editor dialog box, which has the two tabs shown in FIGS. 9 and 10, and how that dialog box allows a user to edit values of attributes listed in either of those two tabs.

Continuing now to step 1130, if a user selects to display another of the two tab by clicking on it, steps 1130 and 1132 will display the other tab. If a user clicks on an attribute value, steps 1134 and 1136 allow the user to edit that value if the value is changeable for the currently selected shape for which the dialog box has been brought up.

If the selected shape is an image element, the form tab of the Properties Editor dialog box will include a source attribute value, which is not shown in FIG. 9. If the user clicks on this value field of this attribute, the program calls an insertImageFile routine, 1160, shown in FIG. 67.

As shown in FIG. 67, step 1162 of this routine displays the Insert Image File dialog box, which allows a user to select a directory and to see and select open any image file stored in the selected directory. If the user selects to open a given image file using the dialog box, step 1164 causes steps 1166 and 1168 to be performed. Step 1166 adds the image file's name as the value of the source attribute of the selected image element, and step 1168 will update the layout of the document window to show the selected file's image.

Returning to the propertiesEditor routine of FIG. 66, if a user clicks on the flex-height or flex-width behavior value field of a properties editor for an image element, steps 1142 and 1144 convert the field to a drop-down box offering the user a choice of a subset of the "none," "maximize," "minimize," "proportional," or "source size" values for such flex behavior attribute values, as illustrated in FIGS. 11 and 12.

Once the user has changed an attribute value in step 1136 of FIG. 66, if the current selection for which the Properties editor's dialog box has been evoked, if one or more shapes in the current template, step 1148 will cause steps 1150 to change the corresponding attribute value in the template's data structure, and step 1152 will update the layout in the document window to show the selected shapes with the selected attribute values.

If, on the other hand, the Properties Editor's dialog box has been evoked for a given style in the Style Editor, as will be described below, step 1154 will cause steps 1156 and 1158 to be performed. Step 1156 changes the TSL style sheet for the current template to cause any attribute whose value has been changed in the Properties Editor to have a corresponding change made to its value in the given style's model within the TSL style sheet. Then step 1158 will update the layout of the document window to show the new attributes of any shapes in the template that have the edited style or any styles that inherit the edited attribute value from the edited style.

Returning to the designer control loop of FIG. 59, steps 1018 and 1020 relate to the adding or removal of elements from an area template. As indicated above with regard to step 1008, the user can create shapes by clicking on the toolbox icon for a shape shown in the tool bar 200 illustrated in FIG. 3. This includes the area template icon 206, which allows the user to create area templates. As described above, an area template is a sub-tree of a template. The user can create an area template by creating an area template shape and then re-sizing it with drag boxes to include desired elements or groups of elements in the template's data structure. If the user resizes an area template shape to include more elements, or moves old shape elements into or creates new shapes in, the area template shape, step 1018 of FIG. 59 will cause the addElementToAreaTemplate sub-routine 1170 of FIG. 68 to be called.

The addElementToAreaTemplate routine is shown in FIG. 68. As can be seen from that figure, this sub-routine has a step 1172, which selects each element that is newly totally inside the containing area template shape. Then step 1174 performs a dialog, prompting the user to deselect any elements not wanted in the area template and to click a button indicating when and if the remaining selected elements are to be added to the area template. If the user clicks to have the remaining selected elements added to the area template, step 1176 causes steps 1178 through 1184 to be performed.

Step 1178 places the selected elements into the area template's elements branch of the template tree data structure. Step 1180 de-selects all selected elements. Step 1182 updates the display in the document window, and step 1184 updates the tree's structure view so as to show the change to the tree-shaped data structure caused by step 1178.

Returning to the designer control loop of FIG. 59, if the re-sizing of an area template shape, or the moving of any shapes formerly within the area template shape, causes any shapes formerly totally within the area template shape to no longer be so. Step 1020 calls the removeElementFromAreaTemplate's sub-routine 1186 shown in FIG. 69.

As shown in FIG. 69, this sub-routine has a step 1188, which causes each element that is newly no longer within the area template shape within the layout shown in the document window to be selected. Then a step 1190 performs a dialog prompting the user to de-select any of the resulting selected shapes that he does not want to be removed from the area template, and then step 1192 responds to the user's clicking within the dialog box to indicate that he wants the remaining selected items to be removed from the area template by causing steps 1194 to 1200 to be performed.

Step 1194 removes each of the selected elements out from under the area template's branch of the template data tree structure. Step 1196 de-selects all the selected elements. Step 1198 updates the document window if any such updating is needed, and step 1200 updates the template structure view to reflect the removal of elements from the area template's branch of the template's tree.

The addElementToAreaTemplate and removeElementFromAreaTemplate routines of FIGS. 68 and 69 prompt the user to decide exactly which elements he wants to add to or remove from an area template, because the location of elements within a document's layout, as displayed in the document window, does not necessarily correspond to its order within the template's tree-shaped data structure displayed in the structure view. This is because, within pages and non-horizontal or vertical group boxes, elements can be positioned at a fixed distance relative to the upper left-hand corner of such shapes by the value of the left and top position attributes, 219 and 220, shown in FIG. 9. This allows the position of those elements to be independent of their order within their container shape in the tree-shaped data structure. In fact, this even allows shapes to partially or totally overlap, which is sometimes desired for layout purposes. For this reason it is important that the user interface of the addElementToAreaTemplate and removeElementFromAreaTemplate routines allows a user to select exactly which elements located within a given area corresponding to an area template shape in the document window layout of a template are to be included in that area template.

Returning to the designer control loop of FIG. 59, the designer program allows the user to create group boxes, vertical group boxes, and horizontal group boxes by selecting corresponding menu choices under the Element menu of the designer window shown in FIG. 3.

If the user selects Element>Group in the menu, step 1022 calls the createGroup-Box routine 1202 shown in FIG. 70.

As shown in FIG. 70, step 1204 of this routine adds a group box element, such as the element 160 shown in the structure view of FIG. 3, to the current template's tree-shaped data structure and causes any elements that were selected at the time that the group box was created to be placed under the group box in that tree. Then step 1206 updates the layout of the document window to show a selected group box around the selected elements, if any, and then step 1207 updates the tree's structure view to show the changes that have been made in step 1204.

Returning to the control loop of FIG. 59, if the user selects Element>Vertical Group in the designer program's menu, step 1024 calls the createVBox routine 1208 shown in FIG. 71.

As shown in FIG. 71, this routine includes a step 1210, which adds a v-box, or vertical group element, to the template tree's data structure and causes any elements in the template that were selected at the time the vertical box was created, to be placed under the vertical box's element in the template's tree-shaped data structure. Then step 1212 updates the layout in the document window to show the newly created v-box around the previously selected elements, if any, with the elements being automatically distributed along the vertical box's vertical sequencing axis. The v-box's child elements are aligned by using the system's default values for horizontal and vertical alignment, which are left horizontal alignment and top vertical alignment. Finally, step 1214 updates the template's tree structure view.

Returning to the designer control loop of FIG. 59, if the user selects Element>Horizontal Group in the designer program's menu, step 1026 calls the createHBox sub-routine, 1216, shown in FIG. 72.

As shown in FIG. 72, this sub-routine has a step 1218, which creates an h-box, or horizontal group element, and adds it to the template's data tree with any elements that were selected at the time of this creation placed under the newly created h-box within the current template's tree data structure. Then step 1219 updates the layout in the document window to show the newly created h-box enclosing the previously selected elements, if any, with the enclosed elements positioned along the horizontal box's horizontal sequencing axis, using the default horizontal vertical alignment value. Then step 1220 updates the designer program's structure view window to reflect the changes to the template that had been made in step 1218.

Returning to the control loop of FIG. 59, steps 1029 through 1033 shown in that figure allow the user to edit text.

If a user types text at a cursor position within a text container, step 1028 enters the text at the cursor position. Such text is considered floating, since it occurs within one or more successive horizontally displaced lines within the portion of the text container shape not occupied by the text container's internal margins.

If the user selects Text>Insert Object>Shape in the menu structure of the designer program, step 1029 calls the insertShapeInText routine 1221, shown in FIG. 73.

As shown in FIG. 73, this sub-routine contains a step 1222, which places a shape rectangle in the location in the template tree data structure corresponding to the text cursor's location in the document window, splitting any text element in which the cursor might be placed into two text elements on either side of it. Step 1223 then updates the display of the layout of the template in the document window to show a selected rectangle at the location on the screen of the text cursor, as a selected shape. And step 1224 then updates the tree structure's view. Although it is not shown in the pseudo-code, once this rectangle has been created the user has the ability to change the rectangle into either a text container, an image container, an area template container, or a graphic shape.

Returning to the designer control loop of FIG. 59, if the user selects text by dragging a text cursor over it or by dragging a selection box around it, step 1030 calls the selectText routine for the text that the user has so selected.

As shown in FIG. 74, the Select Text sub-routine 1225 has a step 1226, which causes the text for which the routine has been called to be selected. Then step 1227 displays the selected text in reverse video in the document window.

Returning to the control loop of FIG. 59, if the user selects Text>Character in the Designer Window's menu, step 1031 calls the characterProperties sub-routine 1228, shown in FIG. 75, for the selected text.

Figure 31:
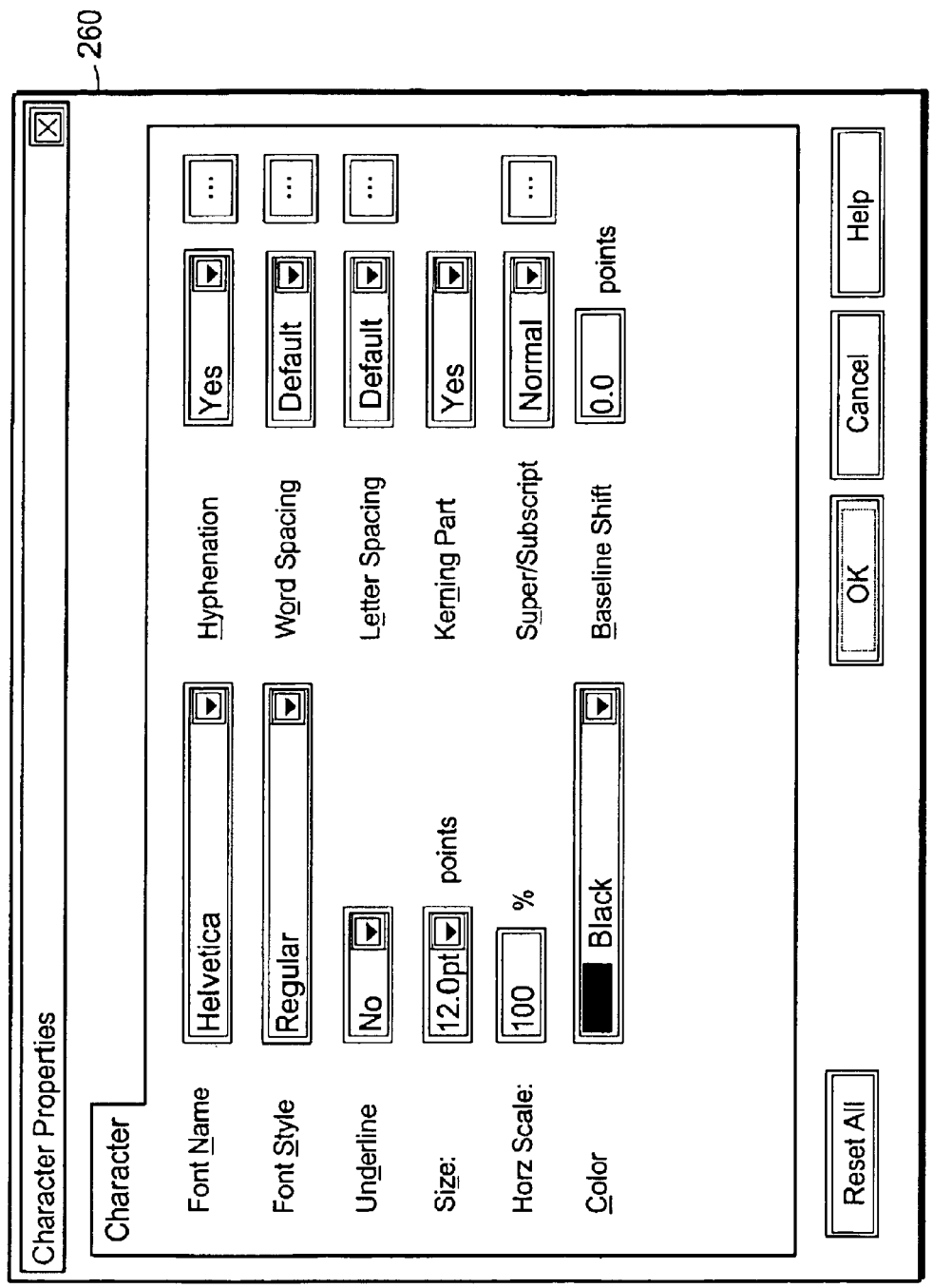
FIG. 31 shows the designer program's Character Properties dialog box.

As shown in FIG. 75 this sub-routine has a step 1230, which displays the Character Properties dialog box 260, shown in FIG. 31, for the selected text. This dialog box shows the values of the selected text attributes, and allows a user to change the values of any such attributes and to select to apply any such changed attribute values to the selected text. If the user selects to apply the changed values, if any, made in the Character Properties dialog box to the selected text step 1232 in FIG. 75 causes steps 1234 and 1236 to be performed. Step 1234 changes the corresponding attribute value of the selected text in the template data structure, and step 1236 updates the layout of the document window to show the text with the newly changed attribute values.

Going back to FIG. 59, if the user selects Text>Paragraph in the designer program's menu structure, step 1032 calls the paragraphProperties sub-routine 1238, shown in FIG. 76, for the selected text.

As shown in FIG. 76, this sub-routine includes a step 1240, which tests to see whether the selection with which the dialog box has been called is selected text or a selected style. If it's selected text, step 1240 makes all of the paragraphs in which any of the selected text occurs be selected. Then step 1242 displays the Paragraph Properties dialog box, 262, shown in FIG. 32. This dialog box shows the text attribute values for the selection, allows a user to change the values for individual attributes displayed, and allows the user to select to apply any such changed attribute values to the current selection.

Figure 32:
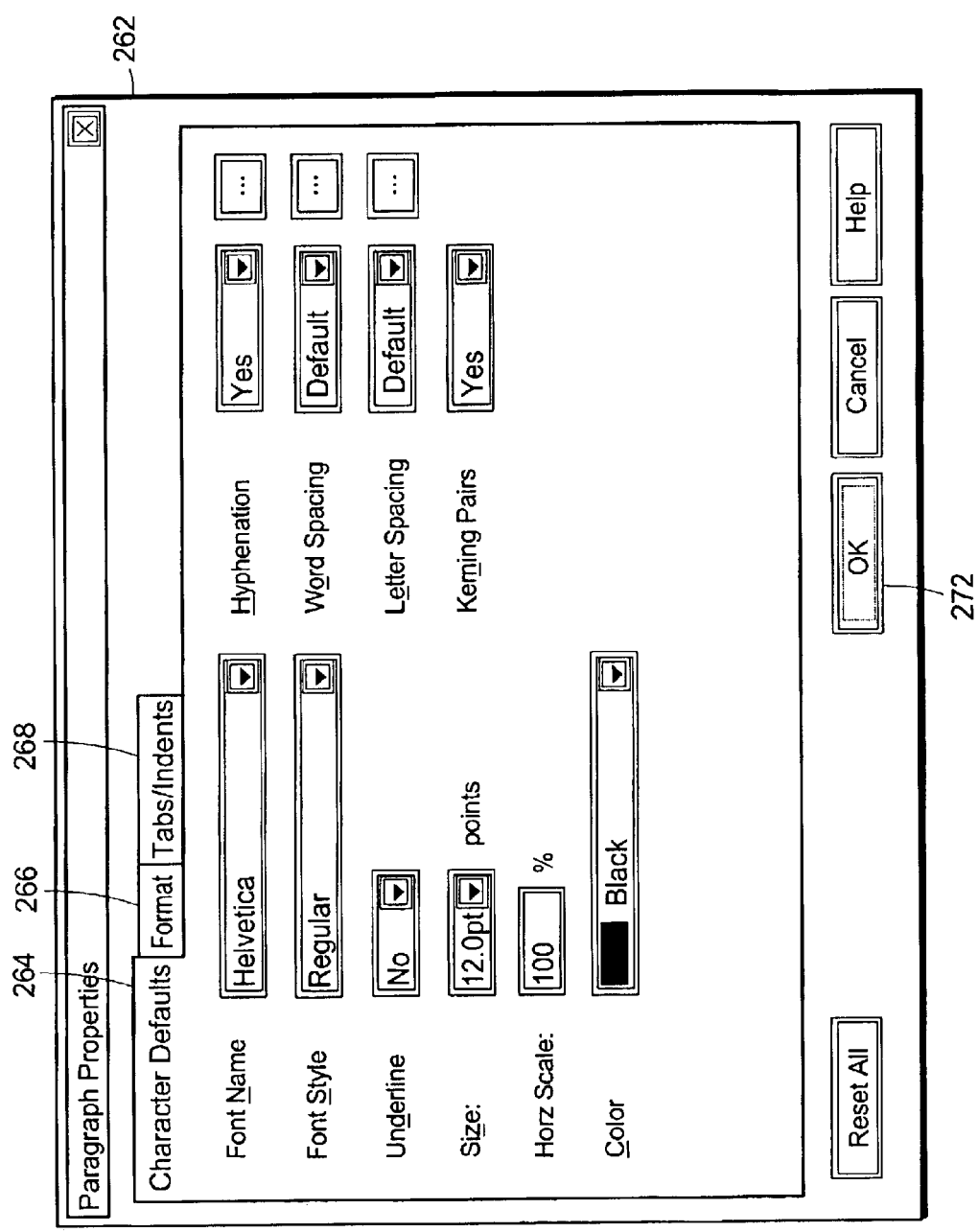
FIGS. 32 through 34 show three tabs of the designer program's Paragraph Properties dialog box.
Figure 33:
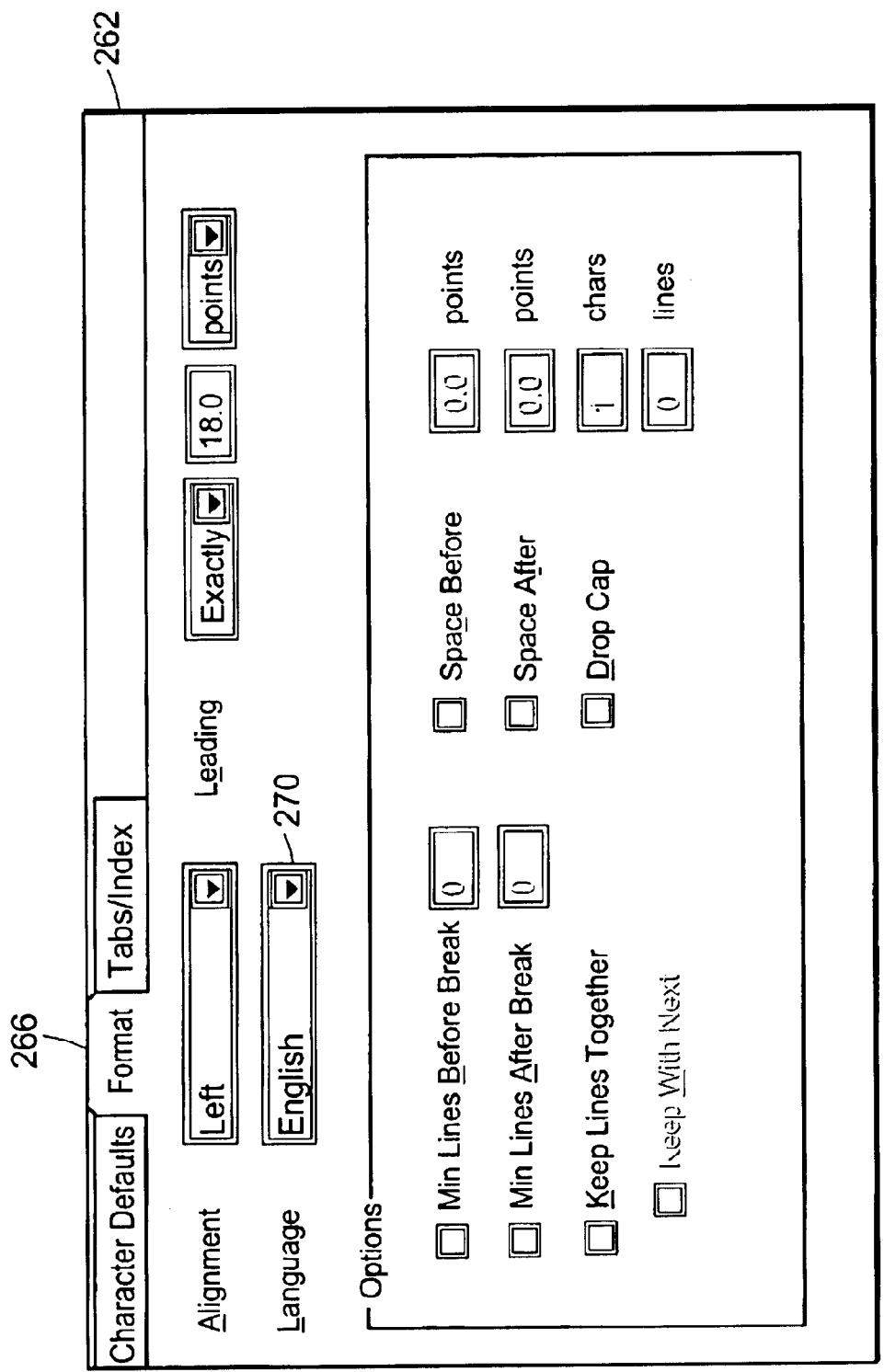
Figure 34:
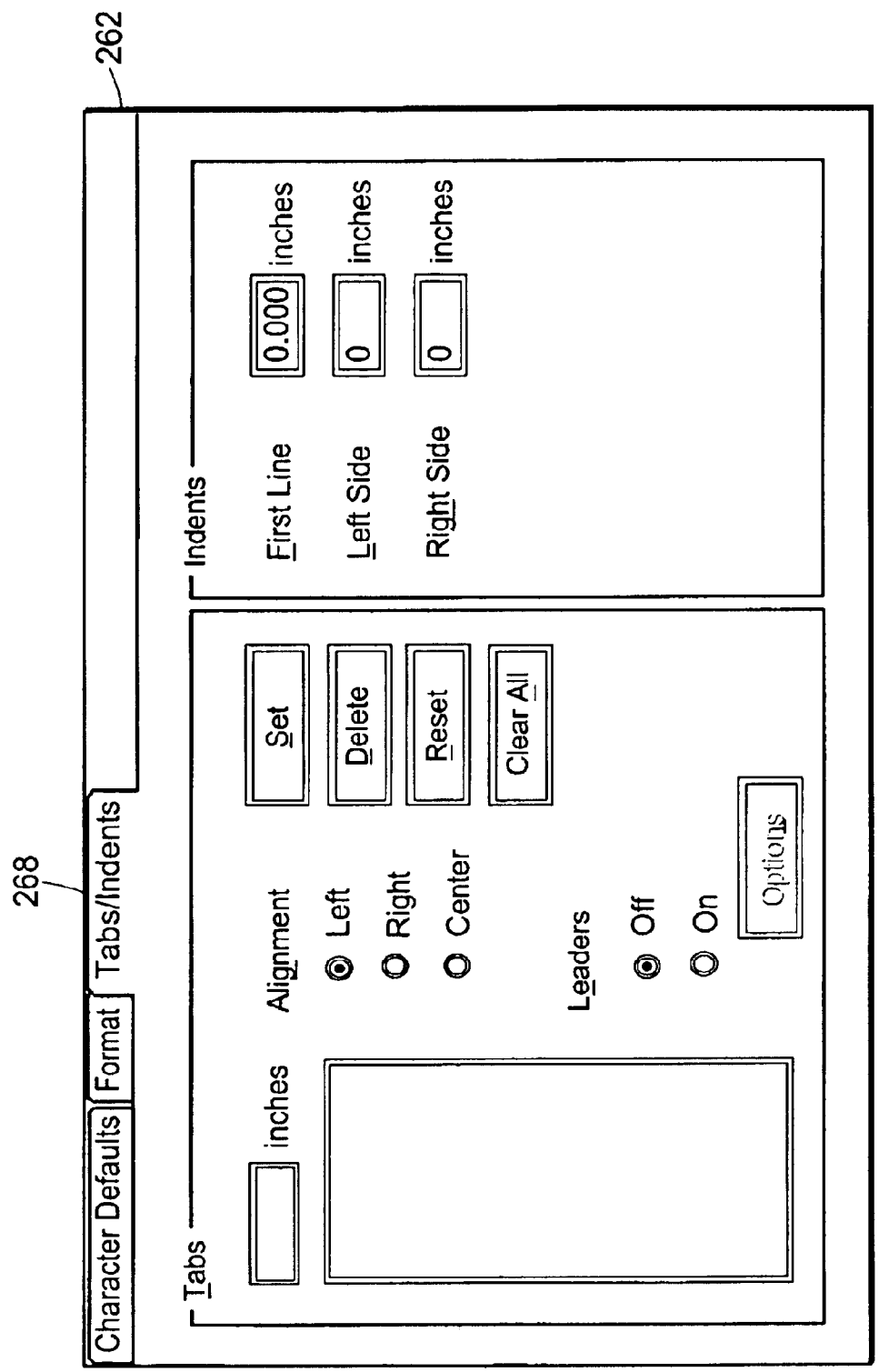

As shown in FIG. 32, the Paragraph Properties dialog box has three tabs: a character default tab 264; a format tab 266; and a tab/indents tab 268. FIG. 32 shows the entire dialog box with the character defaults tab 264 shown. FIG. 33 shows the format tab of the dialog box. FIG. 34 shows the tab/indents tab of the dialog box. As can be seen from these figures, each of these dialog boxes allows the user to alter various text-related attributes for the currently selected paragraphs or style.

One attribute, which is discussed in more detail below, is that defined in Language selection box 270, shown in FIG. 33, which allows the user to select a value for the language_id attribute for the current selection. As is explained below, this attribute is used to select a hyphenation rule set, for use in laying out the text.

As shown in FIG. 76, if the user selects to apply any attribute values changed in the Paragraph Properties dialog box by clicking on the OK button, 272 shown in FIG. 32, step 1244 of FIG. 76 causes steps 1246 through 1256 to be performed.

Step 1246 tests to see if the current selection-for which the Paragraph Properties sub-routine has been called is a style, defined in the current template's TSL file of the type shown above with regard to FIG. 5. If so, it causes steps 1248 and 1250 to be performed. Step 1248 changes the attributes in the current template's TSL description of the currently selected style's corresponding model, to reflect any of the changes that have been made in the Paragraph Properties dialog box. Then step 1250 updates the layout of the template in the document window to show the new attribute values for any text in the template that has the currently selected style or that inherits any of the changed attributes from the currently selected style.

If, on the other hand, the current selection is text, and not a style, step 1252 will cause steps 1254 and 1256 to be performed. Step 1254 changes the attributes of the currently selected paragraphs in which the selected text occurs to reflect the changes that have been made to the values contained within the Paragraph Properties dialog box. Then step 1256 updates the layout in the document window to show the new attribute values of the selected text.

Returning to the designer control loop of FIG. 59, if the user selects Text>Style in the designer program's menu structure, step 1033 calls the textStyle sub-routine 1260, shown in FIG. 77.

Figure 35:
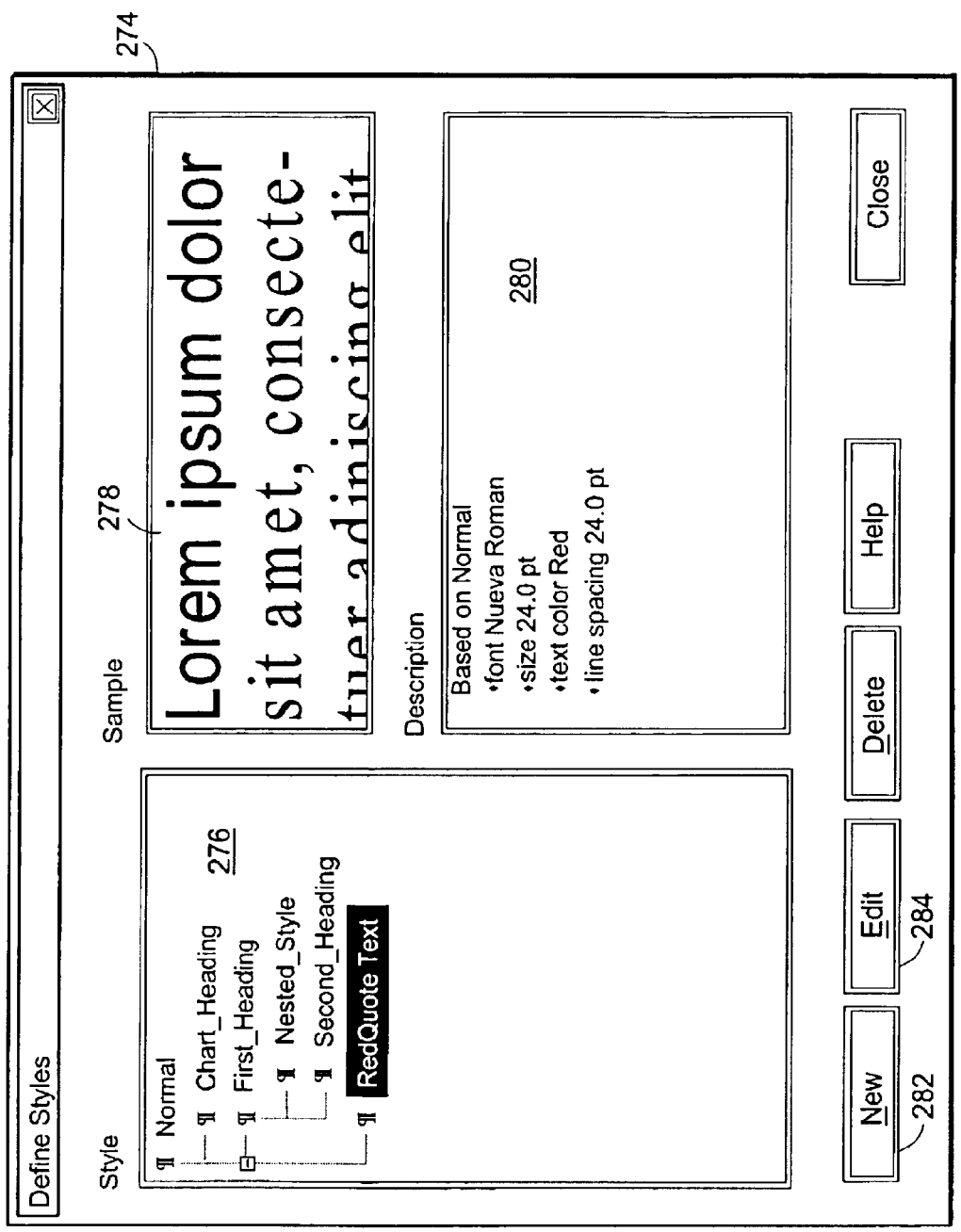
FIG. 35 shows the Define Styles dialog box of the designer program.

As shown in FIG. 77, this sub-routine has a step 1262, which displays a Define Styles dialog box 274, shown in FIG. 35. This dialog box includes a style window 276, which provides a tree diagram of the hierarchy of text styles currently defined in the current template's corresponding TSL file. The user is enabled to click on one of the names of this tree diagram to make it the currently selected style. The dialog box 274 also includes a sample window 278, which includes a sample of text having the text attributes defined by the currently selected style. It also includes a description window 280, which lists the attributes of the currently selected style and the name of the style upon which it is based.

If the user selects the New button 282 in this dialog box, step 1264 in the text-Style sub-routine of FIG. 77 causes steps 266 through 270 to be performed. Step 266 displays a dialog box that allows the user to enter a name for a new style to be created and to select the name of the parent style from which it is to inherit default text attributes. If the user enters such a name for a new style with a value selected for a parent style and clicks OK in this dialog box, step 1268 causes step 1270 to be performed, which calls the paragraphProperties routine, described above with regard to FIG. 76, for the new style.

If the user selects the Edit button 284 shown in FIG. 35, steps 1274 through 1278 of FIG. 77 are performed. Step 1274 shows a dialog box that lets a user select a style by name. This dialog box comes up with the currently selected style, if any, within the Style Window 1276 as the selected style. If the user selects a Properties option contained within the dialog box put up by step 1274 for a named style, steps 1276 and 1278 call the paragraphProperties routine of FIG. 76 for the named style, allowing the user to select and edit attributes for that style.

It can be seen that the textStyle sub-routine allows a user to create and define new styles, as well as to edit previously existing ones. In both cases, the paragraph-Properties sub-routine, described above with regard to FIG. 76, is used. In the case of an edit of a previously existing style, this causes any text within a template that is nested under a tag bearing that style's name, or the name of any style that inherits attributes from that style, to have its display in the document window updated by step 1250 shown in FIG. 76.

Returning to the control loop of FIG. 59, if a user selects Element>Style in the menu structure of the designer program, step 1034 calls the shapeStyle sub-routine 1286 shown in FIG. 78.

As shown in FIG. 78, this sub-routine is substantially-identical to the textStyle sub-routine described above with regard to FIG. 77, except for the portions of its text that are underlined in FIG. 78. These differences relate to the fact that it displays the Properties editor dialog box for the selected style rather than the Paragraph Properties dialog box, and that it affects TSL definition of styles for shapes rather than styles for text.

Going back to FIG. 59, if the user selects Project>Show Variable List in the designer program's menu structure, step 1035 calls the variableList sub-routine 1312 shown in FIG. 79.

Figure 36:
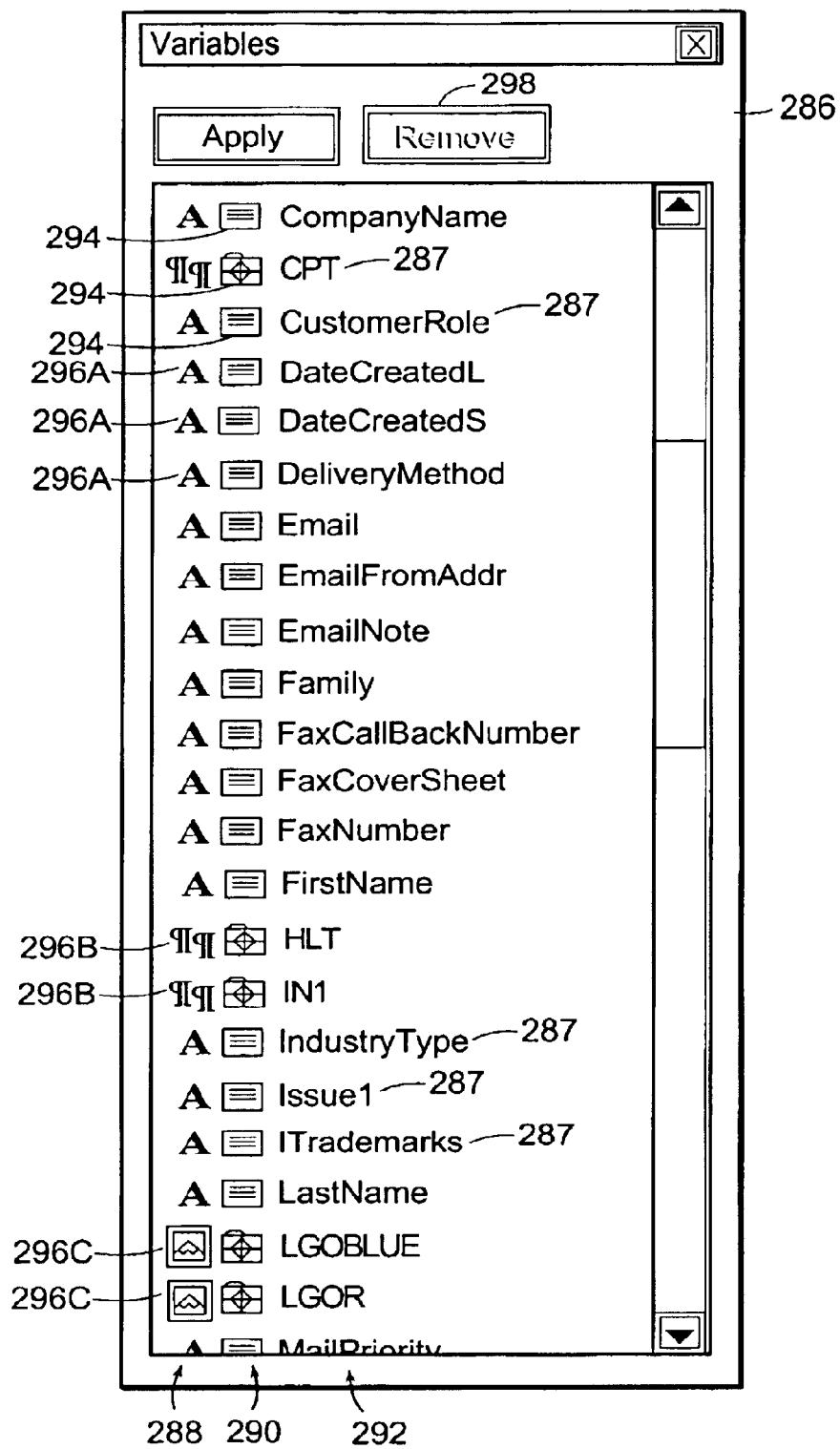
FIG. 36 shows the Variable List window of the designer program, which is virtually identical to the Variable List window of the producer program.

As shown in FIG. 79, step 1314 of this sub-routine causes a Variable List window 286, shown in FIG. 36, to be displayed. This Variable List contains a list of variables, which are content-mapping rules, each of which has as its name a variable name 287, which can correspond to a variable name 178, of the type listed in the variable column 177 in FIG. 3, of a template variable element. In the variable list the variable names 287 occur in a variable name column 292 shown in FIG. 36. Immediately to the left of each such variable name, in a rule-type column 290, is an icon 294, which defines the type of content-mapping rule that is associated with the variable name 287. Immediately to the left of these icons are content-type icons 296, contained in a content-type column 288. Each such content-type icon graphically represents the type of the variable. For example, the Icons 296A, which look like a capital letter A, indicate that their associated variable has a content type that is unformatted text. The Icons 296B, which look like two paragraph signs, indicate that their associated variables have a content type for formatted paragraph text, and the Icons 296C indicate that their associated variables are associated with content-mapping rules for images. Other content types supported by the current embodiment of the invention include non-paragraph formatted text and area templates.

As shown in FIG. 79, once step 1314 has displayed a variable list, if a user drags on one of the variables contained within that list, step 1316 causes steps 1318 through, 1322 to be performed. Step 1318 changes the mouse cursor to an add-type icon that has an appearance corresponding to FIG. 36's content-type icon 296 associated with the dragged variable. As long as the mouse is down during the drag, steps 1320 and 1322 in FIG. 79 cause the add-type Icon to be dragged on the screen with the motion of the mouse, and they cause the icon to have a plus sign if it is over a location in the document window at which it is legal to drop a variable of the-selected content type.

If the mouse button is released at a time when the icon has such a plus sign, step 1324 causes steps 1326 through step 1344 to be performed. Step 1326 tests to see if the variable has not been dropped inside a container that can accept its content type. If it has not been dropped inside such a container, step 1328 creates a corresponding container element that can hold the variable's associated content type in the template tree data structure of the current template. Thus, for example, if the current content type of the Add-Type icon at the time of the drop was text, a text container would be created to hold it. If it is an image, then an image element would be created to hold it; if it is an area template, an area template holder would be created to contain it, and so forth.

If the variable type that has been dropped in step 1324 is a text element, step 1330 causes steps 1332 through 1338 to be performed. Step 1332 tests to see if the variable has been dropped in the middle of an existing text element and if so it causes step 1334 to split the existing text element into which it has been dropped into two parts, each of which holds the text on one side of the place where the text variable was dropped. Step 1336 creates a new text element corresponding to the variable type that has been dropped and places it in the proper place in the template's tree data structure. Then step 1338 places a data_tag attribute having a value equal to the variable's name in the new text element that has been created, converting it into a variable text element. An example of a text element containing such a data_tag is shown in the character element 170 shown in FIG. 4 and is labeled with the numeral 180.

If the variable type being dropped by the release of the mouse button detected in step 1324 of FIG. 79 is other than a text element, step 1340 places a data_tag attribute having a value equal to the variable's name in the corresponding container element in the template tree data structure, making that container into a variable element. Then step 1342 updates the layout in the document window to reflect the insertion of any container elements that may have been created by steps 1326 and 1328, and step 1344 updates the structure view to reflect the insertion of the variable element, including the display of the variable name next to its associated variable element, and the splitting of any text element into which the variable has been inserted, which may have been performed by step 1334.

Although other embodiments could operate differently, the embodiment in the invention shown in FIG. 1 does not display variable elements in the layout window. If the user wants to see the location of a variable, he either enters a command to cause all variable elements to be highlighted, or to select a variable element in the structure view. Of course, variable elements can be given static attribute values and static content values, as indicated in FIG. 4, and such static values for variable elements will be displayed in the document window unless the user maps variable values into a template, in which case the variable element will be displayed with such variable values.

As is shown in FIG. 79, if a user selects the Remove button 298 shown in FIG. 36, when a variable element is selected, step 1348 tests to see if the selected element is a text variable element and if so it causes step 1350 to remove the text variable element from the template tree's data structure. If the selected element is not a text variable element, step 1352 causes step 1354 to remove the data_tag and the variable name of the selected variable element from the selected element in the template tree data structure. Then step 1356 updates the document window display to show any layout changes that have been caused by the removal, if any, and step 1358 updates the structure view to reflect the removal of the variable name from the variable column 177, of the type shown in FIG. 3, of the structure view.

A variable list corresponds to a rule set 134 of the type illustrated schematically in FIG. 2. Such rule sets are associated with project files and a user has to open a project file while in the designer to have access to that project's variable list.

Returning to the designer control loop of FIG. 59, if a user selects File>Export>Selection in the designer program's menu structure, step 1036 calls the export routine 1360 shown in FIG. 80 for the current selection.

As shown in FIG. 80, the export sub-routine contains a step 1362, which displays a dialog box that allows the user to select a directory, to select a file type, to see all files of the selected file type in the selected directory, to enter a new file name of edit a selected file name, and to select to save the selection under the new or selected file name. If the user makes a selection to save the currently selected content under a file name having the extension corresponding to the content type of the current selection, step 1364 causes step 1366 to save the selection in a file of the selected type in the selected directory under the selected name. In the embodiment of the invention shown in FIG. 2, unformatted text is saved as .txt files, formatted non-paragraph text is saved as files containing an .xft (for XML formatted text), formatted paragraph text is saved as .xfp (for XML formatted paragraphs), area templates are saved as .xat files (for XML area templates), and images are saved as either TIFF, GIFF, JPEG, or encapsulated postscript files.

As shown in the control loop of FIG. 59, if the user selects File>Insert>contentType, in the menu structure of the designer program, where contentType represents either text, formatted text, formatted paragraphs, image, or area template, then step 1037 calls the import sub-routine 1368 shown in FIG. 81 for the selected content type.

As shown in FIG. 81, this sub-routine starts with a step 1370, which displays a dialog box that allows the user to select a directory, to select a file type, to see all the files of the selected file type in the selected directory, to enter or pick a selected file name, and to select to open the file having the selected name. If the user selects to open a file of a selected name, step 1372 causes steps 1374 through 1392 to be performed. Step 1374 changes the mouse cursor to an add-type icon corresponding to the selected content type. Step 1376 and 1378 cause the add-type icon to move across the screen along with the motion of the mouse with the add-type icon having a plus sign if it is over a location in which a value of the selected content type can be dropped.

If the mouse button is released at a time when the icon has a plus sign, indicating it can be dropped at the location in which the mouse button is released, step 1379 causes steps 1380 through 1392 to be performed. If the mouse button has not been released in a container that can accept its type, step 1380 causes step 1381 to create a corresponding container element that can hold the type of content of the file that has been opened and places it in the appropriate place in the template's tree data structure. If the content file being opened is a text element, step 1382 causes steps 1383 through 1385 to be performed. Step 1383 tests to see if the content was dropped in the middle of an existing text element. If so, it causes step 1384 to split the existing text element into two portions representing the text on each side of the location at which the newly opened text content has been dropped. Step 1385 creates one or more text elements corresponding to the text content that has been opened and places it in the template tree data structure at the appropriate place.

If the imported content is an image file, steps 1386 and 1387 give the src attribute of the associated image element a value corresponding to the name of the selected image file. This is done because, in an image element, it is the src attribute which names the file containing the image data to be displayed in the image element.

If the content being imported is other than a text element or an image element, step 1388 causes the one or more elements of the imported file to be inserted as content, or children, in the sub-tree data structure under the container into which that content has been dropped.

After the operation of steps 1382, 1386, or 1388 has been performed, step 1390 updates the layout in the document window to show the inserted contents, and step 1392 updates the structure view in the designer window to reflect the inserted elements.

Returning to the control loop of FIG. 59, if the user selects Project>Select Project, step 1038 calls the selectProject sub-routine 1394 shown in FIG. 82.

As shown in FIG. 82, this sub-routine performs a step 1396, which displays a Select Project dialog box, which allows a user to select a directory, to see projects in the selected directory, to select one such project, and to select to have the selected project opened. If the user selects to open a project, step 1398 causes step 1400 to open the selected project, including making its variables available to the designer program as was discussed above with regard to the variable list shown in FIG. 36 and as was described above with regard to FIG. 79. As shown in FIG. 2, each project file includes not only a variable list, or rule set, 134, but also a job list 136.

Returning to the designer control loop of FIG. 59, if the user selects Project>Show Records and then uses the resulting dialog box to select one of the jobs contained in the opened projects job list 136, shown in FIG. 2, step 1040 calls the jobPreview routine 1472 shown in FIG. 86.

As shown in FIG. 86 this sub-routine includes a step 1474, which displays a Job Preview record selector window 153 shown in FIGS. 3 and 6. As will be described below, each time the user selects a profile record, represented by a row in the table shown in the Job Preview record selector, the program in which the record selector is shown, in the case of FIG. 3 the designer program, will import variable values into all of the variable elements of the current template on the basis of the values contained in the selected profile record, and will cause the document window to display a layout of the current template with such variable contents having been mapped into it.

Turning now to FIG. 83, this figure provides a highly simplified top level description of the control loop of the producer program described above with regard to numeral 126 of FIG. 2 and the GUI window 180 of FIG. 6. As was discussed above, this is the program that is used to create, edit, and save project files 132, shown in FIG. 2, each of which contains a content-mapping rule set 134 and a list 136 of jobs, each of which specifies information necessary to produce a set of one or more variable documents.

If the user selects File>New Project, step 1404 in FIG. 83 causes step 1406 to display a new project dialog box that allows a user to select a name and a directory for a new project file and to create and open the named file.

If the user selects File>Open Project, step 1408 causes step 1410 to display an Open Project dialog box that allows the user to select a directory, display the project files in it, and select to open a displayed project file.

If the user selects File>Save Project, step 1412 causes step 1414 to display the Save Project dialog box, which allows the user to save the current project including its set of variables and their content-mapping rules and the project's job list under a selected name and a selected directory. This is how project files such as the project files 132 shown in FIG. 2 are formed.

If the user selects Data>Add Source, step 1416 in FIG. 83 causes step 1418 to display a dialog box that allows the user to select a profile database such as the profile database 147 shown in FIG. 2 to be used by the project.

If the user selects Edit>Preferences>Add Content Folders>Add, step 1420 causes step 1422 to display a series of dialog boxes that allows the user to select a MediaBank digital asset management system, such as the digital asset management system 151 shown in FIG. 2 for use by the system.

If the user selects Template>Add Template, step 1424 causes step 1426 to display the Add Template dialog box, which allows the user to select a directory, display the templates in it, and select to open a displayed template file, such as the template file 130 shown in FIG. 2.

If the user selects Variable>Add, step 1428 in FIG. 83 causes step 1430 to call the variableEditor sub-routine 1444 shown in FIG. 84 for an undefined variable for a new variable.

Figure 37:
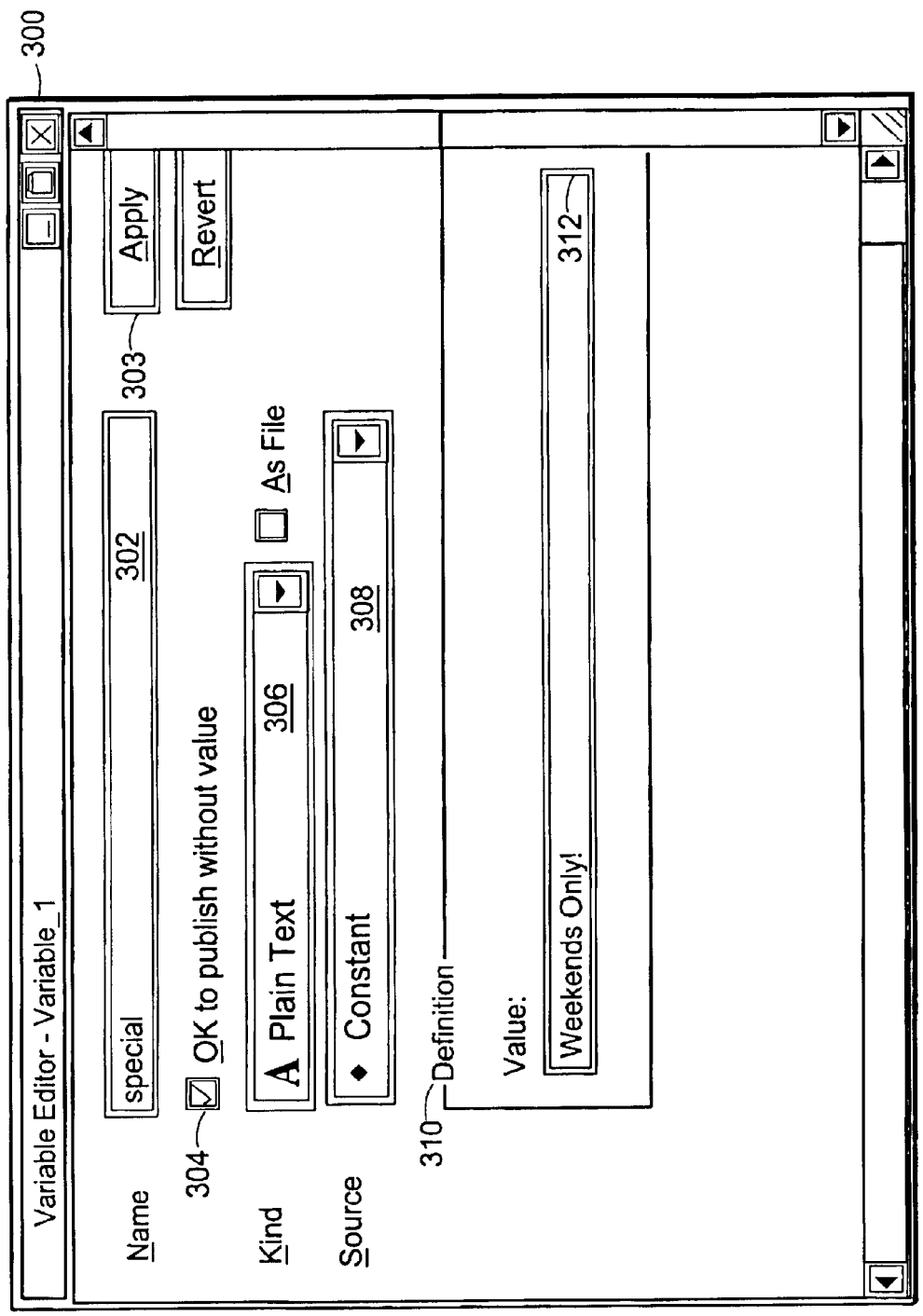
FIGS. 37 through 41 illustrate the producer program's Variable Editor dialog box, showing the different "Definition" areas of that dialog box which result from the selection of different types of content-mapping rules for variables defined in the Variable Editor dialog box.

As shown in FIG. 84, the variableEditor sub-routine has a step 1446, which displays a Variable Editor dialog box 300 shown in FIG. 37. This dialog box includes a "Name" edit box 302, which allows the user to enter a name for a new variable being defined by the Variable Editor or to edit the name of a previously defined variable being edited by the Variable Editor 300.

The Variable Editor box also includes an "OK to publish without a value" check box 304. If checked, this will allow variable elements for which the content-mapping rule to be associated with the variable being defined by the dialog box 300 fails to map any content value to be suppressed. As is explained below in more detail, such suppression causes variable elements to take up no space in the layout of a template. If this value is not checked, a variable element into which no value is mapped will take up the space defined by the combination of its height and width attributes and its flex attributes.

The Variable Editor dialog box also includes "Kind" combo box 306, which allows the user to select the content type of the variable currently being defined or edited. It also includes a "Source" combo box 308, which allows the user to select a type of content-mapping rule to be associated with the variable name.

In the embodiment of the invention shown in FIG. 1, there are five types of content-mapping rules, each of which has a separate rule definition area 310 in the Variable Editor dialog box of FIGS. 37 through 41. These five rule types are the constant rule type whose definition area is shown in FIG. 37, the script rule type whose definition area is shown in the dialog box 300A of FIG. 38, the simple rule type whose definition area is shown in the dialog box 300B in FIG. 39, the profile record content-mapping rule type whose definition area is shown in dialog box 300C in FIG. 40, and the MediaBank query content-mapping rule type whose definition area is shown in dialog box 300D in FIG. 41.

As shown in FIG. 37, the definition area of a constant rule type contains a "Value" edit box 312, which allows a user to type in a constant text string that is to be used as the value of the named variable if the variable kind shown in the combo box 306 is plain text. If the variable's content type or kind is other than plain text, the string contained within the value edit box 312 should define the name and path of a file whose contents are to be mapped into the named variable.

Figure 38:
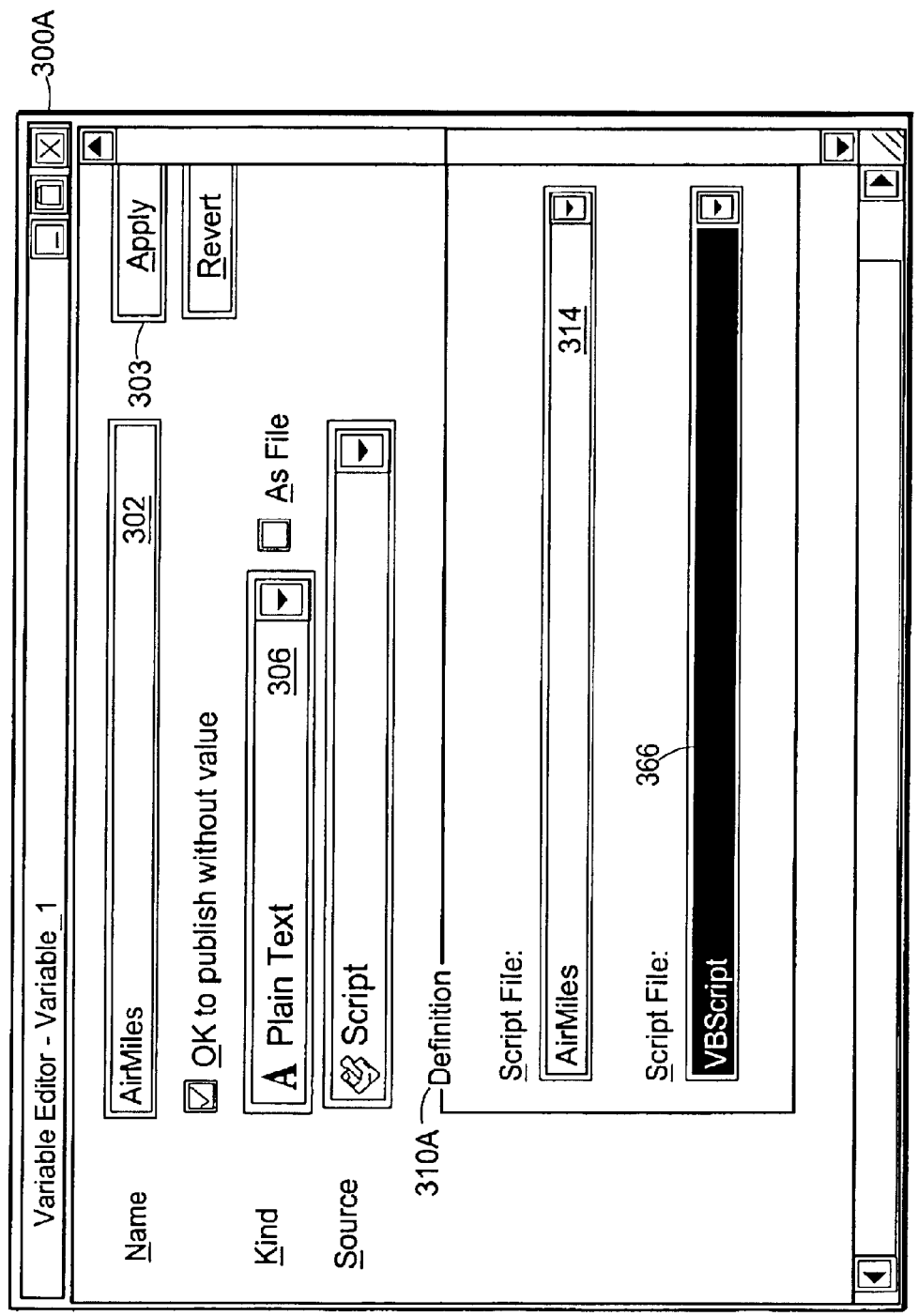

FIG. 38 shows the definition area 310A associated with a script rule type. In this case, it includes a "Script File" combo box, which allows the user to select or enter the name of a script file that is to be used to generate and/or select content for the variable kind indicated in the selection box 306 for the variable named in the edit box 302. The selection box 316 defines the language of the script, so that a program using the variable definition to map data into a template will know what interpreter it is to use for the script.

Figure 39:
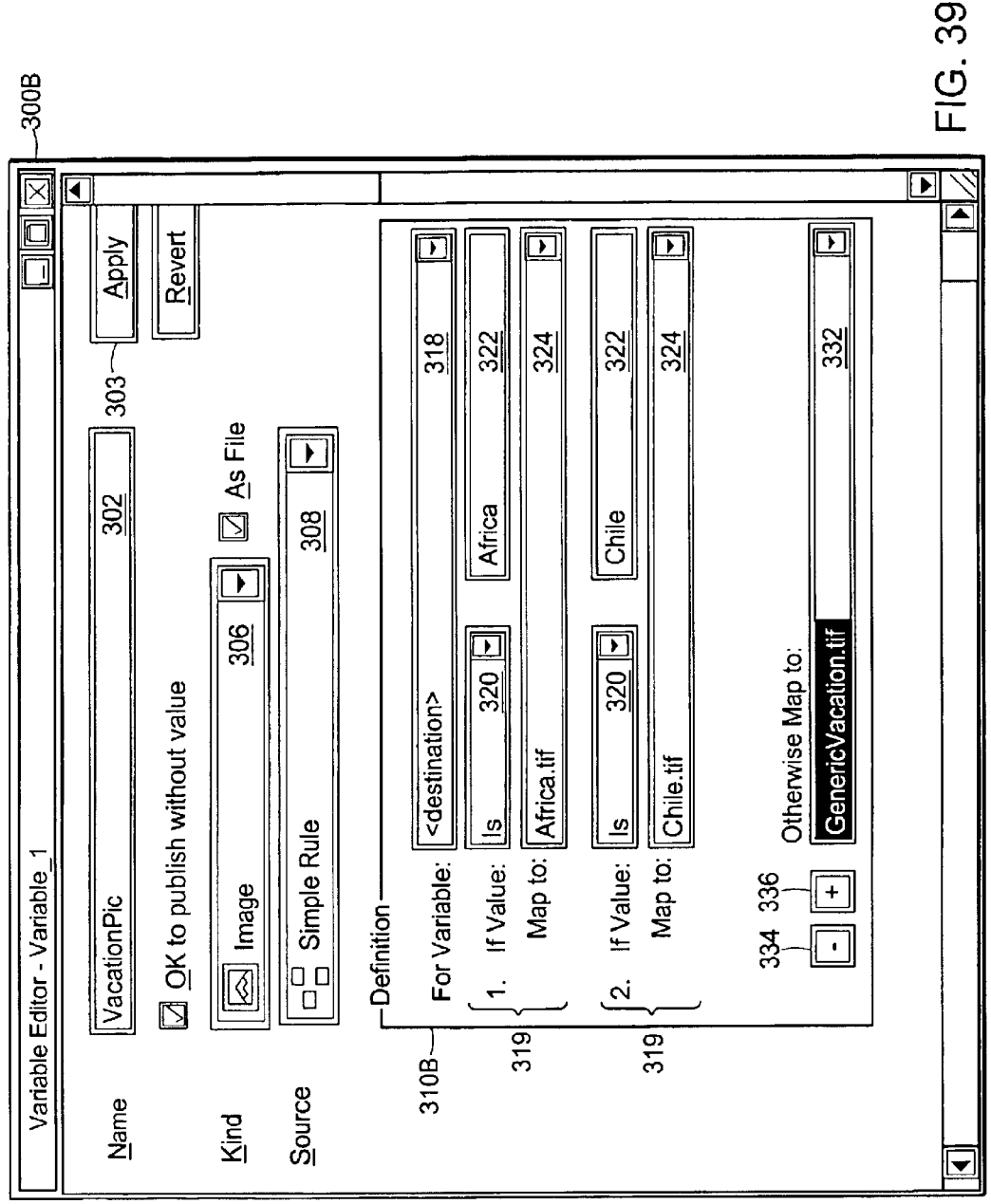

FIG. 39 shows the definition area 310B associated with content-mapping rules of the simple rule type. This definition area includes a "For variable" selection box 318, which allows the user to specify the name of a field in the profile database that is to be used as the tested value by the if/then rules defined by the remainder of the definition area. The definition area then contains one or more if/then rules 319, each of which includes a selection box 320, which allows the user to select from among a plurality of string relationship operators, and a target value edit box 322, which allows the user to specify a target string. If the string in the profile field identified in the selection box 318 has the string relationship specified in the selection box 320 to the target string 322, then the string or the contents of the file identified in the "Map to" selection box 324 will be mapped into the variable name identified in the edit box 302. At the bottom of the definition area, an "Otherwise map to" selection box 332 defines a string or the name of a file whose contents are to be mapped into the dialog box's variable name if none of the conditions of the if/then rules 319 are met. The plus and minus buttons 334 and 336 shown in FIG. 39 at the lower left-hand corner of the definition area enable a user to add or remove if/then rules 319 from the definition area.

Figure 40:
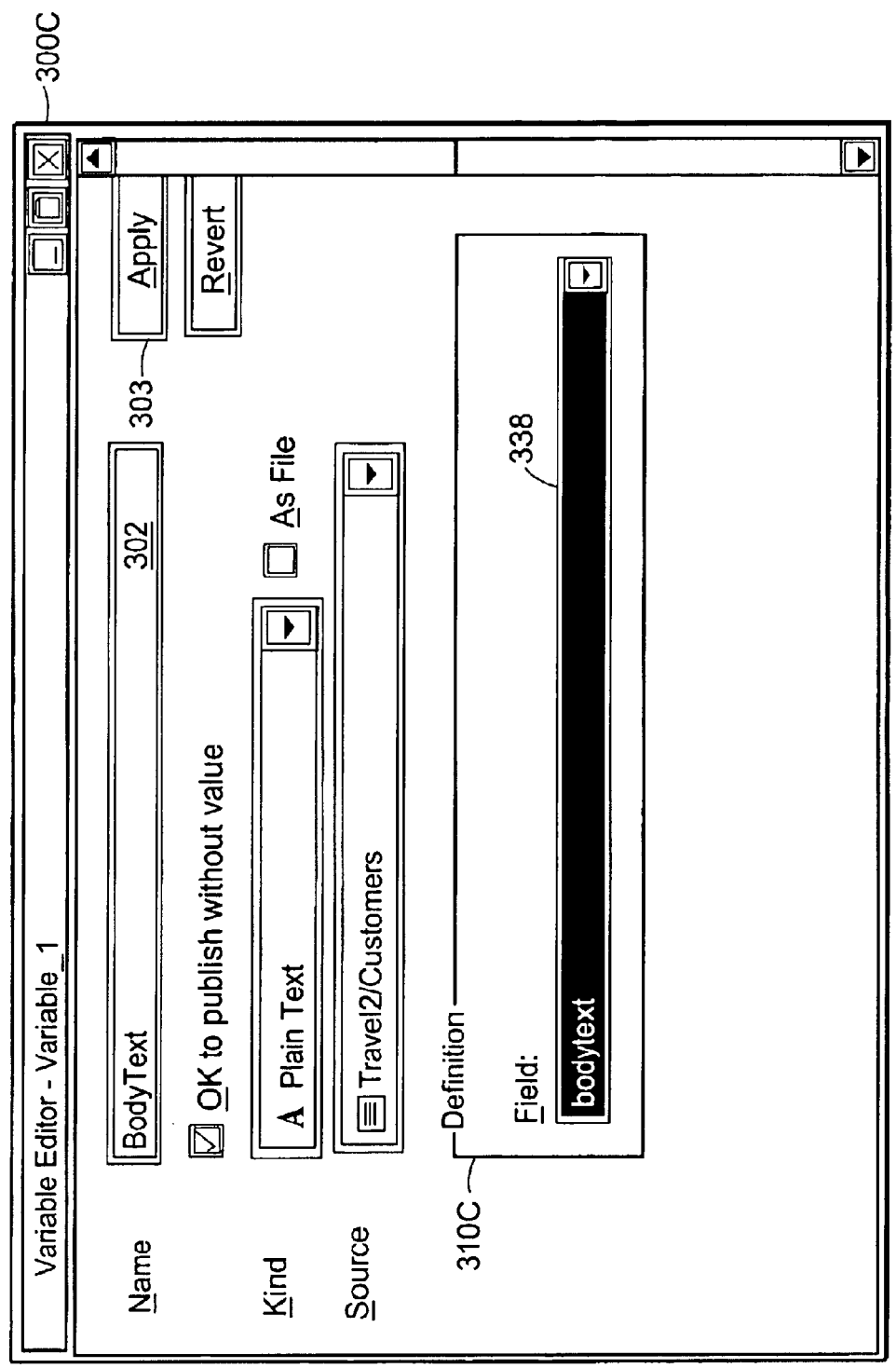

FIG. 40 shows the definition area 310C for a Variable Editor dialog box, which has the profile-record-field content-mapping rule type. This definition area includes a "Field" selection box 338, which allows the user to specify the name of a field in a profile data that is to supply the value for the dialog box's variable name.

Figure 41:
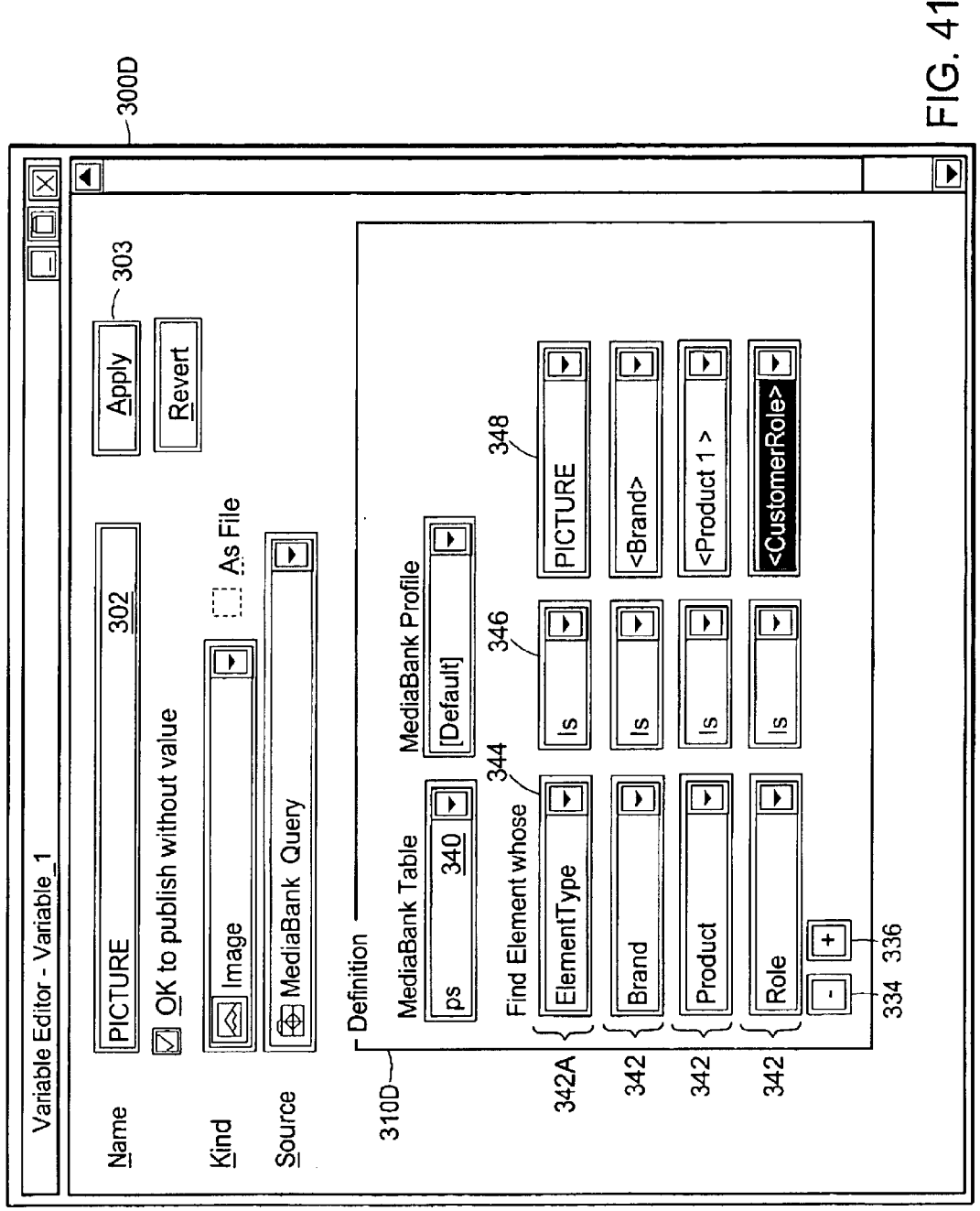

FIG. 41 shows the definition area 310D, which is used to define a MediaBank query content-mapping rule. A Media-Bank query is used to define a variable template for an SQL query of the type shown in FIG. 42. This variable query template will be instantiated, as shown in FIG. 43, on the basis of the values of fields in a profile data record, and then the instantiated SQL query 352 shown in FIG. 43 will be sent to the digital asset management system 151 shown in FIG. 2 to select a digital content file that will be mapped into the dialog box's variable name.

The definition area 310D shown in FIG. 41 includes a "MediaBank Table" selection box 340, which allows the user to select a particular table 141 contained within the digital asset management system 151, as shown in FIG. 2, to be used by the content-mapping rule. The major portion of the rest of the definition area in FIG. 41 is composed of one or more rows 342, each of which contains three selection boxes: a selection box 344, which contains a metadata tag name; a selection box 346, which selects a string relationship; and a selection box 348, which specifies either a constant target string, or the name of a field in a profile data record that will contain the target string. The SQL query that will be generated in response to a MediaBank query will seek a MediaBank content file that has associated metadata tag values that meet the conditions set forth in the rows 342.

The first row of selection boxes 342A normally defines the desired value for a metatag data field that defines the content type of the file to be selected by the query. For example, in the query defined by the dialog box in FIG. 41, a metadata tag called "elementType," which defines the data type of a content file, is defined to have a "PICTURE" value, meaning that only a content file whose associated record in the MediaBank table has an elementType metadata tag with a value of "picture" is to be selected. The other rows 342 specify that the names of one or more other metadata fields in the MediaBank table are to have values with a specified string relation defined in column 346 to the value of a named field in the profile record used to select content for the production of a given document. The add and subtract buttons 334 and 336 at the bottom of the definition field 310D allow the user to add or subtract rows 342 to or from the query definition if desired.

In the examples of FIGS. 41 through 43, if a profile data record is provided that has a "brand" field with a value equal to "Whirlpool," a "product" field having a value equal to "Dishwasher 45" and a "customer role" field having a value equal to "Dealer," the SQL query template shown in FIG. 42 will be instantiated to form the complete SQL query shown in FIG. 43. Once instantiated this query can be sent to the MediaBank database to obtain back the name and path of the content file, if any, that meets the selection criteria defined by the query.

It should be noted that in other embodiments of the invention different types of content-mapping rules could be used, including, for example, neural networks, and that in the simple rules and MediaBank queries other types of logical rules could be used, including rules allowing logical OR, XOR, AND, and NAND operators.

Returning to the variableEditor routine of FIG. 84, if the user clicks the apply button 303 shown in a Variable Editor dialog box of the type shown in FIGS. 37 through 41, Step 1448 of FIG. 84 causes Steps 1450 through 1454 to be performed. Step 1450 incorporates any changes to the variable definition that have been made by the dialog box into a data structure that stores the variable and its content-mapping rule in the rule set 134 shown in FIG. 2. If the variable's content-mapping rule is a MediaBank query, steps 1452 and 1454 cause the MediaBank query defined in the definition section 310D of the Variable Editor dialog box in FIG. 41 to be generated as an SQL query template 350 shown in FIG. 42 corresponding to the rule defined in the dialog box's definition area. In this SQL query template, metadata field names corresponding to those occurring in column 344 of FIG. 41 are included and variable symbols are used to represent the profile record field names represented in column 348 of FIG. 41.

Returning now to the producer program control loop of FIG. 83, if the user double-clicks on a given variable from the variable list, which is shown in the project window 182 of the producer program's GUI window shown in FIG. 6, then steps 1432 and 1434 will call the variableEditor routine, described above with regard to FIG. 84 and FIGS. 37 through 41 for the selected variable. This call to the variableEditor subroutine will enable the user to edit a variable, including changing its name, changing its content type, changing its content-mapping rule type, and changing the definition for how the variable's content-mapping rules selects variable content.

As shown in FIG. 83, if the user selects Job>Add Job from the menu structure of the producer programs, step 1436 will cause step 1438 to call the jobSetup sub-routine 1456 shown in FIG. 85 for a new job.

Figure 44:
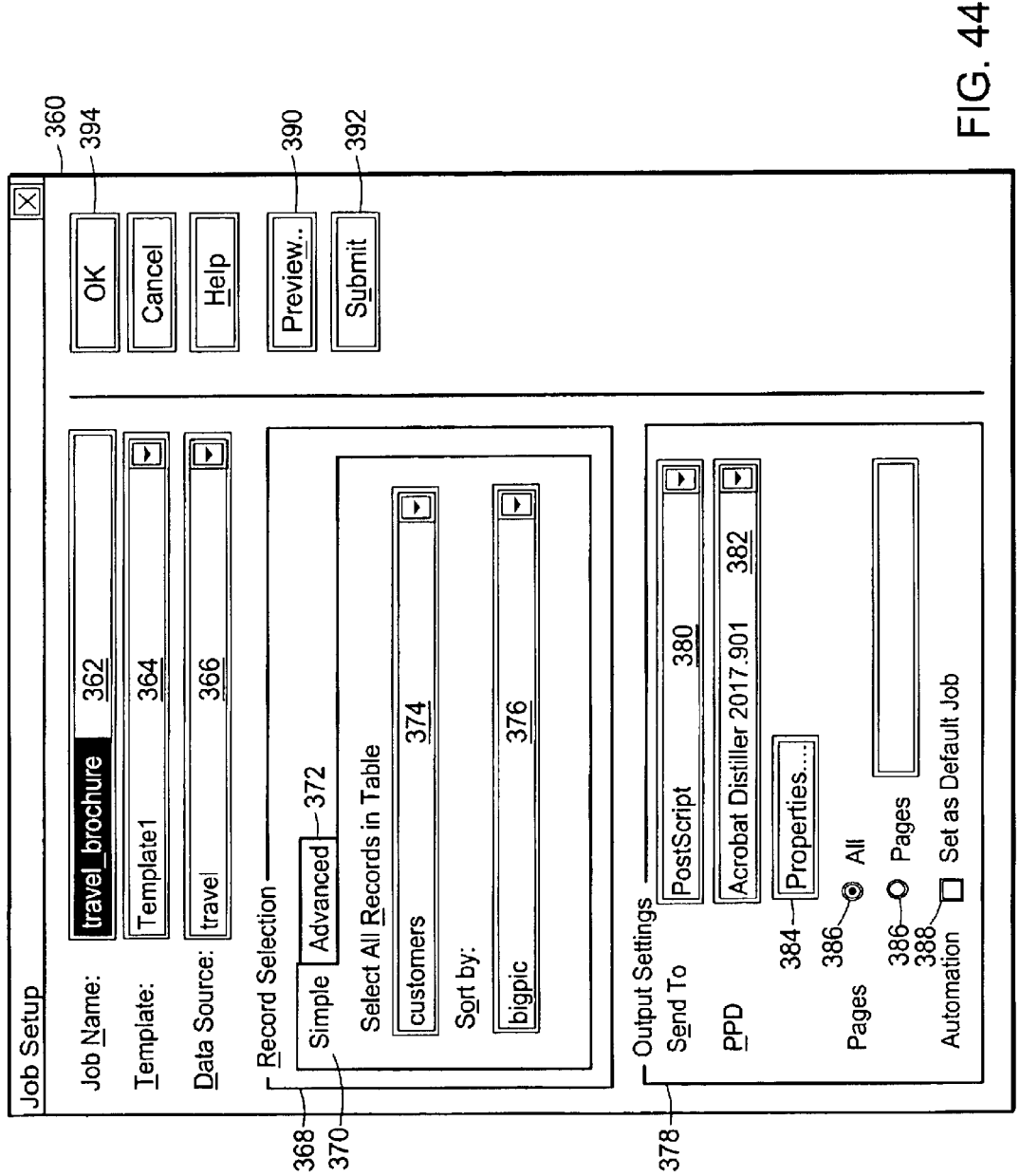
FIG. 44 illustrates the Job Setup dialog box of the producer program, which is used to define a job that will map variable values into a given template and cause the resulting layout to be output in a desired output format.

As shown in FIG. 85 the jobSetup sub-routine contains a step 1458, which displays a Job Setup dialog box 360 shown in FIG. 44. The dialog box 360 includes a "Job Name" edit box 362 in which the user can create or edit the name for the job that is defined by the edit box. It includes a "Template" selection box 364, which allows the user to enter or select the name of a template file 130, of the type shown above with regard to FIGS. 2 and 4, to be used in producing the job's set of one or more documents.

Figure 45:
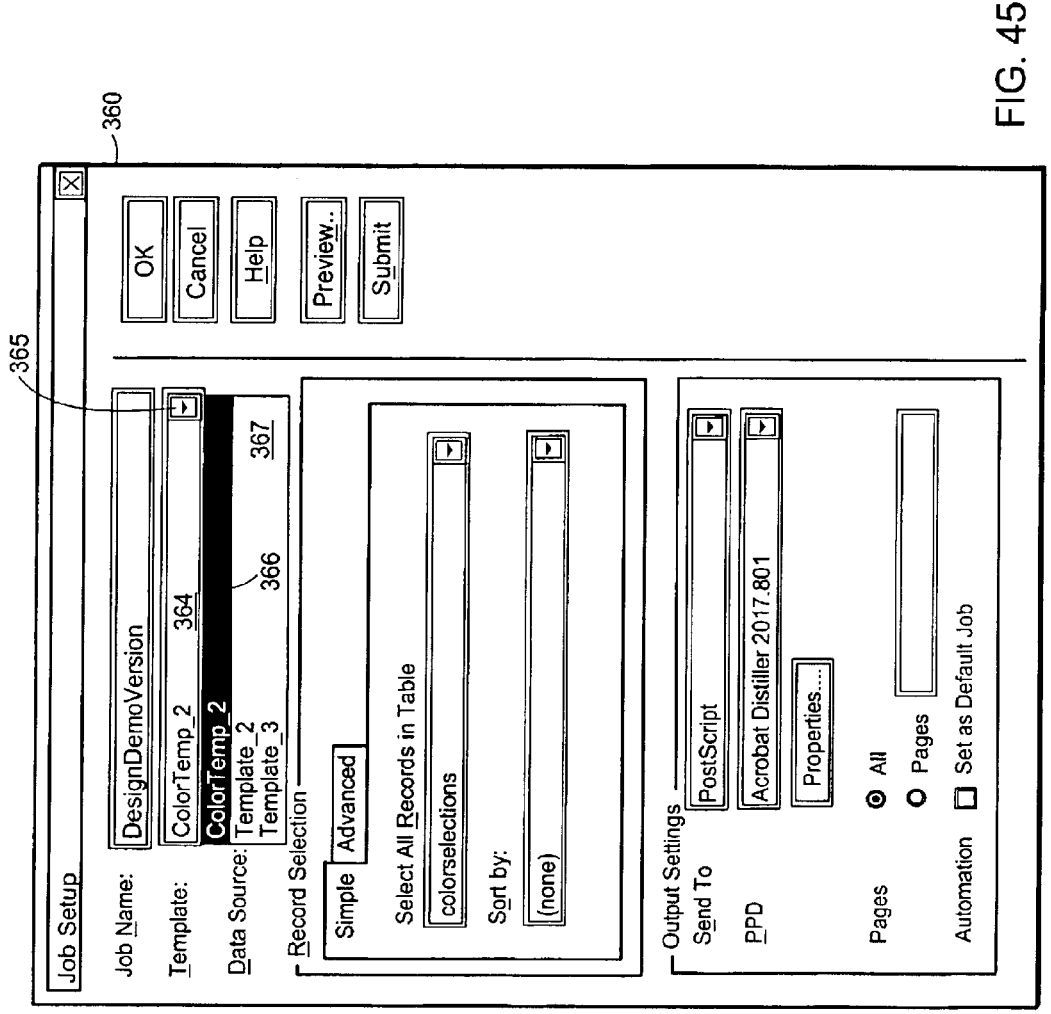
FIG. 45 shows a job set-up dialog box of the type shown in FIG. 45, illustrating how the dialog box enables the user to select with which of a plurality of possible templates a given job is used.

As shown in FIG. 45, if the user clicks the down arrow button 365 in the "Template" selection box, a drop-down list 367 appears displaying the name of all of the template files in any directories associated with the current project file. This figure shows that the embodiment of the invention shown in FIG. 2 allows a user to use the content-mapping rule 134 set associated with a given project with any one of a plurality of different template files 130.

The "Data Source" selection box 366 in FIG. 44 is used to select the name of the profile database 147 shown in FIG. 2 that is to be used in producing the job. The "Record Selection" area 368 allows the user to select which individual records from the database are to have corresponding documents created for them. This selection area has two tabs, a "Simple" tab 370 and an "Advanced" tab 372. If the simple tab is selected as is shown in FIG. 44 the user is presented with a "Select All Records in Table" selection box 374, which allows the user to specify a name 374 of a table 148, of the type shown in FIG. 2, contained within the profile database for which the user wants to produce a separate document for each individual record contained within that table.

If the user places "none" in this selection box 374 of FIG. 44, the job can be used in a transactional mode, in which the job can be called with the fields of one individual record as parameters. The job will respond to each such call by producing one document using the single record whose files have been passed as parameters. Such a transactional mode can be used in a system for producing documents in response to information submitted interactively, such as over the web as is shown below with regard to FIG. 50.

If the user puts the name of a profile database table in the selection box 374 of FIG. 44, the user should select in the selection box 376 the name of the field within that table which will be used to sort the order in which records from the selected table will be used to produce corresponding documents by the job.

If the user selects the "Advanced" tab 372 in the "Record Selection" area, a blank window is displayed in which the user can enter an SQL statement to select records from the profile data source identified in the selection box 366.

The "Output Settings" definition area 378 of the Job Setup dialog box 360 shown in FIG. 44 has a "Send to" selection box 380, which allows the user to select the output type in which the documents produced by the job are supposed to be created. The "PPD" selection box 382 allows the user to select a PostScript Printer Definition file. When the job's output will be created in PostScript, such a PPD file is used to define the capabilities of the printer to which the job's output will be sent, so the PostScript generated will not exceed the capabilities of the printer.

The "Properties" button 384 allows the user to pull up a dialog box that allows the user to select more specific parameters for the particular output desired. The "Pages" controls 386 allows the user to select whether or not all the pages in the template selected in the "Template" selection box 364 are to be included in the document produced for each profile record, or whether only one or more selected pages are to be so produced.

The "Automation" check box 388 enables the user to select that the job defined in the current Job Setup dialog box is to be the default job that will be used if a call is made to produce a document in a transactional mode, discussed above with regard to the selection box 374, if no other job is specified in such a call.

Returning to the jobSetup routine of FIG. 85, if the user selects the "Preview" button 390 shown in FIG. 44, steps 1460 and 1462 will call the jobPreview sub-routine 1472 shown in FIG. 86.

As was stated above with regard to FIG. 86, this sub-routine includes a step 1474, which displays the Job Preview record selector 153 shown in FIGS. 3 and 6. As can be seen in FIG. 6 this selector 153 displays a table showing the records and fields of the profile records that have been selected by the record selection criteria contained in the "Record Selection" area 368 of the Job Setup dialog box, shown in FIG. 44, of the job for which the jobPreview routine has been called. When step 1474 of FIG. 86 first displays the record selector, the first record in the table is automatically selected.

Each time a profile record is selected in the record selector, including the automatic selection of the first record by step 1474, step 1476 causes steps 1478 through 1488 to be performed. Step 1478 calls createVariableValueTree sub-routine 1490 shown in FIG. 87 for the job's template with the selected profile record.

As is shown in FIG. 87, the createVariableValueTree sub-routine has a step 1492. which adds each unique variable name occurring in the template for which it has been called to a temporary variable list. Then a step 1494 performs a loop for each variable name in this temporary variable list. This loop is comprised of steps 1496 through 1506. Step 1496 calls the map routine 1508 shown in FIG. 88 for the variable name by using the profile record with which createVariableValueTree has been called to obtain a matching value for the variable.

As in shown in FIG. 88, the map routine includes a step 1510, which executes the content-mapping rule associated with the variable name for which it has been called, using the profile record with which it has been called.

If the content-mapping rule is a MediaBank query, step 1510 includes the execution of a conditional statement 1512, which will cause steps 1514 through 1522 to be performed. Step 1514 will instantiate the MediaBank query's associated variable SQL query template, of the type shown in FIG. 42, by replacing each of its variable symbols with the current value of the corresponding field from the current profile record. Then step 1516 sends the instantiated variable query, such as the variable query shown in FIG. 43, to the MediaBank database. Step 1518 receives the results of the query back from the MediaBank database, which results will be the path name of a selected file if the query is successful. If the query is successful, step 1520 returns the selected file path name as the value matching the variable name with which the map routine has been called. If, however, the query to the MediaBank database was unsuccessful, step 1522 returns a NULL value from the map sub-routine as the variable name's matching value.

Returning to the createVariableValueTree routine of FIG. 87, once step 1496 has obtained a matching value for the name on the temporary variable list for which the current iteration of loop 1494 is being performed, step 1498 tests to see if the variable value just obtained itself includes any variable elements. This would include any XML elements that have a data_tag attribute set equal to a variable name. If this is the case, step 1500 adds each such data_tag associated variable name to the temporary variable list for which the loop 1494 is being performed. This allows the createVariableValueTree routine to create a variable value tree that includes values for all variable elements within a template, including those which have been included in the template as the result of ingesting variable values that themselves include variable elements.

After the test and possible response contained in steps 1498 and 1500, step 1502 creates an XML variable value element 398 of the type shown in FIG. 46 for the variable name within a pf_data file. As is indicated in the case of the variable value element 398A, shown in this figure, such variable value elements can themselves be XML sub-trees if the content associated with the variable name as a result of the mapping is itself a sub-tree. As explained above, such variable value elements can themselves include variable elements, or can themselves represent area templates.

As shown in FIG. 87, step 1502's process of creating a variable value element 398 includes testing to see if the matching value produced for the variable name is a NULL value. If so, it further tests to see if the content-mapping rule associated with the variable name had the "OK to publish without value" checkbox 304 shown in FIG. 37 checked. If so, step 1504 causes step 1506 to include a "suppressed" value for visibility attribute of the variable value, as is shown in FIG. 46 for the variable value elements 398B. This will cause these elements to be allocated no space, and no visibility, in the layout of the instantiated template into which they are ingested.

Returning to the createVariableValueTree routine of FIG. 87, once loop 1494 has produced a value, either a non-NULL value or a NULL value, for each variable name in the template for which the createVariableValueTree routine was called and for each variable name that has been, mapped into that template, the pf_data file it has created will be an XML variable value tree structure containing all of the variable values needed to instantiate a given template for a given profile record, using a given content-mapping rule set. At this point the createVariableValueTree sub-routine will return to the program that has called it.

Returning now to the jobPreview routine of FIG. 86, when the call to createVariableValueTree in step 1478 of the job preview routine returns, step 1480 calls the mapVariableValuesIntoVariableElements sub-routine for the job template, using the variable value tree created by the previous call to createVariableValueTree routine.

FIG. 89 describes the mapVariableValuesIntoVariableElements routine 1524. It starts with a step 1525, which adds each variable element, that is, each element with a data_tag attribute-value pair, to a variable element list. Then the rest of the routine is comprised of a loop 1526, which is performed for each variable element in the variable element list. For each such variable name, steps 1528 through 1536 are performed.

Figure 47:
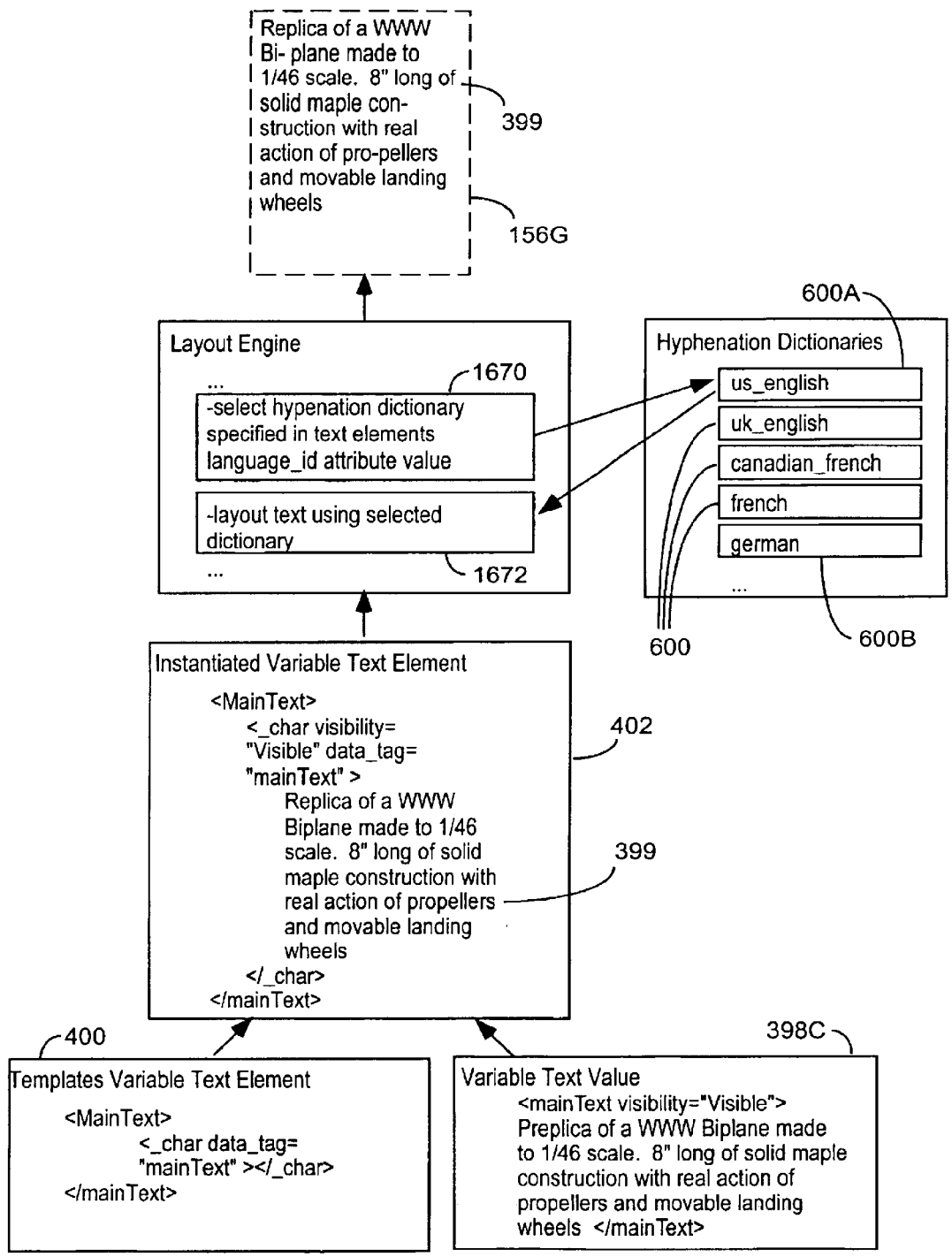
FIGS. 47 and 48 illustrate how a variable text value can have its contents and attribute values grafted into a variable text element, and how the language_id attribute value can be used to select which hyphenation dictionaries are used in the layout of text elements.
Figure 48:
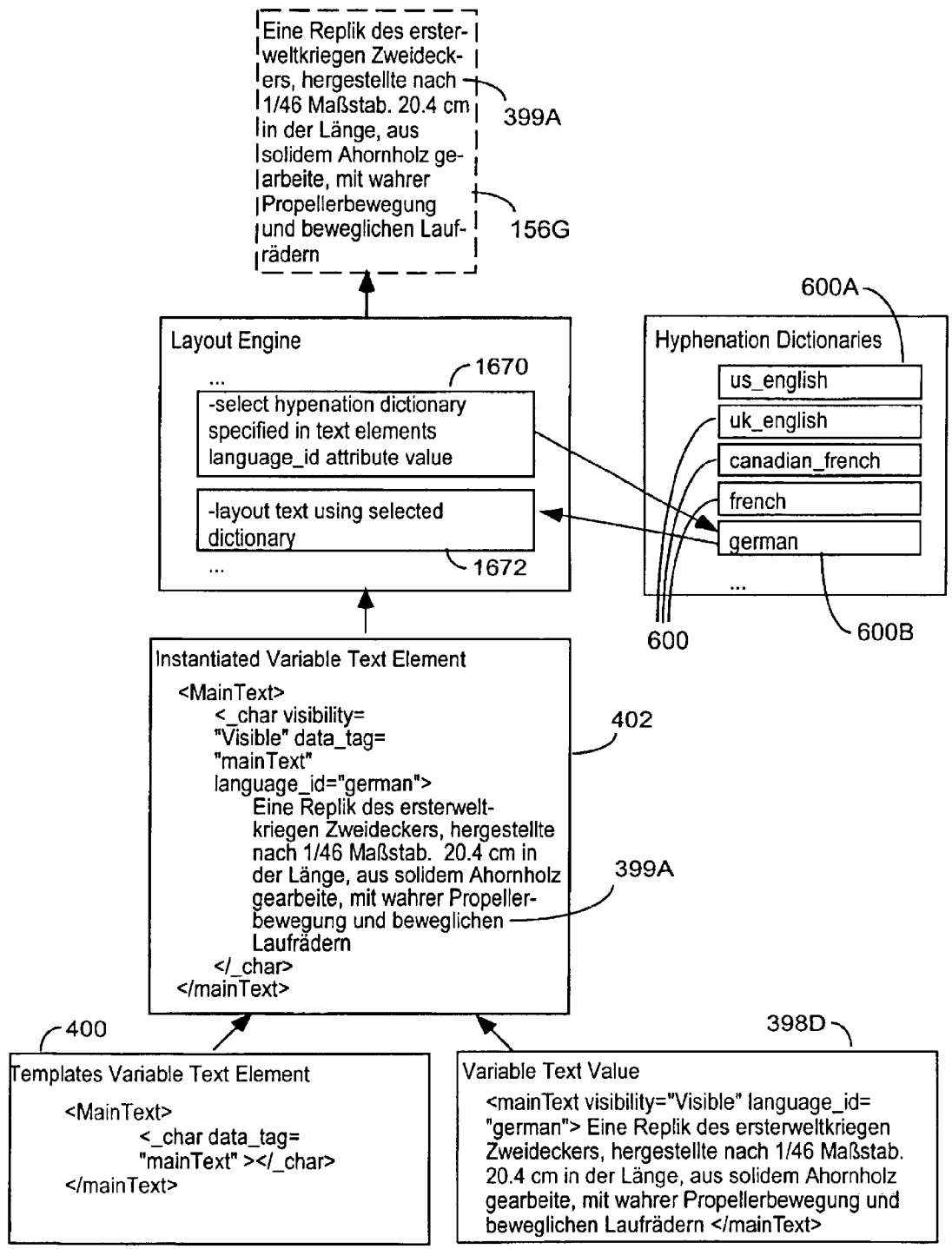

Step 1528 finds the variable value in the pf_data variable value tree returned by the createVariableValueTree routine of FIG. 87 whose start and end tags have a name equal to the value of the current variable element's data_tag attribute. For example, FIGS. 47 and 48 illustrate the mapping of different variable values into the same template variable element 400 during the production of different documents in response to different profile records. In FIGS. 47 and 48, a variable value 398C and 398D, respectively, is found whose start tag starts with a name "mainText" that matches the value for the data_tag attribute contained within the variable element 400.

Once a variable value matching the given variable element for which FIG. 89's iteration of loop 1526 is being performed has been found, the iteration's step 1532 adds any attribute values contained in the corresponding variable value to the corresponding attribute in the variable element. This is shown in both FIGS. 47 and 48 by the incorporation of the visibility="Visible" attribute-value pair from the variable value 398C and 398D, respectively, into the instantiated variable text element 402. It is also shown in FIG. 48 by the incorporation of the language_id="German" attribute-value pair from the variable value 398D into the instantiated variable element 402. In the preferred embodiment, this process enable a variable value to change almost any attribute value of a variable element into which it is mapped, including, without limitation, its flex behavior attributes.

Once step 1532 of FIG. 89 has been completed, step 1534 leaves any variable element attribute values that have been defined statically in the template for the variable element in effect unless such variable attribute values have been overridden by the variable value that is being mapped into it, in which case such overriding variable attribute values will be in effect for the purpose of the instantiated variable element.

Then step 1536 places any content, or child, elements that occur between the start and end tags of the current variable value between the start and end tags of the current variable element. This is indicated in FIGS. 47 and 48 in which the content of the mainText variable value 398C and 398D, respectively, is mapped into the MainText variable element 402. In FIG. 47 this text is in English, and in FIG. 48 it is in German. If the variable value for which step 1536 is being performed includes multiple content elements, as does the variable value 398A shown in FIG. 46, all such content elements will be placed between the start and end tags of the variable element.

After step 1536 is complete, step 1537 tests to see if any of the child elements added between the variable elements start and end tag itself has a data_tag attribute, and if so it adds each such variable element to the variable element list for which the loop 1526 is being performed.

Once step 1526 has been complete for each variable element in the variable element list, each variable element in the instantiated template, including variable elements brought into the template by the content of variable values grafted on to the template's sub-tree, will have been instantiated, that is, will have variable values appropriate for the current profile record mapped into them, and the template will be ready for layout.

Returning now to the jobPreview routine of FIG. 86, once the call to mapVariableValuesIntoVariableElements in step 1480 is complete, step 1480 tests to see if a portion of the template has been previously selected for display by the current call to the jobPreview. If so, step 1484 generates the layout and display of that portion of the template which was previously displayed with the ingested content associated with the current profile record. Because of the operation of steps 1482 and 1848 a user when selecting different records in the profile record selector will see corresponding portions of the template with different data ingested as a result of different profile records. If the test of step 1482 does not find that any portion of the template has been previously displayed by the current call to the job preview sub-routine, steps 1486 and 1488 generate layout and generate a display of the document window for the start of the template associated with the current job, with the ingested content associated with the currently selected profile record.

Returning now to the jobSetup routine of FIG. 85, if the user selects the submit button 392 of the Job Setup dialog box 360 shown in FIG. 44, steps 1464 and 1466 call the runJob sub-routine 1538 shown in FIG. 90, which is normally used to generate all of the documents in a job on a batch basis.

As shown in FIG. 90, this sub-routine includes a loop 1540, which is performed for each record that has been selected by the record selection criteria defined in the "Record Selection" area 368, shown in FIG. 44, of the Job Dialog box of the current job for which the runJob sub-routine has been called.

This loop 1540 includes steps 1542 through 1554. Step 1542 selects the next profile record associated with the current job. Then step 1544 calls the createVariableValueTree routine for the job's template with the selected profile record. This is the routine described above with regard to FIG. 87 that creates a variable value tree, in the form of XML pf_data file of the type shown in FIG. 46, having a variable value for each variable name associated with the current template and any variable values that are mapped into the template for the selected profile record.

Next, step 1546 of FIG. 90 calls the mapVariableValuesIntoVariableElements routine, described above with regard to FIG. 89, for the job's template and the variable value tree returned by the call to createVariableValueTree in step 1544. This will map the appropriate variable value attribute values and contents into all of the variable elements contained in the template and in any variable values ingested into the template. Once the template has been fully instantiated, step 1548 will perform a loop for each page that has been selected by the page selection controls 386 shown in the Job Setup dialog box, of the type shown in FIG. 44, for the current job. This loop performs steps 1550 through 1554 for each such page. If the page is to be sent out as HTML, steps 1550 and 1551 are called to generateHTMLPage sub-routine 1556 shown in FIG. 91. As is described in more detail below, this routine generates an HTML file for the page, which can be stored on a web site or sent out over the web as dynamic content to a particular client computer that may have requested it.

If the job is to be printed, steps 1552 and 1554 of FIG. 90 call the printPage sub-routine 1568 shown in FIG. 92. As is described in more detail below, this routine will lay out the page, rasterize it, and then either send it either to a printer or to a file from which it can later be printed, depending on the parameters that have been selected by using the "Property" button 384 of the job's associated Job Setup dialog box shown in FIG. 44.

Figure 49:
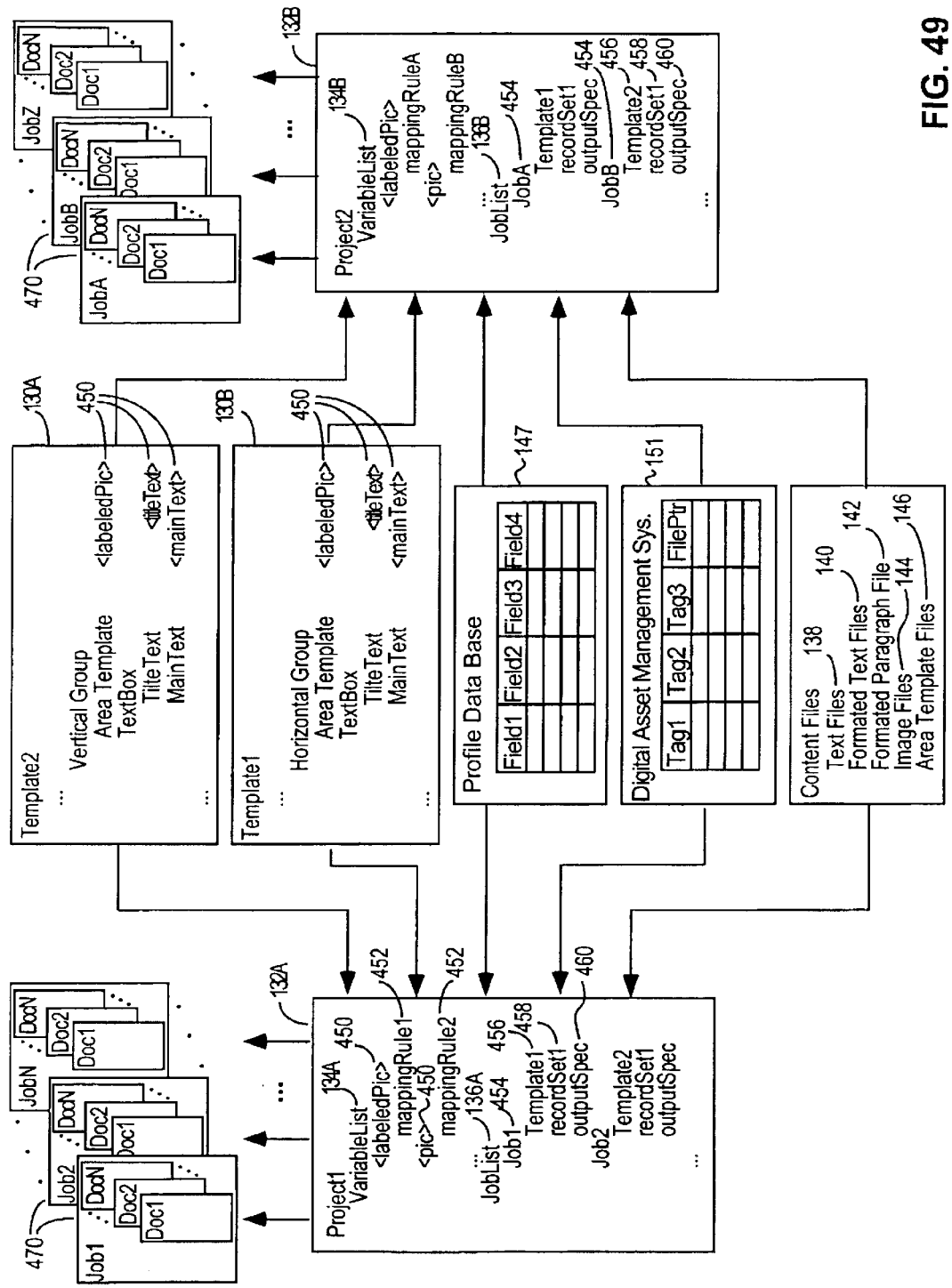
FIG. 49 illustrates how the system shown in FIG. 2 allows different sets of content-mapping rules to be used with a given template, and how it allows a different template to be used with a given set of content-mapping rules.

FIG. 49 illustrates how the present invention allows different sets of content-mapping rules, to be saved in a persistent form in different project file (numbered 132A or 132B). It also illustrates how each such set of content-mapping rules can be selected for use with one or more different template files (numbered 130A or 130B), and how a given template file can be used with the content-mapping rule sets of different projects.

As described above with regard to FIG. 2, each project file contains a variable list (numbered 134 in FIG. 2 and 134A and 134B in FIG. 49) that represents a set of content-mapping rules 452. Each content-mapping rule in such a set is associated with a variable name 450, as has been described above with regard to the Variable Editor dialog boxes of FIGS. 37 through 41. Each project file normally also includes a job list, such as the job lists 136A and 136B shown in FIG. 49, which includes one or more jobs.

As is explained above with regard to the Job Setup dialog box shown in FIG. 44, each job normally includes a template selection 456, shown in FIG. 49, which indicates which template is to be used in the job with the set of content-mapping rules defined in the job's project file to create a set of one or more documents.

Each job 454 also includes a record set selection 458, which corresponds to the record selection criteria set forth in the "Record Selection" area 368 shown in FIG. 44 of the Job Selection dialog box. This selection specifies which profile records are to each have a corresponding document created for them in the current job.

Each job in a project also includes an output specification 460 defined by the "Output Setting" area 378 of the Job Setup dialog box shown in FIG. 44, which specifies the form in which the file is to be output, such as postscript or HTML, and specifies if it is to be sent to a printer, to a file, or over a computer network to a client computer.

As is indicated in FIG. 49, different jobs within a given project can use different templates, provided that the content-mapping rule set associated with the job's project has a content-mapping rule for each variable name that occurs in each such template. Similarly, as is shown in FIG. 49, a given template can be used in conjunction with different project files provided that each such project has a content-mapping rule corresponding to each variable name contained in that template.

For example, as is shown in FIG. 49, Template1 is used both by Job1 in Project1, and by JobA in Project2, and Template2 is used by Job2 in Project1 and by JobB in Project2. The ability to use different templates with a given content-mapping rule set is often valuable. For example, it enables one to prepare a brochure that can have multiple different forms. For example, the same variable content can be used when one template is to be mailed, includes a mailing cover, and has a certain size format; with a second template that is designed to produce PDF output to be sent over the Internet in response to requests; and with a third template in the form of one or more HTML pages that could be displayed dynamically to client computers, as will be discussed in more detail below with regard to FIG. 50.

There are many other uses for enabling different templates to be used with a given set of content-mapping rules, such as producing documents of different length, or with focuses on different areas of detail but that share common variable elements.

Similarly, it is often of value to be able to use a given template with different sets of content-mapping rules, which in the preferred embodiment of the invention are contained in different projects. For example, if one wanted-to produce corresponding but different sets of variable documents that obtain their variable content from different databases in which data is indexed differently, this could be accomplished by running each of those different jobs from a different project that has a different set of content-mapping rules.

Figure 50:
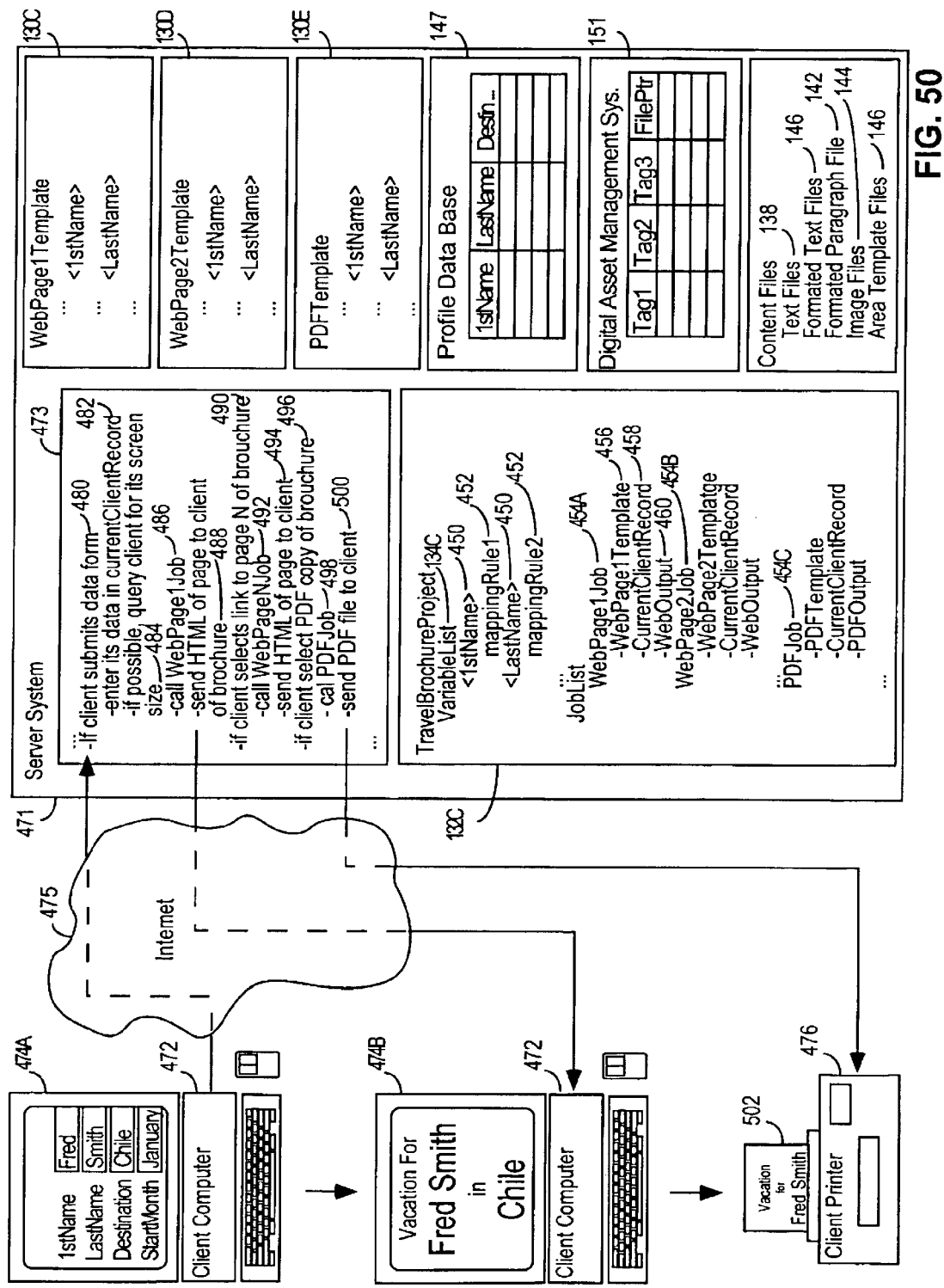
FIG. 50 illustrates how aspects of the present invention can be used to enable a given set of content-mapping rules to be used with different templates, some of which can be used to create HTML pages for distribution over the world wide web and some of which can be used to create TDF files that can be downloaded over the web for viewing or printing.

FIG. 50 is somewhat similar to FIG. 49, except it shows an interactive server program 473 running on an Internet server can used with aspects of the present invention to provide dynamically laid-out variable documents of the Internet. The figure also shows how a given project file 132C can be used with different templates to provide either dynamically created web pages, or dynamically created PDF documents for use by client computers over the Internet.

FIG. 50 shows a server system 471, which is connected through a computer network 475 to a client computer 472. This client computer is drawn twice in FIG. 50 to represent it at successive points in the process of interactively creating dynamic web content. The top left corner of FIG. 50 shows the client computer with a screen 474A, which has an HTML form on it that allows the user to enter values for each of a plurality of fields contained within that form. In the example of FIG. 50 this form includes fields asking for information such as the user's first and last name, a destination to which he would like to travel, and a month in which he would like to start such a trip.

In FIG. 50 when the interactive program 473 detects in a step 480 that the user of the computer 472 has submitted the data contained in the form shown in the screen 474A, step 480 causes steps 482 through 484 to be performed. Step 484 enters the data contained in the form that was just submitted into a currentClientRecord that can be used as a profile record for purposes of creating variable content with the present invention.

Next, if possible, step 484 queries the client computer 472 to find out its screen size and if possible other parameters about it, such as the browser it is using. If such information cannot be obtained the job will be run with default values that are considered to provide the best overall results for most client computers. If the query does provide information, such as screen size, the dynamically created web pages can be sized to such a resolution.

Next, step 486 calls the WebPage1Job 454A, which is shown in the TravelBrochureProject file 132C, which causes that job to be performed. This will cause a single web page to be created using the WebPage1 Template 130C shown at the upper right-hand corner of FIG. 50, with the CurrentClientRecord into which information just submitted by the user has been placed as the single profile record for that job, and with the output specification for the job specifying that it is to use the generateHTMLPage routine of FIG. 91 to generate a web page as output for the job.

As shown in FIG. 91, the generateHTMLPage routine will test to see whether it has been able to obtain information on the client's screen size in step 1558 and, if so, if the template's page element has a maximizable width. Step 1560 will then cause 1562 to set the page element's width to the width corresponding to the client's screen width. If step 1558 finds out that the system does not know the client's screen size, the template's page element will be left at its default value. Next, step 1564 calls layout routine 1590, shown in FIG. 94, for the page. As will be described below, the layout routine will cause the system to determine the size and location to be associated with each layout element in the current HTML page. Then step 1566 of FIG. 91 will generate HTML corresponding to the layout. This includes specifying the size and location of all shape elements in the HTML layout to correspond to those determined by the layout process performed in step 1564, and causing any text elements contained with any such shape elements to have a corresponding HTML form that will cause them to occur within such shapes. Once this has been done, step 1567 will send the HTML file out over to a client if the output specification of the job instructs it to do so.

Returning to Word Wide Web application of the invention shown in FIG. 50, in that figure it is assumed that none of the web page jobs used in it instruct the HTML file to be sent out over the network, as just described with regard to step 1567 of FIG. 91, but instead that step 1488 of FIG. 86 does that job after the call to such web jobs are complete. Once step 1488 is complete, the client's computer will display an image of the dynamically created web page, as shown in the screen 474B in FIG. 50. This dynamically created web page can include variable content from the form that the user submitted with the screen 474A shown at the top of that figure, as well as variable content selected from among the content files 138, 140, 142, 144, and 146 shown in FIG. 50 by operation of content-mapping rules, including those which use the data asset management system 151, to help make such selections on the basis of the values of fields entered in the form shown in screen 474A.

If the user of the client computer selects a link to a different web page of the brochure generated by the TravelBrochureProject of FIG. 50 being shown on the screen 474B, step 490 causes steps 492 and 494 to be performed. Step 492 will call a web page job for the selected page. For example, if the user selects to see page two, step 492 will call WebPage2Job 454B. Calling this job will have substantially the same effect as calling the WebPage1Job 454A described above; that is, it will cause the template for the selected web page to have variable content mapped into its variable elements and it will produce a layout of that template and then produce an HTML description of that layout. Then once step 492 is done, step 494 will send the HTML of the page to the client so that it can be viewed on his computer.

If the user selects through a link or button available on one of the web pages created by the server system 471 to see a PDF copy of the brochure, step 496 causes steps 498 and 500 to be performed. Step 498 calls the PDFJob 454C.

Calling the PDFJob will cause the runJob routine 1538 shown in FIG. 90 to be performed for the PDFTemplate using the CurrentClientRecord submitted from the screen 474A shown at the top left corner of FIG. 50. This will create a variable value tree having a variable value for each variable element in the PDFTemplate or in any variable content mapped into that template. It will also map all such variable values into such variable elements within the template. Finally it will call the printPage routine 1568, shown in FIG. 92, for each page in the PDFTemplate.

As is shown in FIG. 92, the printPage routine has a step 1570, which calls layout for the current page. This determines the size and location of each layout element, whether it be a shape element or a text element within the current page of the template for which it is being called. Then step 1572 creates a rasterized page image for the page, which includes, for each layout element in the page, displaying the element in the size and position calculated for it by the page's layout with all of the element's visual attributes displayed. Once this is done, if the output specification dictates it the print page routine will send the page image to a printer, store it in a file, or send it over the network to a client computer.

In the example shown in FIG. 50, it is assumed that the print page routine itself does not send the PDF file to the client directly, but rather that a step 500 sends the PDF file created by step 1578 of FIG. 92 to the client once that file has been created dynamically for the entire template. This is indicated in FIG. 50 by printed document 502, which is shown being printed on the client computer's printer 476. The PDF file could be viewed directly on the screen of a client's computer as well as being printed.

FIGS. 51 through 58 illustrate some of the impressive flexibility that the present invention allows the page layout with variable documents.

Figure 51:
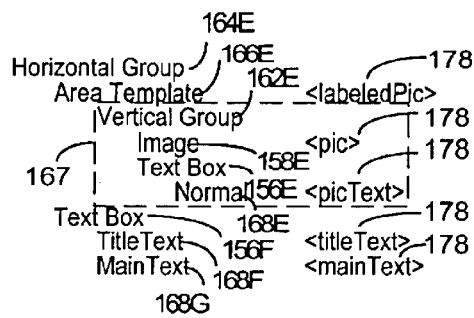
FIG. 51 illustrates a portion of a template tree as it has been instantiated by the ingestion of an area template variable value.

FIG. 51 illustrates a sub-portion of a template tree, which includes an area template element, a variable area template element 166E into which a sub-tree 167, shown encircled by dotted lines, has been mapped.

Figure 52:
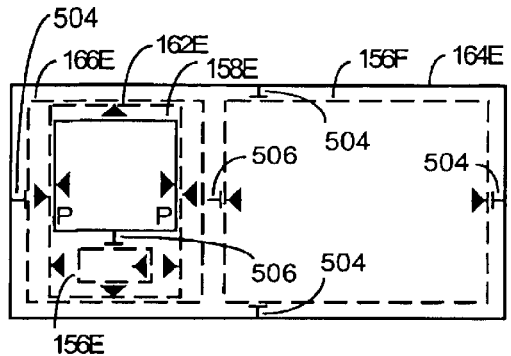
FIG. 52 provides a graphical representation of the layout elements shown in FIG. 51, illustrating the margins, bumpers, and flex attribute values that affect the layout of those elements.

FIG. 52 provides a graphic illustration of the hierarchical sub-tree elements shown in FIG. 51. As can be seen from both these FIGS. this template portion has as its highest level element a horizontal group box 164E. This contains within it two top level child elements that are horizontally displaced relative to each other within the h-box: the variable area template element 166E associated with the variable name "labeledPic," and a text box element 156F. In the example shown in these figures, the area template variable element has had mapped, or ingested into it, a vertical group box 162E, which has two child elements, a variable image element 158E with the variable name "pic," and a text box 156E that includes a variable text element 168E associated with the variable name "picText".

The text box 156F includes two variable text elements as children: a TitleText element 168F associated with the variable name "titleText," and a MainText element 168G associated with the variable name "mainText".

In FIG. 52 the flex attributes of individual elements are indicated by arrows pointing in the dimension of the shape having such a flex characteristic. For example, the vertical group 162E, the image element 158E, and the text box 156F both have a maximized width (i.e., a maximized flex width behavior attribute value), and the area template 166E, and the text box 156E both have a minimized width (i.e., a minimized flex width behavior attribute value). All of the other dimensions of the shapes in FIG. 52 are fixed, (i.e., have a none flex width or flex height behavior attribute value) with the exception of the vertical dimension of the vertical box 162E, which is maximized, and the vertical dimension of the image element 158E, which has a proportional height (i.e., a proportional flex height behavior attribute value). In the example of FIG. 52 the maximized height of the v-box 162E will cause that v-box to expand to the fixed height of the area template element 166E into which it is ingested. The proportional height of the image element will cause the image element to maintain the same aspect ratio as the image file mapped into the image element, regardless of the image element's changes in width resulting from the image element's maximized width.

FIG. 52 also provides graphic illustration for the internal and external margin of each shape having such a margin by means of little T-shaped markers, which are labeled 504 in the case of internal margins and 506 in the case of external margins, or bumpers.

FIGS. 53 through 56 illustrate how the hierarchical layout elements described in FIGS. 51 and 52 change appearance in response to different values for their variable elements.

Figure 53:
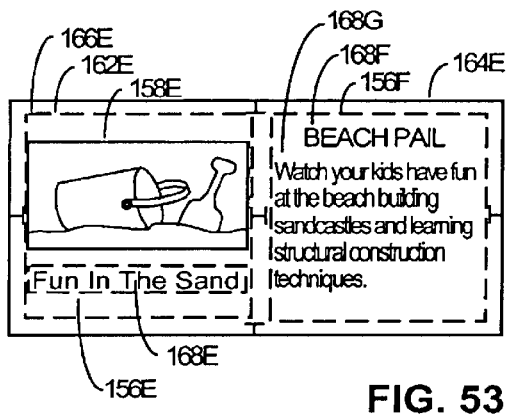
FIGS. 53 through 56 show how the portion of the template tree shown in FIGS. 51 and 52 look when different data values are ingested into them.
Figure 54:
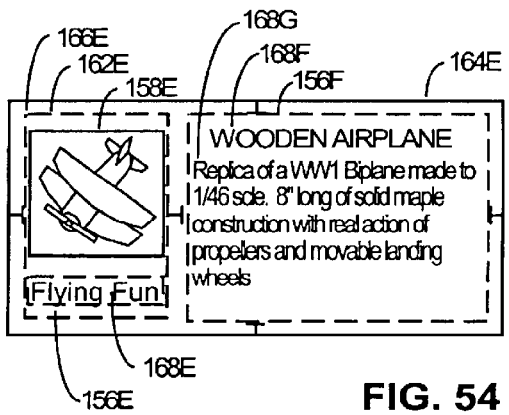

FIGS. 53 and 54 provide two illustrations of this portion of the template when different variable values, having different sizes, are mapped into each of its variable elements. In FIG. 53 the ingested variable values all relate to a beach pail. In FIG. 54 the variable elements all mapped in relate to a wooden airplane.

In FIG. 53 text element mapped into the text box 156E is wide and in FIG. 54 it is narrow. Since the v-box 162E and area template container 166E (shown sharing the same dotted rectangular lines in FIGS. 53 through 55) both have a minimized width, and since, in the embodiment of the invention shown, the tendency of a container to minimize dominates over the tendency of a contained element to maximize, in each of these figures the area template container 166E minimizes to the width of the v-box 162E, the v-box 162E minimizes in width to the width of the text box 156E, and the text box 156E minimizes around the size of the variable text element that has been mapped into it. This causes the maximized width of the variable image element 158E to equal the width of the text box 156E, causing the image element in FIG. 53 to be substantially wider than the image element in FIG. 54. In both figures, the large, maximized-width text box 156F expands into all of the space left available after the minimization of the vertical box 162E, after taking bumpers and internal margins into account.

It can be seen from comparing FIGS. 53 and 54 that the maximized width text box 156F and the minimized width area template 166E perform size sharing. That is, as the minimized-width one of these shapes expands and contracts in response to the variable size of its content, the maximized-width one of them contracts and expands, respectively.

Figure 55:
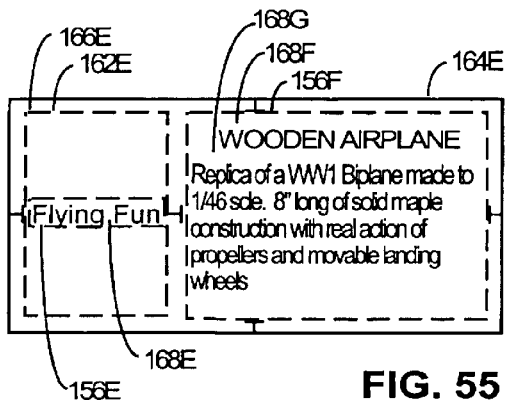

FIG. 55 provides an example of the layout of the horizontal group 164E shown in FIGS. 51 and 52 if there is no image value mapped into the variable image element 158E. If this is the case, steps 1504 and 1506, described above with regard to FIG. 87, will cause there to be a "suppressed" attribute value for the visibility attribute in the variable value that is mapped into the variable image element. As will be explained below, any layout element that has a suppressed visibility will be treated as if it does not exist for purposes of layout, as can be seen in FIG. 55, in which the image element is totally missing and in which the only remaining element in the vertical group, the text box 156E, is shown in the middle of the vertical group, or v-box, 162E since it is assumed for purposes of these figures that the elements of that v-box have a centered vertical alignment.

Figure 56:
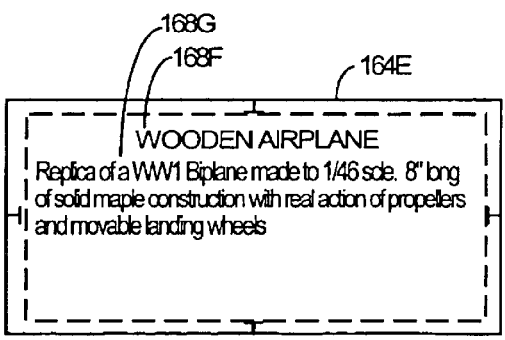

FIG. 56 provides an example of what happens if no variable value is mapped into the variable area template element 166E shown in FIG. 51. In this case, the area template variable itself will have a "suppressed" visibility attribute mapped into it and it will be treated as non-existent for purposes of the layout of the element of which it is a direct child. This is shown in FIG. 56, where the area template element 166E, shown in FIGS. 51 through 55, is not shown at all and the text box 156F, which has a maximized width attribute, takes up all of the space within the horizontal group 164E, except that occupied by the margins 504 shown in FIG. 52.

Figure 57:
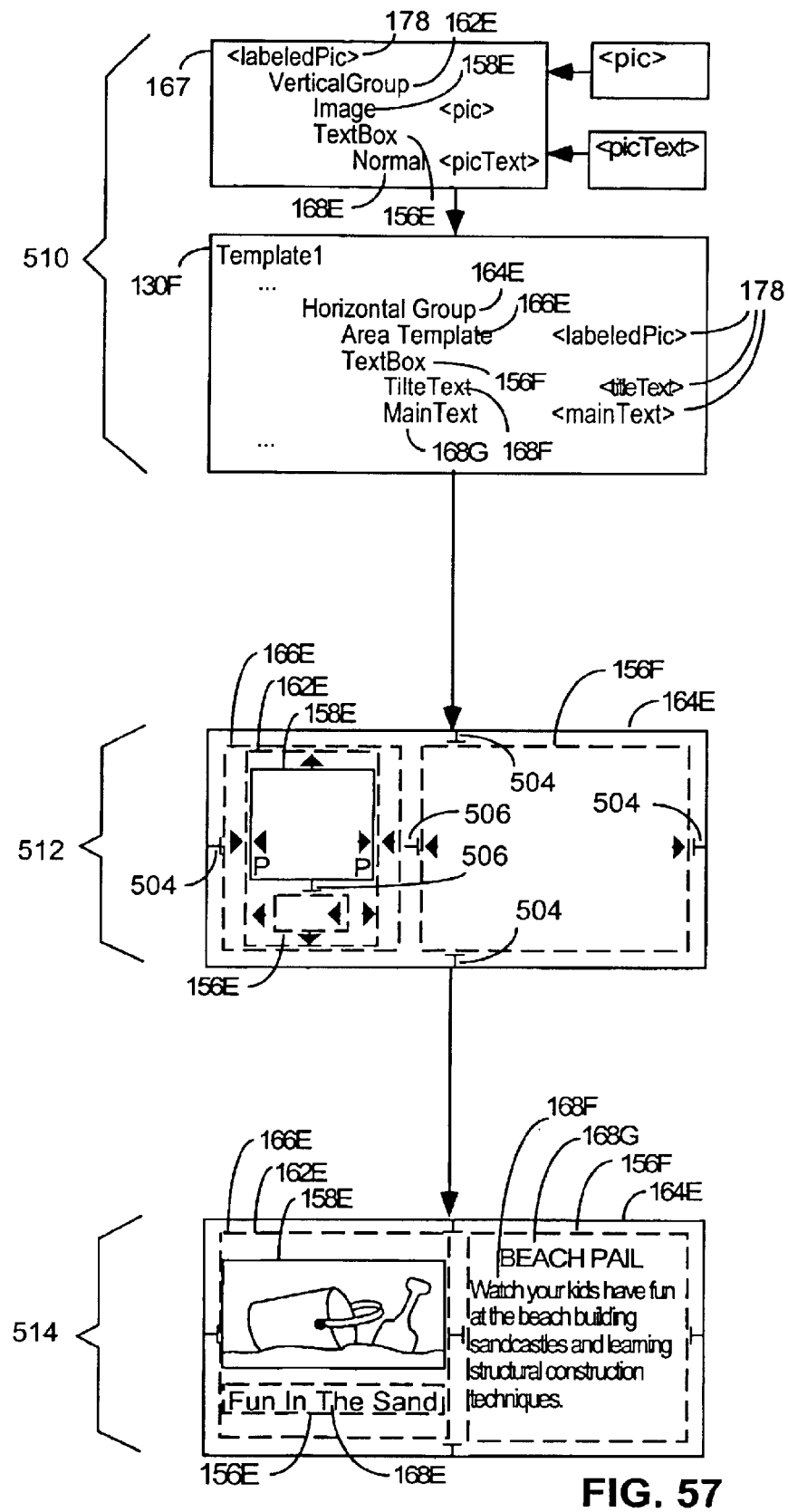
FIGS. 57 and 58 illustrate how a given area template variable value can be ingested into different templates and, because of flex attribute values, can have considerably different appearance when being ingested into those different templates.
Figure 58:
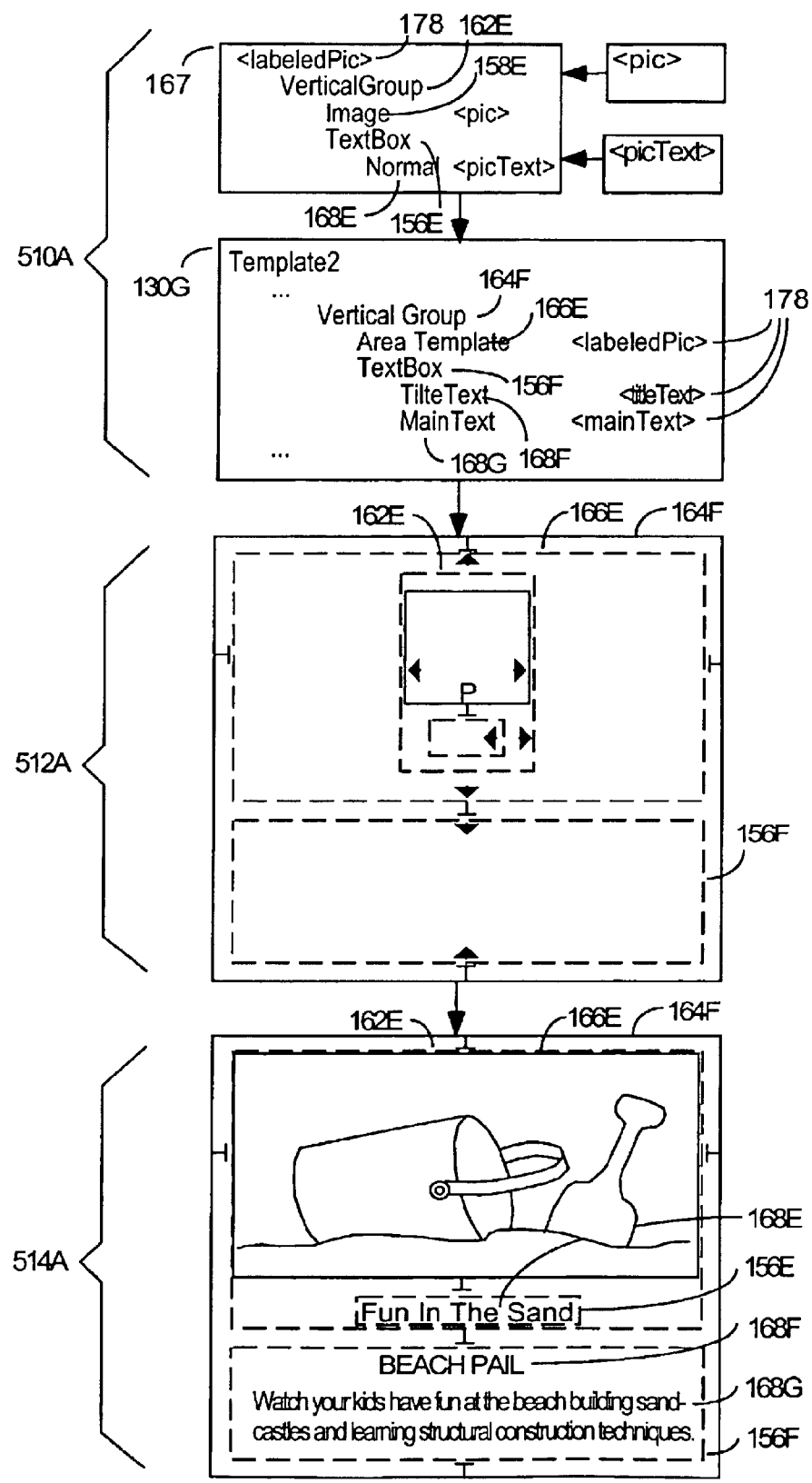

FIGS. 57 and 58 illustrate how the flexible characteristics of the current invention tend to cause variable values to be laid out appropriately, even if they are ingested into locations of different size, including locations of different sizes in different templates.

FIG. 57 includes a top portion 510, which shows Template1 130F, which contains a horizontal group 164E similar to that described above with regard to FIGS. 51 and 52, and it shows the variable area template value 167, which is mapped into the horizontal group 164E in FIGS. 51 and 52. Part 510 of FIG. 57, the horizontal group 164E, is shown containing only those of its elements which are statically defined within its template. The elements of the variable area template value 167 are shown separately.

The middle portion 512 of FIG. 57 is identical to FIG. 52, and it represents the shape elements of the horizontal box 164E once the area template value 167 has been mapped into it, indicating the flex properties of each such shape.

The bottom portion 514 of FIG. 57 is identical to FIG. 53. It illustrates the appearance of the horizontal box 164E when the Beach Pail values shown in FIG. 53 are mapped into the area template value 167 and the other elements of the h-box 164E.

FIG. 58 shows, however, that if the all the same variable values, including that same area template value, shown in FIG. 57, are mapped into portions of different templates, they will have a very different layout. This is because Template2, shown in the upper portion 510A of FIG. 58 has a vertical group 164F, rather than the horizontal group 164E shown in FIG. 57, as the container for the area template 166E and its sibling text box 156F.

The middle portion 512A of FIG. 58 provides a graphic representation of the shape elements contained within the vertical group 164F once the area template 167 has been mapped into that v-box, and the flex properties, if any, of each such shape element. As is shown in this portion of FIG. 58, the area template container 166E has a fixed width and a maximized height attribute. The text box 156F has a minimized height and a fixed width. The height and width attributes of the variable area template value 167 are the same in FIG. 58 as they were in FIG. 57 and in FIG. 52, since it is the same area template value that being ingested in both cases. That is, the text box 156E has a minimized width, both the vertical box 162E and the image element 158E have a maximized width, the vertical box 162E has a maximized height, and the image element has a proportional height that causes it to maintain the aspect ratio associated with its source image file, regardless of the width it ends up having.

As shown in the bottom portion 514A of FIG. 58, when the same area template 167 and the same Beach Pail values are ingested into the vertical group 162E they assume a very different appearance than when they were ingested into the horizontal group 164E of FIG. 57, a size and shape that is more appropriate for the different space available for them in FIG. 58.

FIGS. 91 through 103 describe the major layout-related functions of the preferred embodiment of the present invention shown in FIG. 2. The generateHTMLPage and printPage routines of FIGS. 91 and 92, respectively, have been described above.

FIG. 93 describes the updateScreen routine 1580. This routine is called by all the steps, described above, which update the document window of either the designer or the producer program in response to any changes made to the template or variable values of the document being laid out.

This updateScreen routine includes a step 1582, which determines which elements of the current page have to be laid out to generate an updated screen, given the current location of the screen relative to the page and given any changes that have been made, either to the template, to variable values, or to viewing parameters.

Next, step 1584 performs a loop for each such element that needs to be laid out and/or redisplayed by calling the layout function 1584. Once this has been done, step 1586 performs a loop for each element that has been changed, which includes drawing an image of the portion of the element that is on the screen with the element's size and position calculated by the page's layout and with all of the element's visual attributes displayed.

FIG. 94 illustrates the main layout routine, called layout, which is called to lay out all shape elements. As is shown above with regard to FIGS. 91 and 92, this routine is called to start the layout of a given page, with the page as the element to be laid out, since a page is the highest level shape that can occur within a document. Then as will be explained below, this routine tends to be called recursively for any child shapes contained within a given shape. As in shown in FIG. 94, this layout routine is called with a parameter identifying the particular shape for which it is called within an instantiated template tree for which layout is being performed, and it is called with available width and available height parameters that indicate the amount of room available for its layout. In the case of the page, this would be the size available to the page shape given the page's size and its margins. When layout is being called for a child shape within the page, this availableHeight or availableWidth is a function of the available space for the child within its parent's containing shape.

The layout sub-routine includes a step 1592, which tests to see if the shape's visibility attribute has a "suppressed" value. As stated above with regard to steps 1504 and 1506 of FIG. 87, if the value mapped into a variable element's variable name is a NULL value, and if the variable name's corresponding Variable Editor window has the "OK to publish without value" check box shown in FIG. 37 checked, that variable element will have its visibility attribute set to a "suppressed" value. If the test of step 1592 is met, steps 1594 and 1596 are performed. Step 1594 treats the shape for all layout calculations as if it did not exist and step 1596 indicates that there is to be no graphic rendering of the shape nor any rasterization or screen image generation. FIGS. 55 and 56, discussed above, illustrate the effect of steps 1592 through 1596. As described above, FIG. 55 describes a situation where an image element 158E is suppressed and FIG. 56 displays a situation where an area template variable element is suppressed.

If the shape for which layout has been called does not have a suppressed visibility attribute value, step 1598 of FIG. 94 causes steps 1600 through 1622 to be performed. These steps call the particular layout sub-routine appropriate for the particular type of shape for which the layout routine of FIG. 94 has been called.

If the shape for which the layout routine in FIG. 94 has been called has no child elements in the instantiated template tree, then steps 1600 and 1602 call the layoutEmptyShape routine 1624 shown in FIG. 95 for the shape with the same available width and available height with which the layout routine in FIG. 94 itself was called.

As FIG. 95 shows, this sub-routine starts with steps 1626 and 1628, which cause any flexible dimensions of the shape to expand as far as possible. If the dimension is a width that has either a maximized or minimized behavior attribute, step 1628 will cause that width to expand to the available width with which the layoutEmptyShape sub-routine has been called or to the shape's maximum width defined by the flex width maximum attribute 248, shown in FIG. 10. Similarly, if the shape has a flexible height, that is, a maximized or minimized height, step 1628 will cause that height to be equal to the available height with which the layout empty shape sub-routine has been called, unless that available height is larger than the value of the flex height maximum attribute 244, shown in FIG. 10, in which case it will be set to that maximum height.

Next, step 1630 of FIG. 95 tests to see if the shape has a minimized width flex behavior. If so it causes step 1632 to set the shape's width to the value defined by the flex width minimum attribute 249, shown in FIG. 10. Next, step 1634 tests to see if the shape has a minimized height and if so, it causes step 1636 to set the shape's height to the value of the shape's flex height minimum attribute pair 243, shown in FIG. 10.

Thus, the layout empty shape sub-routine causes a shape that has no children to assume a height equal to its fixed height, if it has a fixed height, equal to its minimum height if it has a minimized height attribute, and equal to the smaller of the available height with which the layoutEmptyShape sub-routine was called or the shape's maximum height attribute. It causes the shape's width to be determined in a correspondingly similar manner.

Returning to the layout routine of FIG. 94, if the shape with which the layout routine has been called is an image element, steps 1604 and 1606 will call the layoutImageElement sub-routine 1638 shown in FIG. 96.

As shown in FIG. 96, this routine starts with a step 1640, which tests to see if the shape has a maximized or minimized flex behavior for the shape's width and/or height. If this test is met, steps 1642 through 1648 will be performed. Step 1642 will change whichever of the shape's width or height dimension has such a flex attribute to the smaller of the available width or height with which the shape has been called or its maximum width or height defined by the attribute 244 or 248 shown in FIG. 10. Steps 1642 is identical to the step 1628 discussed above with regard to FIG. 95 in that it expands the current shape's flexible dimensions to their largest possible value, given the available width and height with which the shape's layout has been called and given the shape's maximum width or height attribute values.

Once step 1642 is performed, step 1644 tests to see if one of the shape's flex behavior attributes has a proportional value of the type discussed above with regard FIGS. 11, 12, and 15. If so, step 1646 finds the maximum possible height and width of a shape having the same aspect ratio as the image file that has been mapped in to the image element that can fit within the shape, given its current dimensions after step 1642. This sizing was illustrated in the example of the image elements 234C and 234F shown in FIG. 15. Once step 1646 has found the maximum size shape having the current images aspect ratio that will fit within the image element, step 1648 sets the image element's current height and width to that maximum possible size.

If the image shape does not have a maximized or minimized height or width attribute, the else statement 1647 will cause steps 1648 through 1652 to be performed. Step 1648 performs step 1649 for each dimension of the shape whose flex behavior attribute has a "source size" value. This step 1649 sets the image element's size in that dimension to the size of the image file that has been mapped into the image element, as was described above with regard to image elements 234 and 294A in FIG. 15.

Once the loop of step 1648 has been performed, step 1650 tests to see if one of the image element's flex dimension attributes has a proportional value. Since an image element cannot have two proportionally flexed dimensions and cannot have a minimized value, if this condition is met at this location in the program, it means that the shape's other dimension either a) has a fixed or b) has a source size value, which after step 1649 can be treated as a fixed value. If this is the case, step 1652 will set the proportional dimension to the length that would make the image element have the same aspect ratio as the image file mapped into it, given the image element's other fixed length dimension.

Returning to the layout routine of FIG. 94, if the shape element for which the layout routine has been called includes floating elements, that is, it is a text box having child elements laid out along one or more vertically displaced horizontal lines, such as is commonly the case with text elements, steps 1608 and 1610 call the layoutShapeIncludingFloatingElements routine 1654 shown in FIG. 97.

As shown in FIG. 97, the layoutShapeIncludingFloatingElements routine starts with steps 1656 and 1658, which are similar to steps 1626 and 1628, which start the layout empty shape sub-routine of FIG. 95. These two steps cause any of the dimensions of the shape that have either a minimized or maximized flex behavior to be expanded as much as is possible given the available width and height for which the layout of the shape has been called and given the shape's maximum width and height attribute values.

Next, step 1660 of FIG. 97 performs a loop for each child shape within the shape for which layoutShapeIncludingFloatingElements has been called having a minimized dimension. Normally most of the elements in a shape having floating elements are text elements rather than shape elements, but the preferred embodiment of the invention does allow shape elements such as images or text boxes to be floating elements. Such shape floating elements are normally placed in a shape box by using the insertShapeInText sub-routine described above with regard to step 1029 of FIG. 59 and with regard to FIG. 73. Normally such shapes are inserted in the middle of text within a text box, but it is possible for a user to insert nothing but floating shapes within a text box if desired.

Returning to the layoutShapeIncludingFloatingElements routine of FIG. 97, for each minimized child shape inserted within a text box, step 1660 causes steps 1662 and 1664 to be performed. Step 1662 calls layout for the child's shape with the availableWidth parameter for the call equal to the width of the parent text container, minus the text container's margins and the child shape's bumpers, if any. Step 1662 also sets the availableHeight parameter for the layout call equal to the height of the parent text container minus the container's vertical margins and the child's vertical bumpers, if any. Then step 1664 treats the child shape for which the current iteration of the loop 1660 is being performed as if it had a fixed size corresponding to that returned by the layout routine called in step 1662.

Once the loop of step 1660 has been performed for all child shapes within the floating element box that have a minimized dimension, if any, step 1666 lays out the text container's successive floating text and shape elements onto one or more successive horizontal lines within the internal space of the text container not occupied by its own margins.

As indicated at step 1666, this layout includes an iteration 1668, which performs steps 1670 and 1672 for each text element to be laid out. Step 1670 selects a hyphenation dictionary specified by the value of the language_id attribute for the current text element being laid out. Then step 1672 lays out the current text element on portions of one or more lines, including making any hyphenation decisions appropriate in such layout on the basis of the hyphenation dictionary selected in step 1670. This is indicated in FIGS. 47 and 48.

In FIG. 47 the text element 399 has no language_id attribute value specified in its start tag. This is because the default language_id value is us_english, which cause all text elements not having another language_id attribute value specified to have the us_english as their language_id attribute value. This causes the us_english hyphenation dictionary 600A to be selected by step 1670 of FIG. 97, and it causes step 1672 to use that us_english hyphenation dictionary to lay out FIG. 47's text element 399 on successive horizontal lines of a text box 156G, as shown at the top of FIG. 47.

In FIG. 48, a text element 399A is shown, which has a language_id attribute value equal to "german." As is illustrated in that figure, this causes step 1670 of FIG. 97 to select the german hyphenation dictionary 600B, shown in FIG. 48, and causes the step 1672 to use that hyphenation dictionary when laying out the German text 399A along successive lines of the text box 156G of FIG. 48.

Since hyphenation rules can vary substantially from language to language, this ability for a variable text element to inherit language_id attribute values significantly improves the ability of a text layout system to more appropriately lay out variable text elements of different languages into the same templates.

Once step 1666 of FIG. 97 has laid out all of the text container's child elements, step 1674 tests to see if the container shape has a minimized width. If so, it causes step 1676 to set the shape's width to the larger of the shape's minimum width attribute value 247, shown in FIG. 10, or the width of the shape's content and the content's bumpers, if any, plus the width of the shape's internal margins. If the shape's contents, that is, its text and floating shape elements, are spread out upon more than one line, step 1676 will normally result in little decrease in the width of the container shape. This is because the layout of the elements performed in step 1666 is performed for any shape having a minimized width, after that minimized width has been expanded to its maximum value given the availablWidth parameter and given the maximum width parameter for the shape as described above with regard to steps 1656 and 1658.

After the test and response, if any, of steps 1674 and 1676, step 1678 tests to see if the container shape has a minimized height. If so, step 1680 sets the shape's height to the larger of the shape's minimum height value or the height of the shape's contents plus the height of the shape's vertical margins.

Once this has been done, the text container and any of its floating elements will have been laid out and the sub-routine can return.

Returning to the layout routine of FIG. 94, if the shape for which the layout routine has been called includes child shapes that have a fixed position, steps 1612 and 1614 call the layoutShapeIncludingFixedElements routine 1682, shown in FIGS. 98A and 98B. Shapes that include child shapes having fixed positions include group boxes, other than h-boxes and v-boxes, and they include page elements and area template elements. In such elements child element positions are defined by the left and top position attributes 219 and 220, respectively, shown in FIG. 9.

As shown in FIG. 98A, the layoutShapeIncludingFixedElements routine starts with steps 1684 and 1686, which are substantially identical to steps 1626 and 1628 described above with regard to FIG. 95. These steps cause any dimension of the shape for which the layout routine of FIGS. 98A and 98B has been called that has a maximized or minimized flex behavior to be made as large as possible, given the availableWidth and availableHeight with which the layout has been called and given the maximum width and height values of the shape.

Once steps 1684 and 1686 are complete, step 1688 performs a loop for each fixed or minimized width child shape included within the container shape for which the sub-routine of FIGS. 98A and 98B has been called. This loop includes steps 1690 through 1704. Step 1690 tests to see if the given child shape for which the current iteration of loop 1688 is being performed has a minimized width. If so, it causes step 1692 to set a variable value availableWidthForChild equal to the maximum width the child could have given the current width of the parent container, given the width of the parent container's margins, and given the child shape's fixed position defined by the left and top attributes 219 and 220 shown in FIG. 9 by its anchor point shown by the attribute value 250 shown in FIG. 10, and by the child's left and right bumpers set by the attribute values 232 and 234 shown in FIG. 9.

As is shown in FIGS. 19 through 30, if a child shape has an anchor point at a fixed position relative to a parent container, its ability to expand is a function not only of the position of that anchor point relative to the parent shape, but also of the position of that anchor point relative to the child shape itself, since the position of an anchor point relative to its shape determines in what directions the child shape can expand and contract in response to variable content.

If the test of 1690 finds the child does not have a minimized width, step 1694 sets the availableWidthForChild value equal to the child's fixed width since, as was described above with regard to step 1688, the loop of that step is performed only for children with fixed or minimized widths. Once availableWidthForChild has been set, step 1696 tests to see if the child shape for which the current iteration of loop 1688 is being performed has a flexible height, either a maximized or a minimized height. If so, it causes step 1698 to set the availableHeightForChild equal to the maximum height the child could have given the current height of the parent container shape, given the parent shape's margins, and, given the child's position, its anchor point, and the height of its relevant bumpers. If the test of step 1696 finds the child has a fixed height, step 1700 sets the availableHeightForChild equal to that fixed height.

Once the availableWidthForChild and availableHeightForChild parameters have been set, step 1702 calls the layout routine of FIG. 94 for the child shape with availableWidth equal to the availableWidthForChild value set in steps 1684 through 1688 and availableHeight equal to the availableHeightForChild value set in steps 1698 or 1700. For purposes of this call, if the child shape has a maximized height, it will be treated as having a minimized height instead. As will be explained below, several of the layout routines treat a maximized height as being a minimized height during initial layout, and then go back later and increase that height, if appropriate.

Once step 1702 has called layout for the child shape, step 1704 causes the child shape to have the size returned by that layout routine at a position within the container shape determined by the child's anchor point and its position attribute values.

Once the loop of step 1688 has been performed, step 1706 tests to see if the container shape for which the routine of FIGS. 98A and 98B has been called has a minimized width attribute. If so, it causes steps 1708 and 1710 to be performed. Step 1708 calls the findMinDerivedWidth routine for the container, assigning to all of the children that have been laid out by the loop 1688 the laid-out width returned for them by the call to the layout routine in step 1702. In step 1708's call to findMinDerivedWidth, all of the container shape's non-laid-out child shapes are assigned their minDerivedWidth value, which is obtained for them by calling the same findMinDerivedWidth routine for those children.

The findMinDerivedWidth routine is called for a shape to estimate the minimum width that the system thinks the container shape can have and still allow proper layout of its child elements, recursively taking into account the descendant elements of those child elements.

FIG. 101 describes the findMinDerivedWidth routine 1808 in more detail.

The routine starts with a step 1809, which tests to see if the shape for which the routine has been called is an image element having a "source size" flex behavior in either the width or height dimension. If so, step 1810 causes that width and/or height dimension to be treated for purposes of the rest of the layout as having a fixed length equal to the width and/or height, respectively, of the image file mapped into the image element.

Next, step 1811 tests to see if the shape's width is fixed, either by the flex-width behavior attribute or by the operation of step 1810. If so, step 1812 returns with the fixed width plus the width of the shape's bumpers, if any, as the minDerivedWidth of the shape for which the routine 1808 has been called.

If step 1811 does not find that the current shape has a fixed width, step 1814 causes steps 1816 through 1848 to be performed. Step 1816 tests to see if the shape is an image having a fixed height and a proportional width. If so, steps 1818 and 1822 are returned. Step 1818 finds the aspect ratio of the image file that has been mapped into the image element. Then step 1820 causes the image element to be treated for the rest of the current layout as having a fixed width that maintains the image's aspect ratio given the element's fixed height.

Then step 1822 returns from the findMinDerivedWidth routine with a minDerivedWidth value equal to the width of the image element set in step 1820, plus the width of that element's bumpers, if any.

If the shape for which the findMinDerivedWidth routine has been called is an empty shape or is an image element that has not been handled above with regard to steps 1809 through 1812 or steps 1816 through 1822, step 1824 causes step 1826 to return from the findMinDerivedWidth routine with a minDerivedWidth equal to the current shape's minimum width attribute value plus the width of its bumpers, if any. This causes shape containers that do not have any child elements, whether they be maximized or minimized, to be treated as requiring a minimum width equal to the value of their minimum width attribute. And it treats image elements that have a maximized width but do not have a proportional height also to be treated as requiring a minimum width equal to their minimum width attribute value.

If the shape for which the findMinDerivedWidth routine has been called is a text container with floating content, step 1830 returns with the shape's minimum width attribute value plus the width of its bumpers. This step is something of a computational shortcut, performed to improve the speed of the system's layout procedure, which has to be fast enough to be performed interactively on screen. It is a shortcut because it does not take into account the size of the shape element's contents. In other embodiments of the invention more complex algorithms could be used for determining the minimum width of such text containers as a function of their content.

If the shape for which the findMinDerivedWidth routine has been called contains fixed shapes, step 1832 causes steps 1834 through 1840 to be performed. Step 1834 performs a loop comprised of steps 1836 and 1838 for each of the container shape's child shapes. In this loop, step 1836 calls the findMinDerivedWidth function recursively for each such child shape. Then step 1838 finds the position of the child's right edge, given its fixed position, the location of its anchor point, and its minDerivedWidth value returned by the call in step 1836. Once the loop of 1834 has been returned for all such children, step 1840 returns from the findMinDerivedWidth routine with the minDerivedWidth of the parent shape equal to the greatest distance between the left edge of that container shape and the right-most edge, including any right bumper of any child determined in any step 1836 of the loop 1834, plus the width of the container's right margin and both of the containers' horizontal bumpers.

If the shape for which the minDerivedWidth routine has been called is an h-box, step 1842 calls step 1844 to return the sum of the values produced by calling minDerivedWidth for each of the h-box's children, plus the width of the h-box's margins and bumpers.

If the shape for which the findMinDerivedWidth routine has been called is a vertical box, step 1846 causes step 1848 to return with the largest value produced by calling findMinDerivedWidth for each of the v-box's children, plus the width of the v-box's margins and bumpers.

It can be seen that the findMinDerivedWidth sub-routine of FIG. 101 provides an estimate of the minimum width that will be required to lay out a certain shape, given its contents, if any. This determination operates by recursively calling the findMinDerivedWidth routine for any child elements of any shapes that occur at any level in the hierarchy of sub-elements contained within the shape for which the findMinDerivedWidth routine has been called.

Returning to the layoutShapeIncludingFixedElements routine of FIGS. 98A and 98B, step 1708 of that routine calls the findMinDerivedWidth function for each of the non-laid-out children of the container shape for which the sub-routine of FIGS. 98A and 98B is being called. It does this to determine a width for such shapes that will be temporarily treated as their fixed width and then calls findMinDerivedWidth for the parent container itself. Similarly, the widths that have been laid out for any fixed width or minimized width shapes by step 1702 will also be treated as fixed widths for purposes of the call to findMinDerivedWidth in step 1708. Once all of these widths have been assigned to all of the current containers' children, the call to findMinDerivedWidth for the container will return a minimum derived width value that will be equal to the width of all the containers' child elements, plus their bumpers, plus the width of the margins, if any, of the container shape.

Once the container shape's minDerivedWidth has been derived in step 1708, step 1710 will set the container shape's width to the larger of a) its minimum width or b) that minDerivedWidth minus the width of the container shape's bumpers, since the findMinDerivedWidth routine includes the widths of a shape's bumper in the minDerivedWidth value it returns.

Once step 1706, and possibly steps 1708 and 1710, have been performed, step 1712 performs a loop for each non-laid-out child element of the container shape for which the routine of FIGS. 98A and 98B has been called. This will include any shapes that have a maximized width attribute. The loop of step 1712 includes steps 1714 through 1724. Step 1714 sets the availableWidthForChild variable equal to the maximum width that the given child could have given the width of the parent container and its margins, and given the child's position, its anchor point, and the width of its relevant bumpers. This is similar to the step 1692 described above.

The operation of step 1714 allows child shapes to maximize into space occupied by other child shapes within the container for which the routine of FIGS. 98A and 98B is being performed, which could cause shapes to overlap. Again, this is a shortcut. It should be appreciated that in other embodiments of the invention, more complex rules could be used so as to prevent fixed child elements within a container from expanding so as to overlap one another.

After step 1714 has been performed, step 1716 tests to see if the child has a flexible height. If so, step 1718 sets the availableHeightForChild variable equal to the maximum height the child could have given the current height of its parent container and the parent container's margin, and given the child's position, its anchor point, and the height of its relevant bumpers. This corresponds to step 1698 above.

If the test in step 1716 finds the child does not have a flexible height, step 1720 sets the availableHeightForChild equal to the child's fixed height.

Next, step 1722 calls the layout routine of FIG. 94 for the current child shape for which the loop 1712 is being performed. It does so with availableWidth equal to the availableWidthForChild set in step 1714 and availableHeight equal to the availableHeightForChild set in step 1718 or 1720, and with any maximized height attribute being treated as a minimized height attribute for purposes of the layout call.

Then step 1724 places the laid-out child shape in a position relative to its parent shape determined by the child's anchor point and its position attributes.

Once the loop of 1712 has been performed for each maximized width child element, step 1726, shown in FIG. 98B, tests to see if the container shape for which the routine of FIGS. 98A and 98B is being performed has a minimized height. If so, step 1728 and 1730 are performed. Step 1728 calls findMinDerivedHeight for the container, assigning all children their laid-out height for purposes of that sub-routine to find the container's current minDerivedHeight.

FIG. 102 shows the findMinDerivedHeight sub-routine 1850. This sub-routine is virtually identical in function to the findMinDerivedWidth function described above with regard to FIG. 101, except that it operates to estimate the minimum height, rather than width, which an element requires in order to have proper layout of it and its child elements, if any. Since the text of FIG. 102 is virtually identical to the text of FIG. 101, except for changes reflecting the fact that it applies to estimating height rather than width, there is no need to describe FIG. 102 any further.

Returning now to the layoutShapeIncludingFixedElements routine in FIG. 98B, once the call to findMinDerivedHeight for the container shape for which the routine of FIGS. 98A and 98B has been called returns with an estimate of the minDerivedHeight that will allow proper layout of the container shape, step 1730 sets the container shape's height to the larger of a) the container's minimum height value or b) the minDerivedHeight returned by the call in step 1728 minus the height of the current shape's margins.

Once step 1726 and any of its resultant steps have been performed, step 1732 performs a loop comprised of steps 1734 and 1736 for each child shape having a maximized height within the container shape for which the routine of FIGS. 98A and 98B has been called. Step 1734 sets a variable availableExtraHeightPerChild equal to the maximum increase in height the child could have given the current height of its parent shape and the parent's margins, and given the child's position, its anchor, and the height of its relevant bumpers. Then step 1736 calls allowChildsMaximizedHeight for the child with availableHeight equal to the child's current height plus the availableExtraHeightPerChild attribute set in step 1734.

FIG. 103 illustrates the allowChildsMaximizedHeight sub-routine 1892. As was mentioned above, during several of the layout routines, child elements having a maximized height are treated for purposes of initial layout as if they had minimized height. The function of the allowChildsMaximizedHeight routine is to attempt to maximize the height of any such child elements that were previously laid out as if they had a minimized height. This is done because if a container shape's height is minimized, that container's tendency toward minimization is intended to dominate the tendency of any of its child elements to maximize. This, for example, is one of the reason that in many of the layout routines, fixed and minimized width shapes are laid out first. It is also the reason that maximized height shapes are treated as minimized until after their parent shape has had a chance to minimize, if it has a minimized height attribute.

The routine seeks to maximize the height of each child element having a maximized height attribute up to the height allowed by the height of its parent shape, given the vertical internal margins of the parent shape and the external vertical bumpers of the child shape. This process is often recursive because if the child shape itself includes child shapes that have a maximized height, the allowChildsMaximizedHeight routine will be called for these grandchild shapes to allow them to maximize. This recursion will travel down as many levels as is necessary to allow all maximized height elements to achieve their maximized height given the height of their container shapes.

As can be seen from FIG. 103, the allowChildsMaximizedHeight routine contains a step 1894, which tests to see if the current shape for which the routine has been called is an image element having a maximized height and proportional width. If so, the step returns without changing the child's height. This is done because changing a child's height would require changing its width if it has a proportional width.

In the embodiment of the invention shown, determinations of width dominate determinations of height, and are performed first. This is because, in laying out elements including text, the height of an element cannot usually be determined until its width has been determined. To avoid the computation that would be required for iterative layout, the present invention never changes any element's width once it has been laid out. Thus, it does not readjust the width of images having a maximized height and proportional width merely because there is more height available for the maximized height dimension.

After step 1894, step 1896 sets the height of the shape for which the allowChildsMaximizedHeight routine has been called to the smaller of a) its maximum height attribute value or b) the availableHeight with which the routine of FIG. 103 has been called. Then step 1898 tests to see if the shape for which allowChildsMaximizedHeight has been called is a container shape having one or more child shapes. If so it causes steps 1900 through 1918 to be performed. Step 1900 is a loop that is performed for each child shape having a maximized height. This loop is comprised of steps 1902 through 1914.

Step 1902 tests to see if the child has a fixed location relative to its parent. If so, it causes step 1904 to set availableExtraHeightPerChild equal to the maximum increase in height the child could have, given the current height of its parent shape and that parent shape's margins, and given the child shape's position, its anchor point, and the height of its relevant bumpers.

If the child shape for which the current iteration of the loop 1900 is being performed is located in a v-box, steps 1906 and 1908 set the availableExtraHeightPerChild variable equal to the current height of that v-box minus the vertical margins and the current height of each of the v-box's child shapes, plus any vertical bumpers those child shapes have, all divided by the number of children in the vertical box having a maximized height.

If the current child of the loop 1900 does not have a fixed location and is not within a v-box, steps 1910 and 1912 set the availableExtraHeightPerChild parameter equal to the current height of the child's parent shape minus that parent shape's margin and minus the current height of the child and its bumpers.

Once steps 1902 through 912 have set the availableExtraHeightPerChild variable for the current child shape, step 1914 makes a recursive call to the allowChildsMaximizedHeight routine for the child with the available height parameter equal to the child's current height plus the value just calculated for availableExtraHeightPerChild. This recursive call will cause all descendant elements of the element for which the routine of FIG. 103 has been called having a maximized height to have their height expanded to the extent allowed by the increase in height of their parent shape made in step 1896.

After the loop 1900 has been performed for each of the current shape's children, step 1916 tests to see if the current shape is a v-box, h-box, or text container. If so, step 1918 vertically realigns that shape's child shapes according to the vertical alignment attribute value for the container shape to take into account any changes in height of those child shapes which may have been caused by the operation of the loop 1900.

Returning now to the layoutShapeIncludingFixedElements routine in FIG. 98B, it can be seen that once the call to allowChildsMaximizedHeight in step 1736 has been performed for each child shape within the shape for which the routine of FIGS. 98A and 98B has been called, the layout of that shape having fixed elements will be complete and the layoutShapeIncludingFixedElements routines of FIGS. 98A and 98B will return.

Returning now to the layout routine of FIG. 94, if a shape for which the layout routine of FIG. 94 has been called is a horizontal box, steps 1616 and 1618 will call out the layoutHBox routine 1738 shown in FIG. 99.

As is shown in FIG. 99, the layoutHBox routine starts with steps 1740 and 1742, which correspond to steps 1626 and 1628 discussed above with regard to FIG. 95. These steps cause any dimension of the h-box that has either a maximized or minimized width or height to be expanded as large as is possible given the availableHeight and availableWidth with which the sub-routine has been called, and given the maximum width or height attribute values for the h-box.

Next, step 1744 sets availableExtraWidthPerChild to a ratio. The numerator in this ratio is equal to the h-box's current width after the changes, if any, made in step 1742 minus the sum of the following: the width of the h-box's margins and the minDerivedWidth returned by calling findMinDerivedWidth for each of the h-box's child shapes. The denominator of the ratio equals the number of child shapes with flexible width, either maximized or minimized, in the h-box. This sets the availableExtraWidthPerChild equal to the total amount of space left for expansion in the h-box after each child element is given its minDerivedWidth, divided by the number of child elements whose width can expand either by the operation of the minimized or maximized flex attribute value.

After step 1744 is complete, step 1746 performs a loop for each child shape in the h-box having a fixed or minimized width. This loop comprises performing step 1748 for each such child shape. This step calls layout for the child shape with availableWidth equal the child's minDerivedWidth plus the availableExtraWidthPerChild, and with availableHeight equal to the height of the h-box minus its vertical margins and the child's vertical bumpers. If the child shape has a maximized height attribute it will be treated as a minimized height attribute for purposes of the call, since, as has been described above, maximization of child element's height is performed by using the allowedChildsMaximizedHeight routine described above with regard to FIG. 103 after such child shapes have been laid out and their parent shape has been allowed to minimize its height, if that parent shape has a minimized height attribute value.

Once steps 1746 and 1748 have been performed for all fixed or minimized width child elements, step 1750 tests to see if the h-box has a minimized width. If so, it causes step 1752 to set the h-box's width to the larger of either its minimum width attribute or the sum of the following: the width of the h-box's margins plus the width of each laid-out, that is, fixed or minimized width, child and that child's bumpers, plus, for each un-laid-out child (i.e., each child having a maximized width) a width equal to the child's minDerivedWidth, its horizontal bumpers, and availableExtraWidthPerChild.

Once the test of step 1750 and its possible consequences have been performed, step 1754 sets availableExtraWidthPerChild equal to a ratio having as a numerator a value equal to the h-box's current width, including any change that may have been made in steps 1742 and 1752, minus a sum including the width of the h-box's margin, the width of each laid-out child element, the minDerivedWidth of each maximized-width child, and the width of all child element bumpers. The denominator of this ratio equals the number of maximized width children.

Next, step 1756 performs a step 1758 for each child element having a maximized width. Step 1758 calls layout for the child element with availableWidth equal to the child's minDerivedWidth plus availableExtraWidthPerChild, and with availableHeight equal the height of the h-box minus its vertical margins and the child's vertical bumpers. If the child has a maximized height, this call treats the child as if it had a minimized height.

Once the loop of step 1756 has been performed for each child element having a maximized width, the width of all child elements will have been determined and step 1760 horizontally aligns the child shapes within the h-box.

Horizontal alignment can have a left value that pushes all child elements as far to the left as is possible, given the sequence box's margin and the children's bumpers; a right alignment, which causes all of the children to be squeezed as far to the right as is possible, given the sequence box's margin and the children's bumpers; a center horizontal alignment, which causes all of the h-box's children to be squeezed as close to the center as is possible given their bumpers; or a justified horizontal alignment value, which seeks to equally distribute any available space within the sequence box equally between the child elements, with the left-most child element as far to the left as it can go given the sequence box's and its bumpers, and the right-most element within the sequence box as far right as possible, given the sequence box's margins and its right bumper. It should be understood, however, that if any child element within an h-box has a maximized width attribute, all four of these justification options will normally have an identical appearance because all available in the h-box will be normally be taken up by the one or more maximized width child elements.

After step 1760 has been performed, step 1762 tests to see if the h-box has a minimized height and, if so, it causes step 1764 to set the h-box's height to the larger of its minimum height attribute value or the sum of the height of the h-box's margins plus the largest height comprised by a combination of any given child shape within the h-box and the heights of that child shape's bumpers.

Next, step 1766 performs a loop for each child having a maximized height that causes step 1768 to call the allowChildsMaximizedHeight sub-routine described below with regard to FIG. 103 for the child. This call is made with availableHeight equal to the height of the h-box minus its vertical margin and minus the current child elements' vertical bumpers. As was explained above with regard to FIG. 102, this will cause each such maximized-height child element to have its height increased to the availableHeight, and will cause any of the child element's descendants having a maximized height to also have their heights increased to the extent made possible by their respective parents' height maximization.

After the loop of step 1776 has been performed, step 1770 vertically aligns child element shapes within the h-box, giving them a top, bottom, or alignment, which correspond, respectively, to the left, right, and center alignment settings discussed above, except that they operate in a vertical dimension rather than a horizontal dimension.

Returning now to the layoutShapeIncludingFixedElements routine of FIG. 94, if the shape for which the layout routine has been called is a vertical box, steps 1620 and 1622 will call the layoutVBox sub-routine 1772 shown in FIG. 100.

As is shown in FIG. 100, the layoutVBox sub-routine has steps 1774 and 1776, which operate like steps 1626 and 1628 of FIG. 95 to cause the shape for which that sub-routine was called to expand in any of its two dimensions that have a minimized or a maximized flex behavior attribute to as a large a value as is allowed by the availableHeight or availableWidth parameters with which the sub-routine has been called, or by the shape's maximized height or width attributes.

Next, step 1778 sets availableExtraHeightPerChild to a height defined by a ratio having as the numerator the height of the v-box minus the sum of the v-box's vertical margins, plus the minDerivedHeight returned by calling findMinDerivedHeight for each of the v-box's child shapes. The denominator of the ratio is the number of the v-box's child shapes.

Next, a loop 1780 performs step 1782 for each child shape within the vertical box having a fixed or a minimized width. Step 1782 calls the layout routine of FIG. 94 for each such child shape with availableWidth equal to the width of the v-box minus its horizontal margins, and with the availableHeight parameter equal to the child's minDerivedHeight plus the value of availableExtraHeightPerChild. If the child element has a maximized height, step 1782 treats the shape as having a minimized height for purposes of the call.

After each fixed or minimized width child shape has been laid out, step 1784 tests to see if the v-box has a minimized width. If so, step 1786 sets the v-box's width to the larger of the v-box's minimum width attribute value or the sum of the v-box's horizontal margins plus the largest width associated with any child shape, using for any child shape that has been laid out in the loop 1780, using the laid-out width of that child shape plus the width of its bumpers, and using as the width for any child shape that has not been laid out, i.e., which has a maximized width, the minDerivedWidth returned by a call to findMinDerivedWidth for such maximized width child element.

Next, step 1788 performs a loop for each maximized width child shape that causes step 1790 to call layout for that shape. In each such call availableWidth equals the width of the v-box, minus its horizontal margins, and availableHeight equals the minDerivedHeight value returned by a call to findMinDerivedHeight for the child shape, plus the value of availableExtraHeightPerChild set in step 1778. If the child has a maximized height, it is treated as having a minimized height for purposes of the call.

After the loop 1788 has been performed, step 1792 horizontally aligns the child shape elements within the v-box as a function of the vertical box's horizontal alignment attribute value.

Next, step 1794 tests to see if the v-box has a minimized height. If so, it causes step 1796 to set the v-box's height to the larger of its minimum height attribute value or the sum of the height of each laid-out child, plus the height of each such child's vertical bumpers, plus the height of the v-box's margins.

If the v-box does not have a minimized height, the else statement 1798 will cause steps 1800 through 1804 to be performed.

Step 1800 sets availableExtraHeightPerChild equal to a height defined by a ratio having as its numerator the v-box's height minus the sum of the v-box's vertical margins, plus the height of each child shape and its vertical bumpers. The denominator of this ratio is the number of child elements having a maximized height.

Next, step 1802 performs a loop comprised of step 1804 for each of the vertical box's child elements having a maximized height. Step 1804 calls the allowChildsMaximizedHeight sub-routine, described above with regard to FIG. 103, for each such child with availableHeight equal to the child's laid-out height plus availableExtraHeightPerChild. As explained above with regard to FIG. 103, this causes each such child element to have its height increased by the availableExtraHeightPerChild and recursively causes any of its child elements having a maximized height attribute value to also have their height values increased.

After the operation of steps 1794 through 1804 has been completed, step 1806 vertically aligns the child shapes within the v-box, depending upon the vertical alignment attribute value for the v-box. If any of the child elements within the vertical box have a maximized height, there will normally be no distinction between the top, bottom, centered, or justified vertical alignment attribute values, since vertical maximization will normally take up any available space within the vertical box, preventing any room for vertical alignment.

After the performance of step 1806, the layout of the v-box will be complete and the layoutVBox sub-routine will return.

From the above discussion, it can be seen that the combination of the layout routine of FIG. 94, and the various layout routines it calls, is capable of laying out all of the shape elements used in the described embodiment of the inventions.

It should be understood that the foregoing description and drawings are given merely to explain and illustrate, and that the invention is not limited thereto except insofar as the interpretation of the appended claims are so limited. Those skilled in the art who have the disclosure before them will be able to make modifications and variations therein without departing from the scope of the invention.

In particular, it should be noted that this application explains the present invention in more detail than is common in many patent applications, and the inventors hope they will not be improperly punished for providing such detailed teaching of this invention to the public by having the scope of their claims limited by the greater details of that teaching. Punishing a more detailed teaching of an invention with a more limited interpretation of the claims would be contrary to one of the primary purposes of the patent system, which is to reward inventors for teaching their inventions to the public. Considerable thought has gone into the wording of the following claims so that they will provide an accurate description of what we consider to be our invention, and it is hoped that such wording will be viewed as the most accurate description of exactly which details are considered to be part of an invention recited by a particular claim and those which are not. For example, where a dependent claim includes limitations not contained in a parent claim, it is our intention that that such a limitation not be read into the parent claim.

The following paragraphs list just some of the many way in which other embodiments of the invention could differ from those shown above.

The invention of the present application, as broadly claimed, is not limited to use with any one type of operating system, computer hardware, or computer network, and, thus, other embodiments of the invention could use differing software and hardware systems.

Furthermore, it should be understood that the program behaviors described in the claims below, like virtually all program behaviors, can be performed by many different programming and data structures, using substantially different organization and sequencing. This is because programming is an extremely flexible art in which a given idea of any complexity, once understood by those skilled in the art, can be manifested in a virtually unlimited number of ways. Thus, the claims are not meant to be limited to the exact steps and/or sequence of steps described in the figures. This is particularly true since the pseudo-code described in the text above has been highly simplified to let it more efficiently communicate that which one skilled in the art needs to know to implement the invention without burdening him or her with unnecessary details. In the interest of such simplification the structure of the pseudo-code described above often differs significantly from the structure of the actual code that a skilled programmer would use when implementing the invention. Furthermore, many of the programmed behaviors which are shown being performed in software in the specification could be performed in hardware in other embodiments.

In the main embodiment of the invention discussed above, almost all of the various aspects of the invention are shown occurring together in the one system shown in FIG. 2. It should be understood that in other embodiments of the invention different subsets of one or more individual aspects of the invention will occur in a given system.

In the description above, the operation of certain aspects of the invention are optional. In other embodiments of the invention, the user might not be given the choice of selecting whether or not a given aspect of the invention is to operate. As just one example, in the embodiment of the invention above, the ability of a variable element to be suppressed if no value is mapped into it depends upon the user's selection of the "OK to publish without value" option, as is discussed with regard to steps 1504 and 1506 of FIG. 87. In other, less flexible embodiments of this aspect of the invention, variable elements might always be suppressed.

In other embodiments of the some aspects of the invention, other types of content-mapping rules might be used. For example, rules allowing more complex logical mappings might be used, or rules using other mapping techniques, such as neural networks or multi-dimensional clustering, might be used. Also, in different embodiments, different user interfaces could be used to enable a user to define or select content-mapping rules. For example, content mapping rule sets could be stored in their own files, separately from job lists, and/or the content mapping rules used for a given job could be individually selected from different rule sets. In other embodiments, variable queries of the type discussed above with regard to FIGS. 41 through 43 could be used to send queries to other types of data bases besides MediaBank digital asset management systems, and the variable queries could be represented in a form other than SQL.

In other embodiments of some aspects of the invention, content-mapping rules and variable elements can be bound together by a technique other than the use of common variable names, as is disclosed above. For example, they could be bound together by use of a common symbol other than a text name, or they could be bound together by a user interface which would allow a user to selectively associate a given content-mapping rule with a given variable element by dragging and dropping an icon representing that rule into a representation of the variable element.

In other embodiments of some aspects of the invention, the ingesting, or grafting, of variable content into variable elements could be performed in a different way. For example, in some less flexible embodiments, variable values might not include attribute values which can be imported into a variable element. In other less flexible embodiments, variable elements might not be allowed to contain default attribute values or default contents. In more flexible embodiments, a combination of variable values, instead of just one variable value, could be grafted into a given variable element. In some embodiments, variable content could be selected using one content-mapping rule and variable attributes for the variable value could be selected with a separate content-mapping rule.

In other embodiments of some aspects of the invention, the minimization or maximization of a shape element could function differently,such as by using either more complicated or more simple rules. For example, in other embodiments, minimization or maximization need not be limited by the element's minimum or maximum attribute values. In the embodiment described above, the maximization of a child shape is usually limited by the minimization of its parent shape. In other embodiments this need not be the case. In the embodiment described above, the layout of a text container with a minimized width does not take into account how much vertical space the container has for multiple lines of text when determining its width. In other embodiments of the invention it could. In the embodiment of the invention described above, the layoutShapeIncluding-FixedElements routine of FIGS. 98A and 98B does not prevent the overlapping of child elements. In other embodiments it could. In the embodiment of the invention described above, each element is only laid out once, with only one call to the layout routine. In other embodiments of the invention the layout of multiple shapes could employ more complicated schemes such as constraint propagation, iterative relaxation, or automatic learning techniques.

In other embodiments, some aspect of the invention could be used to layout different types or combinations of output, laying out documents on computer screens, on printed documents, on printable file formats, in HTML, on electronic signs and billboards, in documents or images created with electronic ink, in video content, in holographic projections, and virtually any other type of two- or three dimensional visual media, including interactive media.

In other embodiments of some aspects of the invention different user interfaces can be used. The various aspects of the invention claimed below are not meant to be limited to the particular command structure or GUI of the user interface shown above, except to the extent, if any, that such a limitation is specifically contained in claims to that aspect of the invention.

In other embodiments of some aspects of the invention, different forms of representation could be used than those shown above. For example, templates, area templates, and formatted text and formatted paragraphs, need not be stored in XML, but could be stored in virtually any form capable of representing the relationships between their elements. Some aspects of the invention are not even limited to templates which are represented as a tree shaped data structure.

In other embodiments of some aspects of the invention, text and geometric models need not be stored in the form shown in FIG. 5. For example in other embodiments they also might be represented in XML or a similar tagged text language. According to some aspects of the invention text and geometric models might actually be stored in different files.

In other embodiment of different aspects of the invention, text and shape elements and styles could have different attributes, different combinations of attributes, and different possible combinations of attribute values than those shown above. And in other embodiments of some aspects of the invention, different types of elements could be used. For example, in some embodiments of the invention text containers having a shape corresponding to a user defined polygon can be used.

In other embodiment of the invention functionality could be spread across different programs and/or different computers in a different manner than is shown in the figures above. For example, in other embodiments of the invention all the functions of the designer, producer, and server programs 124, 126, and 128, respectively shown in FIG. 2, could be placed into one program. In other embodiments of some aspects of the invention different functions could be performed by different machines. For example, as indicated above the designer, producer, and server programs can all be run on different machines. The server program in particular can benefit from running on a computer which has hardware optimized for rasterizing page images. In the network embodiment shown in FIG. 50, the definition of the screen images shown on the computer's screen 474B is in part performed by the server system 471 and partially performed by the client computer 472. In other embodiments, other distributions of tasks could be performed. For example, the data bases on which content files are stored might be on different machines than those on which page layout is performed.

We claim:

1. A computerized method of laying out a document containing a combination of text and shape elements, said method comprising:

providing a user interface with controls for enabling a user to:

place a sequence box, which has a sequencing axis, in the document;

cause one or more shape elements to be located in the sequence box;

cause a shape element, including one in the sequence box having at least one text or shape element as contents, to have a minimize property in at least one dimension; and cause a shape element, including one in the sequence box, to have a maximize property in at least one dimension; and performing an automatic layout process in which elements of the document are laid out onto a 2-dimensional area in which each such element is given a precise position and size, including:

arranging shape elements, if any, placed within the sequence box in a sequence along the sequence box's sequencing axis;

minimizing the size given to any shape element which has the minimize property in a given dimension, including any shape element within the sequence box, by making the element as small as its contents, if any, will allow in the given dimension, over a given length range; and maximizing the size given to any shape element which has the maximize property in a given dimension by making the element expand to encompass space available in the given dimension, over a given length range, said maximizing including, if the maximized shape element is within the sequence box, expanding it to encompass space available within the sequence box.

2. A method as in claim 1 wherein the shape elements defined within a sequence box are directional sequence boxes each containing a sequence of shape elements arranged along a sequencing axis.

3. A method as in claim 1 wherein the directional sequence box is either a v box, in which the sequencing axis is a vertical axis, or an h box, in which the sequencing axis is a horizontal axis.

4. A method as in claim 1 wherein:
said user interface enables a user to select to cause the directional sequence box to have the maximize or minimize property in a given dimension; and
said layout process maximizes or minimizes the directional sequence box, respectively.

5. A method as in claim 1 wherein:
one or more shape elements within the sequence box are variable elements;
said method includes mapping variable values into said variable values; and
said layout process lays out a given variable element within the sequence box into which a given variable value has been mapped by laying out the given variable value at the position of the variable element within the sequence box.

6. A method as in claim 5 further including:
defining the document as a tree of layout elements, including text and/or shape elements that are variable elements, in which each layout element is a node of said tree;
defining one or more variable values, to be mapped into one or more variables elements located in the document, as sub-trees, each of which includes a plurality of nodes each corresponding to either a text or a shape elements and each of which includes a root node;
said mapping of variable values into variable elements includes grafting the root nodes of sub-tree variable values onto the nodes of the document tree corresponding to the variable elements into which the sub-tree variable values are mapped; and
said layout process includes laying out the elements of the tree formed by the combination of the nodes of the document tree and the nodes of the sub-trees which have been grafted onto the document tree.

7. A method as in claim 6 wherein:
one of said sub-trees contains one or more shape elements which have said maximize or said minimize property; and
said layout process will respond to the grafting of such a sub-tree onto a variable element by causing the lay out of said maximized or minimized shape element within said grafted sub-tree to be maximized or minimized, respectively.

8. A method as in claim 1 wherein:
said interface is a WYSIWYG graphical user interface which allows a user to select the placement of said sequence box and the shape elements within it, including allowing a user to use a pointing device to create, position and size said shape elements; and
said layout process is performed interactively in response to changes made to the document by the user with said graphical user interface, to enable the user to see a screen display of the layout of the document showing any changes the user has just made to the document.

9. A method as in claim 8 wherein the shape elements defined within a sequence box with the WYSIWYG graphical user interface contain directional sequence boxes, so directional sequence boxes are nested within other such sequence boxes.

10. A method as in claim 1 wherein the user interface enables a user to separately select whether or not a shape element within the sequence box has the maximize property in a vertical dimension and whether or not the shape element has said property in a horizontal dimension.

11. A method as in claim 1 wherein the user interface enables a user to separately select whether or not a shape element within the sequence box has the minimize property in a vertical dimension and whether or not the shape element has said property in a horizontal dimension.

12. A method as in claim 1 wherein:
the one or more shape elements placed within the directional sequence box are variable shape elements;
the method maps variable shape values into the document's variable shape elements based on values in a data set using a plurality of content-mapping rules, which rules may not map a shape value into each variable shape element for all possible data sets; and
said layout process will allocate space to lay out a given variable shape element within the sequence box into which a given shape value has been mapped with a lay out of the given shape value at the position of the given variable shape element within the sequence box, but will allocate substantially no space to a variable shape element into which the content-mapping rules have not mapped a shape value.

13. A method as in claim 12 wherein, if one of the shape elements in the sequence box has a maximize property in a dimension parallel to the sequencing axis of the sequence box, and if no space is allocated to a given variable shape element in the sequence box because the content-mapping rules have not mapped a shape value into the given variable shape element, then said layout process will cause the shape element with the maximize property to expand to take up space not occupied by the given variable shape element.

14. A method as in claim 1 wherein if a first shape elements in the sequence box has a maximize property in a dimension parallel to the sequencing axis of the sequence box and second shape element in the sequence box has a minimize property in the same dimension and has contents which can change in size, then said layout process:
causes the size of the minimized shape element to expand and contract in the given dimension as the minimized shape element minimizes around the changing size of its contents; and
causes the size of the maximized shape element to contract and expand, respectively, as the space available in the sequence box changes in response to the changes in size of the minimized shape element.

15. A method as in claim 1 wherein:
the shape elements, including the sequence box, each include boundary lines which define the perimeter of each such shape element;
the user interface includes controls for enabling a user to select to give each such shape element an internal margin of a selected width inside one or more boundary lines of such a shape element; and
the layout process causes elements placed within a sequence box to be placed at a distance from the boundary line of the sequence box having such an internal margin at least equal to the width defined by said internal margin.

16. A method as in claim 1 wherein:
the shape elements, including the sequence box, each include boundary lines which define the perimeter of each such shape element;

the user interface includes controls for enabling a user to select to give each such shape element an external margin of a selected width outside one or more boundary lines of such a shape element; and the layout process causes shape elements having such an external margin within a sequence box to be placed at a distance from the boundary line of the sequence box or any shape within the sequence box at least equal to the width defined by said external margin.

17. A computerized method of laying out a document containing a combination of text and shape elements, said method comprising:

storing a document template which defines a document as a tree of layout elements, including text and/or shape elements that are variable elements, in which each layout element is a node of said tree;

storing content-mapping rules for mapping variable values into individual variable elements;

enabling a user to define one or more variable values, to be mapped into one or more variables elements located in the document, as sub-trees, each of which includes a plurality of nodes each corresponding to either a text or a shape elements and each of which includes a root node, including enabling a user to select that a shape element on one of said sub-trees have a maximize property in one or more dimensions;

mapping sub-tree values into variable elements, in which a particular sub-tree value is mapped into a particular variable element by grafting the root node of the particular sub-tree onto the tree node of the particular variable element; and performing a layout process in which elements of the document are laid out onto a 2-dimensional area in which each such element is given a precise position and size, including laying out elements of a tree formed by the combination of the nodes of the template's tree and the nodes of sub-trees which have been grafted onto variable elements of the template's tree, which laying out of elements includes, if a given shape elements in a grafted sub-tree has the maximize attribute in a given dimension, making the given shape element expand to encompass space available in the given dimension, over a given length range, in the location in the document into which the given sub-tree has been mapped.

18. A computerized method of laying out a document containing a combination of text and shape elements, said method comprising:

storing a document template which defines a document as a tree of layout elements, including text and/or shape elements that are variable elements, in which each layout element is a node of said tree;

storing content-mapping rules for mapping variable values into individual variable elements;

enabling a user to define one or more variable values, to be mapped into one or more variables elements located in the document, as sub-trees, each of which includes a plurality of nodes each corresponding to either a text or a shape elements and each of which includes a root node, including enabling a user to select that one or more of said subverts each include a shape element:

into which a variable value can be mapped by said content mapping rules;

which has the minimize property in one or more dimensions; and mapping sub-tree values into variable elements, in which a particular sub-tree value is mapped into a particular variable element by grafting the root node of the particular sub-tree onto the tree node of the particular variable element; and performing a layout process in which elements of the document are laid out onto a 2-dimensional area in which each such element is given a precise position and size, including laying out elements of a tree formed by the combination of the nodes of the template's tree and the nodes of sub-trees which have been grafted onto variable elements of the template's tree, which laying out of elements includes, if a given shape element in a grafted sub-tree has the minimize property in a given dimension, making the given shape element as small as the variable value, if any, mapped into the given shape value will allow in the given dimension, over a given length range.

19. A computerized method of laying out a combination of textual and shape elements in a document, said method comprising:

storing a document template which defines a document as a tree of nodes representing layout elements, including text and/or shape elements, at least one of which is a shape elements that contain layout elements within it and at least one of which is a variable text or shape element;

storing content-mapping rules for mapping variable values into individual variable elements;

enabling a user to cause a variable shape element to have either a maximize property or a minimize property;

mapping variable values into variable elements of the template, including mapping shape values into variable shape values; and performing a layout process in which elements of the document are laid out onto a 2-dimensional area in which each such element is given a precise position and size, including:

minimizing the size given to variable shape elements that have the minimize property in a given dimension, which includes making those shape elements as small as their variable value, if any, will allow in the given dimension, over a given length range;

maximizing the size given to variable shape elements that have the maximize attribute in a given dimension, which includes making those shape elements expand to encompass any space available in the given dimension, over a given length range, within the directional sequence box in which the shape has been placed.

20. A method as in claim 19 wherein:

said method includes enabling a user to define one or more variable values, to be mapped into one or more variables elements located in the document, as sub-trees, each of which includes a plurality of nodes each corresponding to either a text element or a shape element and each of which includes a root node;

said mapping of variable value into variable elements includes grafting the root nodes of sub-tree variable values onto the nodes of the document tree corresponding to the variable elements into which the sub-tree variable values are mapped; and said layout process includes laying out the elements of the tree formed by the combination of the nodes of the document tree and the nodes of the sub-trees which have been grafted onto the document tree.

21. A computerized method of laying out a combination of text and shape elements in a document, said method comprising:

representing a document which contains text elements and shape elements into which the user can insert one or more layout elements as content;

enabling a user to select that a given one of said shape elements is to have its size in one or more dimensions determined by that given shape element's content;

enabling a user to select that a given one of a plurality of locations on said given shape element is to be an anchor point;

enabling a user to vary the content of said given shape element, with different of said variable contents having different sizes; and performing a layout process in which elements of the document are laid out onto a 2-dimensional area in which each such element is given a precise position and size, including:
    causing the size of the given shape element to be as small as the variable content will allow in the given dimension, over a given length range; and
    holding the given shape element's anchor point fixed, so that other portions of the given shape element expand or contract in response to the varying content relative to the fixed location of the anchor point.

22. A computerized method of laying out a combination of text and shape elements in a document, said method comprising:

representing a document template which contains one or more variable elements including one or more variable image elements into which two dimensional images can be mapped;

representing content-mapping rules for mapping variable values into individual variable elements, including mapping images, each having an aspect ratio, into variable image element;

enabling a user to set a value for a size attribute which determines the size of a given variable image element in first of the variable element's two dimensions;

using the content-mapping rules to map variable values, including images, into the variables of the document template; and performing a layout process in which elements of the document defined by the template and values mapped into the variable elements of the template are laid out onto a 2-dimensional area in which each such element is given a precise position and size, including allocating an image mapped into the given variable image element, and the given variable image element, itself, the size in the first dimension specified by the size attribute value and allocating the image and the given variable image element a size in the second of said two dimensions automatically determined so as to maintain the image's aspect ratio.

23. A computerized method as in claim 22 wherein:
the user can set that the value of said size attribute be a maximize value; and
the layout process causes the size in said first dimension of the given variable image element which has said maximize size attribute value, and the corresponding dimension of an image mapped into the given variable element, to expand to encompass space available in the given dimension, over a given length range, in the location in the document into which the image has been mapped.

24. A computerized method as in claim 22 wherein a user can set either a width dimension of a height dimension to be said first dimension for which said size attribute value is set.

25. A computerized method as in claim 22 wherein the performing of a layout process includes varying the location of the layout of other contents of the document as a function of the amount of space taken up by said given variable image element in said second dimension after the image has been mapped into said variable image element.

26. A computerized method as in claim 25:
further including enabling a user to:
    place a sequence box, which has a sequencing axis, in the document;
    place in the sequence box a variable image element having said second dimension parallel to said sequencing axis; and
    place in the sequence box another shape element having a maximize property in a dimension parallel to said sequencing axis; and
wherein the performing of the layout process includes causing the maximizable shape element to take ups space in the sequence box as a function of the amount of space taken up by said variable image element in said second dimension after the image has been mapped into said variable image element.

27. A computerized method of producing different custom versions of a variable document in response to data contained in different data sets, said method comprising:

representing a document template containing a plurality of layout elements, including text and/or shape elements that are variable elements, into which variable values can be mapped, and non-variable elements, the values of which are statically defined within the template itself;

representing a plurality of content-mapping rules for mapping variable values into each of the template's variable elements, including mapping shape values into variable shape elements, as a function of data from a data set, which content-mapping rules do not always map a shape value into each variable shape element for each possible data set;

using the content-mapping rules to map variable values into the variable elements of the template for a given data set; and performing a layout process in which elements of the template and the variable values mapped into the template are laid out onto a 2-dimensional area in which each such element is given a precise position and size, including:
    allocating space to individual non-variable shape elements in the template;
    allocating space to individual variable shape elements into which a shape value has been mapped; and
    allocating no space to an individual variable shape element into which the content-mapping rules have not mapped a shape value.

28. A computerized method as in claim 27 wherein the shape values which are mapped into variable shape elements include images.

29. A computerized method as in claim 27 wherein the shape values which are mapped into variable shape elements include sub-trees of layout elements, each of which can include text and shape elements and has as a root element a shape element which contains the other elements of such a sub-tree.

30. A computerized method as in claim 27 wherein the performing of a layout process includes varying the location of the layout of other contents of the document as a function of whether or not space is allocated to a given individual variable shape element.

31. A computerized method as in claim 30:
further including enabling a user to:
place a sequence box, which has a sequencing axis, in the document;
place in the sequence box the given variable shape element; and
place in the sequence box another shape element having a maximize property in a dimension parallel to said sequencing axis; and
wherein the performing of the layout process includes causing the maximizable shape element to take ups space in the sequence box as a function whether or not space is allocated to the given variable shape element.

32. A computerized method of producing different custom versions of a variable document in response to data contained in different data sets, said method comprising:
representing a document template containing a plurality of layout elements, including variable elements, each of which has an associated content type, which defines the type of variable value mapped into the variable element, and one or more associated attributes, the values of which are used to define the properties of the variable element;
representing a plurality of content-mapping rules for mapping variable values of a given type into individual variable elements of the same type;
representing variable values each of which can be mapped into a variable element of a given content type, in which a variable value of a given content type can include:
content of the given content type, which can include text, an image, or shape elements, which can be mapped into a variable element of the given content type; and
values for individual attributes of a variable element the given content type;
using the content-mapping rules to map variable values into variable elements of the template, including:
associating the content of a given variable value mapped into a given variable element with that given variable element; and
assigning any attribute values included in the given variable value to the corresponding attribute of the given variable element; and
performing a layout process in which elements of the template and variable values mapped into the template are laid out onto a 2-dimensional area in which each such element is given an appearance, including position and size, in which the appearance of a variable elements is defined as a function of both the content and attribute values, if any, of the variable value mapped into the variable element.

33. A computerized method as in claim 32 wherein:
the representation of the document template includes definitions of variable elements contained in the template, which definitions assigns static values to individual attributes of such variable elements; and
the layout process causes the appearance, position, and size of a given variable element to vary as a function of both:
any attribute values contained in a given variable value mapped into the given variable element; and
any static attribute values assigned to the given variable element in said template for which no corresponding attribute value has been included in the given variable value.

34. A computerized method as in claim 32 wherein:
variable elements of one or more of said content types:
have variable values including text mapped into such variable elements; and
have an associated language attribute, the value of which indicates the language of text mapped into such a variable elements;
individual variable values include text and a value for said language attribute which indicates the language of the text; and
the layout process includes responding to the mapping into a given variable element of a variable value which includes given text and a given language attribute value by selecting from a plurality of hyphenation rule sets, each representing hyphenation rules applicable to different languages, a hyphenation rule set corresponding to the language indicated by the given language attribute value, and using the selected hyphenation rule set to hyphenate the given text in said layout process.

35. A computerized method of generating a different version of a variable document for different data sets, each of which includes one or more corresponding fields, the method comprising:
storing a document template containing a plurality of text and shape elements, including one or more variable elements into which variable values are mapped;
storing a plurality of variable values in a data base;
storing a set of user-defined content-mapping rules, each for mapping a variable value into one or more corresponding variable elements in the template as a function of the value of one or more data set fields, including one or more variable-query content-mapping rules, each of which defines a data-base query which varies as a function of the value of one or more data set fields;
generating a given version of the variable document for a give data set by using the content-mapping rules to map variable values into the variable elements of the template, including:
generating an instance of the variable query defined by each variable-query content-mapping rules as a function of the value of one or more fields in the given data set;
sending each such variable query to the data base; and
mapping the variable value fetched by the data base in response to each variable query into the one or more variable elements corresponding to the individual variable-query content-mapping rule which defined that query; and
performing a layout process in which elements of the template and variable values mapped into the template are laid out onto a 2-dimensional area in which each such element is given a precise position and size.

36. A computerized method as in claim 35 wherein:
said variable queries are each represented in the form of an SQL query template with one or more variable symbols, each of which is defined as a function of one or more of said data set fields; and
the generation of a given instance of the variable query includes using the values of one or more fields in the given data set to define a value corresponding to each variable symbol in the query template, and replacing each such variable symbol with its corresponding value.

37. A computerized method as in claim 35 wherein:
said data base is a media asset management data base in which:
digital content files are stored;
one or more metadata fields are associated with each such content file; and
the data base can fetch a content file based on a query containing one or more metadata fields and values for those fields;
said said generated instances of the variable queries contains metadata fields and values for those fields contained in the data base; and
the variable value selected by said variable query are derived from content files fetched from the media asset management data base.

38. A computer-readable medium, having computer executable-instructions for performing a method of laying out a document containing a combination of text and shape elements, said method comprising:
providing a user interface with controls for enabling a user to:
place a sequence box, which has a sequencing axis, in the document;
cause one or more shape elements to be located in the sequence box;
cause a shape element, including one i the sequence box having at least one text or shape element as contents, to have a minimize property in at least one dimension; and
cause a shape element, including one in the sequence box, to have a maximize property in at least one dimension; and
performing an automatic layout process in which elements of the document are laid out onto a 2-dimensional area in which each such element is given a precise position and size, including:
arranging shape elements, if any, placed within the sequence box in a sequence along the sequence box's sequencing axis;
minimizing the size given to any shape element which has the minimize perperty in a given dimension, including any shape element as small as its contents, if any, will allow in the given dimension, over a given length range; and
maximizing the size given to any shape element which has the maximize property in a given dimension by making the element expand to emcompass space available in the given dimension, over a given length range, said maximizing including, inf the maximized shape element is within the sequence box, expanding it to encompass space available withing the sequence box.

39. A computer readable medium as in claim 38 wherein the shape elements defined within a sequence box are directional sequence boxes each containing a sequence of shape elements arranged along a sequencing axis.

40. A computer readable medium as in claim 38 wherein the directional sequence box is either a v box, in which the sequencing axis is a vertical axis, or an h box, in which the sequencing axis is a horizontal axis.

41. A computer readable medium as in claim 38 wherein:
said user interface enables a user to select to cause the directional sequence box to have the maximize or minimize property in a given dimension; and
said layout process maximizes or minimizes the directional sequence box, respectively.

42. A computer readable medium as in claim 38 wherein:
one or more shape elements within the sequence box are variable elements;
said method includes mapping variable values into said variable values; and
said layout process lays out a given variable element within the sequence box into which a given variable value has been mapped by laying out the given variable value at the position of the variable element within the sequence box.

43. A computer readable medium as in claim 42 further including:
defining the document as a tree of layout elements, including text and/or shape elements that are variable elements, in which each layout element is a node of said tree;
defining one or more variable values, to be mapped into one or more variables elements located in the document, as sub-trees, each of which includes a plurality of nodes each corresponding to either a text or a shape elements and each of which includes a root node;
said mapping of variable values into variable elements includes grafting the root nodes of sub-tree variable values onto the nodes of the document tree corresponding to the variable elements into which the sub-tree variable values are mapped; and
said layout process includes laying out the elements of the tree formed by the combination of the nodes of the document tree and the nodes of the sub-trees which have been grafted onto the document tree.

44. A computer readable medium as in claim 43 wherein:
one of said sub-trees contains one or more shape element which have said maximize or said minimize property; and
said sayout process will respond to the grafting of such sub-tree onto a variable element by causing the lay out of said maximized or minimized shape element within said grafted sub-tree to be maximized or minimized, respectively.

45. A computer readable medium as in claim 38 wherein:
said interface is a WYSIWYG graphical user interface which allows a user to select the placement of said sequence box and the shape elements within it, including allowing a user to use a pointing device to create, position and size said shape elements; and
said layout process is performed interactively in response to changes made to the document by the user with said graphical user interface, to enable the user to see a screen display of the layout of the document showing any changes the user has just made to the document.

46. A computer readable medium as in claim 45 wherein the shape elements defined within a sequence box with the WYSIWYG graphical user interface contain directional sequence boxes, so directional sequence boxes are nested within other such sequence boxes.

47. A computer readable medium as in claim 38 wherein the user interface enables a user to separately select whether or not a shape element within the sequence box has a maximize property in a vertical dimension and whether or not the shape element has said property in a horizontal dimension.

48. A computer readable medium as in claim 38 wherein the user interface enables a user to separately select whether or not a shape element within the sequence box has the minimize property in a vertical dimension and whether or not the shape element has said property in a horizontal dimension.

49. a computer readable medium as in claim 38 wherein:
the one or more shape elements placed within the directional sequence box are variable shape elements;
the method maps variable shape value into the document's variable shape elements based on values in a data set using a plurality of content-mapping rules, which rules may not map a shape value into each variable shape element for all possible data sets; and
said layout process will allocate space to layout a given variable shape element within the sequence box into which a given shape value has been mapped with a layout of the given shape value at the position of the given variable shape element within the sequence box, but will allocate substantially no space to a variable shape element into which the content-mapping rules have not mapped a shape value.

50. A computer readable medium as in claim 49 wherein, if one of the shape elements in the sequence box has a maximize property in a dimension parallel to the sequencing axis of the sequence box, and if no space is allocated to a given variable shape element in the sequence box because the content-mapping rules have not mapped a shape value into the given variable shape element, then said layout process will cause the shape element with the maximize property to expand to take up space not occupied by the given variable shape element.

51. A computer readable medium as in claim 38 wherein if a first shape elements in a sequence box has a maximize property in a dimension parallel to the sequencing axis of the sequence box and second shape element in the sequence box has a minimize property in the same dimension and has contents which can change in size, then said layout process:
causes the size of the minimized shape element to expand and contract in the given dimension as the minimized shape element minimizes around the charging size of its contents; and
causes the size of the maximized shape element to contract and expand, respectively, as the space available in the sequence box changes in response to the changes in size of the minimized shape element.

52. A computer readable medium as in claim 38 wherein:
the shape elements, including the sequence box, each include boundary lines which define the perimeter of each such shape element;
the user interface includes controls for enabling a user to select to give each such shape element and internal margin of a selected width inside one or more boundary lines of such a shape element; and
the layout process causes elements placed within a sequence box to be placed at a distance from the boundary line of the sequence box having such an internal margin at least equal to the width defined by said internal margin.

53. A computer readable medium as in claim 38 wherein:
the shape elements, including the sequence box, each include boundary lines which define the perimeter of each such shape element;
the user interface includes controls for enabling a user to select to give each such shape element an external margin of a selected width outside one or more boundary lines of such a shape element; and
the layout process causes shape elements having such an external margin within a sequence box to be placed at a distance from the boundary line of the sequence box or any shape within the sequence box at least equal to the width defined by said external margin.

54. A computer-readable medium, having computer executable-instructions for performing a method of laying out a document containing a combination of text and shape elements, said method comprising:
storing a document template which defines a document as a tree of layout elements, including text and/or shape elements that are variable elements, in which each layout element is a node of said tree;
storing content-mapping rules for mapping variable values into individual variable elements;
enabling a user to define one or more variable values, to be mapped into one or more variables elements located in the document, as sub-trees, each of which includes a plurality of nodes each corresponding to either a text or a shape elements and each of which includes a root node, including enabling user to select that a shape element on one of said sub-trees have a maximize property in one or more dimensions;
mapping sub-tree values into variable elements, in which a particular sub-tree value is mapped into a particular variable element by grafting the root node of the particular sub-tree onto the tree node of the particular variable element; and
performing a layout process in which elements of the document are laid out onto a 2-dimensional area in which each such element is given a precise position and size, including laying out elements of a tree formed by the combination of the nodes of the template's tree and the nodes of sub-trees which have been grafted onto variable elements of the template's tree, which laying out of elements includes, if a given shape elements in a grafted subtree has the maximize attribute in a given dimension, making the given shape element expand to encompass space available in the given dimension, over a given length range, in the location in the document into which the given sub-tree has been mapped.

55. A computer-readable medium, having computer executable-instructions for performing a method of laying out a document containing a combination of text and shape elements, said method comprising:
storing a document template which defines a document as a tree of layout elements, including text and/or shape elements that are variable elements, in which each layout element is a node of said tree;
storing content-mapping rules for mapping variable values into individual variable elements;
enableing a user to define one or more variable values, to be mapped into one or more variables elements located in the document, as sub-trees, each of which includes a plurality of nodes each corresponding to either a text or a shape elements and each of which includes a root node, including enabling a user to select that one or more of said subtrees each include a shape element:
into which a variable value can be mapped by said content mapping rules;
which has the minimize property in one or more dimensions; and
mapping sub-tree values into variable elements, in which a particular sub-tree value is mapped into a particular variable element by grafting the root node of the particular sub-tree onto the tree node of the particular variable element; and
performing a layout process in which elements of the document are laid out onto a 2-dimensional area in which each such element is given a precise position and size, including laying out elements of a tree formed by the combination of the nodes of the template's tree and the nodes of sub-trees which have been grafted onto variable elements of the template's tree, which laying out of elements includes, if a given shape element in a grafted subtree has the minimize property in a given dimension, making the given shape element as small as the variable value, if any, mapped into the given shape value will allow in the given dimension, over a given length range.

56. A computer-readable medium, having computer executable-instructions for performing a method of laying out a combination of textual and shape elements in a document, said method comprising:

storing a document template which defines a docuemtn as a tree of nodes representing layout elements, including text and/or shape elements, at least one of which is ashape elements that contain layout elements within it and at least one of which is a variable text or shape element;

storing content-mapping rules for mapping variable values into individual variable elements;

enabling a user to cause a variable shape element to have either a maximum property or a minimize property;

mapping variable values into variable elements of the template, including mapping shape values into variable shape values; and performing a layout process in which elements of the document are laid out onto a 2-dimensional area in which each such element is given a precise position and size, including:

minimizing the size given to variable shape elementsthat have the minimize property in a given dimension, which includes making those shape elements as small as their variable value, if any, will allow in the given dimension, over a given length range;

maximizing the size given to variable shape elementsthat have the maximize attribute in a given dimension, which includes making those shape elements expand to encompass any space available in the given dimension, over a given leigth range, within the directional sequence box in which the shape has been placed.

57. A computer readable medium as in claim 56 wherein:

said method includes enabling a user to define one or more variable values, to be mapped into one or more variables elements located in the document, as sub-trees, each of which includes a plurality of nodes each corresponding to either a text element or a shape element and each of which includes a root node;

said mapping of variable value into variable elements includes grafting the root nodes of sub-tree variable value onto the nodes of the document tree corresponding to the variable elements into which the sub-tree variable values are mapped; and said layout process includes laying out the elements of the tree formed by the combination of the nodes of the document tree and the nodes of the sub-trees which have been grafted onto the document tree.

58. A computer-readable medium, having computer executable-instructions for forming a method of laying out a combination of text and shape elements in a document, said method comprising:

representing a document which contains text elements and shape elements into which the user can insert one or more layout elements as content;

enabling a user to select that a given one of said shape elements is to have its size in one or more dimensions determined by that given shape element's content;

enabling a user to select that a given one of a plurality of locations on said given shape element is to be an anchor point;

enabling user to vary the content of said given shape element, with different of said variable contents having different sizes; and performing a layout process in which elements of the document are laid out onto a 2-dimensional area in which each such element is given a precise position and size, including:

causing the size of the given shape element to be as small as the variable content will allow in the given dimension, over a given length range; and holding the given shape element's anchor point fixed, so that other portions of the given shape element expand or contract in response to the varying content relative to the fixed location of the anchor point.

59. A computer-readable medium, having computer executable-instructions for performing a method of laying out a combination of text and shape elements in a document, said method comprising:

representing a document template which contains one or more variable elements including one or more variable image elements into which two dimensional images can be mapped;

representing content-mapping rules for mapping variable values into individual variable elements, including mapping imates, each having an aspect ratio, into variable image element;

enabling a user to set a value for a size attribute which determines the size of a given variable image element in first of the variable element's two dimensions;

using the content-mapping rules to map variable values, including images, into the variables of the document template; and performing a layout process in which elements of the document defined by the template and values mapped into the variable elements of the template are laid out onto a 2-dimensional area in which each such element is given a precise position and size, including allocating an image mapped into the given variable image element, and given variable image element, itself, the size in the first dimension specified by the size attribute value and allocating the image and the given variable image element a size in the second of said two dimensions automatically determined so as to maintain the image's aspect ratio.

60. A computer readable medium as claim 59 wherein:

the user can set that the value of said size attribute be a maximize value; and the layout process causes the size in said first dimension of the given variable image element which has said maximize size attribute value, and the corresponding dimension of an image mapped into the given variable element, to expand to encompass space available in the given dimension, over a given length range, in the location in the document into which the image has been mapped.

61. A computer readable medium as in claim 59 wherein a user can set either a width dimension of a height dimension to be said first dimension for which said size attribute value is set.

62. A computer readable medium as in claim 59 wherein the performing of a layout process includes varying the location of the layout of other contents of the document as a function of the amount of space taken up by said given variable image element in said second dimension after the image has been mapped into said variable image element.

63. A computer medium as in claim 62:
further including enabling a user to:
place a sequence box, which has a sequencing axis, in the document;
place in the sequence box a variable image element having said second dimension parallel to said sequencing axis; and
place in the sequence box another shape element having a maximize property in a dimension parallel to said sequencing axis; and
wherein the performing of the layout process includes causing the maximizable shape element to take ups space in the sequence box as a function of the amount of space taken up by said variable image element in said second dimension after the image has been mapped into said variable image element.

64. A computer-readable medium, having computer executable-instructions for performing a method of producing different custom versions of a variable document in response to data contained in different data sets, said method comprising:
representing a document template containing a plurality of layout elements, including text and/or shape elements that are variable elements, into which variable values can be mapped, and non-variable elements, the values of which are statically defined within the template itself;
representing a plurality of content-mapping rules for mapping variable values into each of the template's variable elements, including mapping shape values into variable shape elements, as a function of data from a data set, which content-mapping rules do not always map a shape value into each variable shape element for each possible data set;
using the content-mapping rules to map variable values into the variable elements of the templates for a given data set; and
performing a layout process in which elements of the template and the variable values mapped into the template are laid out onto a 2-dimensional area in which each such element is given a precise position and size, including:
allocating space to individual non-variable shape elements in the template;
allocating space to individual variable shape elements into which a shape value has been mapped; and
allocating no space to an individual variable shape element into which the content-mapping rules have not mapped a shape value.

65. A computer readable medium as in claim 64 wherein the shape values which are mapped into variable shape elements include images.

66. A computer readable medium as in claim 64 wherein the shape values which are mapped into variable shape elements include sub-trees of layout elements, each of which can include text and shape elements and has a root element a shape element which contains the other elements of such a sub-tree.

67. A computer readable medium as in claim 64 wherein the performing of a layout process includes varying the location of the layout of other contents of the document as a function of whether or not space is allocated to a given individual variable shape element.

68. A computer readable medium as in claim 67:
further including enabling a user to:
place a sequence box, which has a sequencing axis, in the document;
place in the sequence box the given variable shape element; and
place in the sequence box another shape element having a maximize property in a dimension parallel to said sequencing axis; and
wherein the performing of the layout process includes causing the maximizable shape element to take ups space in the sequence box as a function whether or not space is allocated to the given variable shape element.

69. A computer-readable medium, having computer executable-instructions for performing a method of producing different custom versions of a variable document in response to data contained in different data sets, said method comprising:
representing a document template containing a plurality of layout elements, including variable elements, each of which has an associated content type, which defines the type of variable value mapped into the variable element, and one or more associated attributes, the values of which are used to define the properties of the variable element;
representing a plurality of content-mapping rules for mapping variable values of a given type into individual variable elements of the same type;
representing variable values each of which can be mapped into a variable element of a given content type, in which a variable value of a given content type can include:
content of the given content type, which can include text, an image, or shape elements, which can be mapped into a variable element of the given content type; and
values for individual attributes of a variable element the given content type;
using the content-mapping rules to map variable values into variable elements of the template, including:
associating the content of a given variable value mapped into a given variable element with that given variable element; and
assigning any attribute values included in the given variable value to the corresponding attribute of the given variable element; and
performing a layout process in which elements of the template and variable values mapped into the template are laid out onto a 2-dimensional area in which each such element is given an appearance, including position and size, in which the appearance of a variable elements is defined as a function of both the content and attribute values, if any, of the variable value mapped into the variable element.

70. A computer readable medium as in claim 69 wherein:
the representation of the document template includes definitions of variable elements contained in the template, which definitions assigns static values to individual attributes of such variable elements; and
the layout process causes the appearance, position, and size of a given variable element to vary as a function of both:
any attribute values contained in a given variable value mapped into the given variable element; and any static attribute values assigned to the given variable element in said template for which no corresponding attribute value has been included in the given variable value.

71. A computer readable medium as in claim 69 wherein:

variable elements of one or more of said content types:
- have variable values including text mapped into such variable elements; and
- have an associated language attribute, the value of which indicates the language of text mapped into such a variable elements;

individual variable values include text and a value for said language attribute which indicates the language of the text; and the layout process includes responding to the mapping into a given variable element of a variable value which includes given text and a given language attribute value by selecting from a plurality of hyphenation rule sets, each representing hyphenation rules applicable to different languages, a hyphenation rule set corresponding to the language indicated by the given language attribute value, and using the selected hyphenation rule set to hyphenate the given text in said layout process.

72. A computer-readable medium, having computer executable-instructions for performing a method of generating a different version of a variable document for different data sets, each of which includes one or more corresponding fields, the method comprising:

storing a document template containing a plurality of text and shape elements, including one or more variable elements into which variable values are mapped;

storing a plurality of variable values in a data base;

storing a set of user-defined content-mapping rules, each for mapping a variable value into one or more corresponding variable elements in the template as a function of the value of one or more data set fields, including one or more variable-query content-mapping rules, each of which defines a data-base query which varies as a function of the value of one or more data set fields;

generating a given version of the variable document for a give data set by using the content-mapping rules to map variable values into the variable elements of the template, including:

generating an instance of the variable query defined by each variable-query content-mapping rules as a function of the value of one or more fields in the given data set;

sending each such variable query to the data base; and mapping the variable value fetched by the data base in response to each variable query into the one or more variable elements corresponding to the individual variable-query content-mapping rule which defined that query; and performing a layout process in which elements of the template and variable values mapped into the template are laid out onto a 2-dimensional area in which each such element is given a precise position and size.

73. A computer readable medium as in claim 72 wherein:

said variable queries are each represented in the form of an SQL query template with one or more variable symbols, each of which is defined as a function of one or more of said data set fields; and the generation of a given instance of the variable query includes using the values of one or more fields in the given data set to define a value corresponding to each variable symbol in the query template, and replacing each such variable symbol with its corresponding value.

74. A computer readable medium as in claim 72 wherein:

said data base is a media asset management data base in which:
- digital content files are stored;
- one or more metadata fields are associated with each such content file; and
- the data base can fetch a content file based on a query containing one or more metadata fields and values for those fields;

said said generated instances of the variable queries contains metadata fields and values for those fields contained in the data base; and the variable value selected by said variable query are derived from content files fetched from the media asset management data base.

* * * * *